(12) United States Patent
Wang et al.

(10) Patent No.: US 12,133,223 B2
(45) Date of Patent: Oct. 29, 2024

(54) UPLINK CONTROL INFORMATION TRANSMITTING METHOD AND APPARATUS

(71) Applicant: Samsung Electronics Co., Ltd., Suwon-si (KR)

(72) Inventors: Yi Wang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 594 days.

(21) Appl. No.: 17/385,339

(22) Filed: Jul. 26, 2021

(65) Prior Publication Data

US 2021/0352660 A1   Nov. 11, 2021

Related U.S. Application Data

(63) Continuation of application No. 15/546,859, filed as application No. PCT/KR2015/014416 on Dec. 29, 2015, now abandoned.

(30) Foreign Application Priority Data

| Jan. 29, 2015 | (CN) | ......................... 201510047588.0 |
| Apr. 24, 2015 | (CN) | ......................... 201510202732.3 |
| May 28, 2015 | (CN) | ......................... 201510283727.X |

(51) Int. Cl.
*H04W 72/21* (2023.01)
*H04L 1/00* (2006.01)
(Continued)

(52) U.S. Cl.
CPC .............. *H04W 72/21* (2023.01); *H04L 1/00* (2013.01); *H04L 1/0025* (2013.01);
(Continued)

(58) Field of Classification Search
None
See application file for complete search history.

(56) References Cited

U.S. PATENT DOCUMENTS

| 2013/0039321 A1 | 2/2013 | Kim et al. |
| 2013/0077514 A1 | 3/2013 | Dinan |

(Continued)

FOREIGN PATENT DOCUMENTS

| CN | 103621001 A | 3/2014 |
| EP | 2 562 949 A2 | 2/2013 |
| WO | 2012/174213 A1 | 12/2012 |

OTHER PUBLICATIONS

ETSI TS 136 213 V12.4.0, "LTE; E-UTRA; Physical layer procedures," (3GPP TS 36.213 version 12.4.0 Release 12), Jan. 7, 2015.
(Continued)

*Primary Examiner* — Walter J Divito
(74) *Attorney, Agent, or Firm* — Jefferson IP Law, LLP

(57) ABSTRACT

The present invention provides an uplink control information transmitting method and apparatus. In the method, when a user equipment (UE) is configured with an uplink carrier in an unlicensed spectrum, the UE transmits uplink control information through a pre-defined location and a pre-defined format in a licensed spectrum and/or a pre-defined location and a pre-defined format in an idle unlicensed spectrum according to an uplink (UL) grant transmitted from a base station and the UCI to be transmitted. According to the technical solution provided by the present invention, the UCI is flexibly transmitted in the licensed spectrum or in the idle unlicensed spectrum, thereby improving transmission efficiency and reducing impact on downlink signal scheduling when the UE is configured with the uplink carrier in the unlicensed spectrum and transmits the UCI, and further improving LTE network efficiency.

20 Claims, 40 Drawing Sheets

A UE detects an UL grant transmitted from a base station — 101

The UE transmits UCI through a set location in a licensed spectrum and/or a set location in an idle unlicensed spectrum according to the UL grant and the UCI to be transmitted — 102

(51) Int. Cl.
- *H04L 1/1607* (2023.01)
- *H04L 1/1829* (2023.01)
- *H04L 1/1867* (2023.01)
- *H04L 5/00* (2006.01)
- *H04L 27/00* (2006.01)
- *H04W 72/23* (2023.01)

(52) U.S. Cl.
CPC .......... *H04L 1/0026* (2013.01); *H04L 1/0031* (2013.01); *H04L 1/0073* (2013.01); *H04L 1/1671* (2013.01); *H04L 1/1854* (2013.01); *H04L 1/1861* (2013.01); *H04L 5/001* (2013.01); *H04L 5/0044* (2013.01); *H04L 5/0055* (2013.01); *H04L 5/0057* (2013.01); *H04W 72/23* (2023.01); *H04L 1/1896* (2013.01); *H04L 5/006* (2013.01); *H04L 5/0082* (2013.01); *H04L 5/0091* (2013.01); *H04L 5/0092* (2013.01); *H04L 27/0006* (2013.01)

(56) References Cited

U.S. PATENT DOCUMENTS

| | | |
|---|---|---|
| 2013/0077542 A1 | 3/2013 | Yang et al. |
| 2013/0077585 A1 | 3/2013 | Pan et al. |
| 2013/0195066 A1 | 8/2013 | Lee et al. |
| 2013/0230004 A1 | 9/2013 | Nam et al. |
| 2014/0119304 A1 | 5/2014 | Li |
| 2017/0118748 A1 | 4/2017 | Kalhan et al. |
| 2017/0181022 A1 | 6/2017 | Yang et al. |
| 2018/0027549 A1 | 1/2018 | Wang et al. |
| 2018/0048498 A1 | 2/2018 | Stern-Berkowitz et al. |
| 2019/0075001 A1 | 3/2019 | Stern-Berkowitz et al. |

OTHER PUBLICATIONS

Asustek, "UL Power Control for Simultaneous UCI Transmission", 3GPP TSG RAN WG1 Meeting #77, R1-142357, May 10, 2014.

Intel Corporation, "Discussion on UCI multiplexing on PUSCH in measurement gap", 3GPP TSG RAN WG1 Meeting #76bis, R1-141144, Mar. 22, 2014.

Alcatel-Lucent et al., "Remaining issues on selection of PUSCH for UCI transmission", 3GPP TSG RAN WG1 Meeting #63, R1-105986, Jan. 10, 2011.

ZTE; "Physical layer functionalities for Dual Connectivity"; 3GPP TSG-RAN WG1 Meeting #76; Prague, Czech Republic; Feb. 10-14, 2014; R1-140259; XP050735809.

LG Electronics; "Candidate solutions for LAA operation"; 3GPP TSG RAN WG1 Meeting #78bis; Ljubljana, Slovenia; Oct. 6-10, 2014; R1-144042; XP050875341.

CATT, Data and control signaling transmissions for LAA, 3GPP TSG RAN WG1 Meeting #79, R1-144627, Nov. 17, 2014.

Intel Corporation, Potential design options for LAA using LTE, 3GPP TSG-RAN WG1 #78bis, R1-143776, Oct. 6, 2014.

Chinese Office Action dated Jun. 3, 2020, issue in Chinese Patent Application No. 201510283727.X.

UPLINK CONTROL INFORMATION TRANSMITTING METHOD AND APPARATUS

CROSS-REFERENCE TO RELATED APPLICATION(S)

This application is a continuation application of prior application Ser. No. 15/546,859, filed on Jul. 27, 2017, which is a U.S. National Stage application under 35 U.S.C. § 371 of an International application number PCT/KR2015/014416, filed on Dec. 29, 2015, which is based on and claimed priority under 35 U.S.C § 119(a) of a Chinese patent application number 201510047588.0, filed on Jan. 29, 2015, in the Chinese Intellectual Property Office, of a Chinese patent application number 201510202732.3, filed on Apr. 24, 2015, in the Chinese Intellectual Property Office, of a Chinese patent application number 201510283727.X, filed on May 28, 2015, in the Chinese Intellectual Property Office, the disclosure of each of which is incorporated by reference herein in its entirety.

TECHNICAL FIELD

The present invention relates to mobile communication fields, and more particularly, to an uplink control information transmitting method and apparatus.

BACKGROUND ART

Sharply-increased high speed broadband wireless service requirements of User Equipments (UE) and scarce spectrum resources are acutely conflicting. Mobile operators start considering unlicensed spectrums as supplement of licensed spectrums. Researches of deploying Long Term Evolution (LTE) on unlicensed spectrums are put on agendas. The researches have been started by 3GPP, that carriers respectively in unlicensed spectrums and licensed spectrums are efficiently aggregated to dramatically improve spectrum utilization in a whole network on the premise that other technologies used for the unlicensed spectrums are not insignificantly affected.

The unlicensed spectrums usually have been used for other purposes, such as radars or WiFi (Wireless Fidelity) of 802.11 series. Thus, interference in the unlicensed spectrums is uncertain, which will cause that Quality of Service (QoS) for LTE is hardly guaranteed. However, the unlicensed spectrums can be used for data transmission with low QoS requirements. LTE system can be deployed on unlicensed spectrums. The LTE system deployed on unlicensed spectrums is referred to as LTE-U system. Devices in LTE-U system (e.g. UEs) are configured with multiple carriers, wherein the multiple carriers include carriers in the unlicensed spectrums and carriers in the licensed spectrums. Devices in LTE-U system (e.g., base stations) can work on multiple carriers, wherein the multiple carriers include carriers in the unlicensed spectrums and carriers in the licensed spectrums. It is a key problem how to avoid interference between LTE-U system and another wireless system (e.g., radars or WiFi) on unlicensed spectrums. Clear channel assessment (CCA) is widely used as a collision avoidance strategy in unlicensed spectrums. A STA has to detect a wireless channel before transmitting a signal. The STA occupies the wireless channel to transmit the signal when detecting that the wireless channel is idle. In LTE-U system, a similar mechanism as that of the STA is also in demand to ensure that interference is always weak for other signals.

According to a simple method, the device in LTE-U system (e.g., the UE or the base station) is dynamically opened or closed according to a CCA result. In particular, the device transmits the signal when detecting the channel is idle, and does not transmit the signal when detecting the channel is busy.

In current LTE system, uplink scheduling and downlink scheduling are usually determined by the base station. For uplink transmission, a base station transmits a scheduling indicator at n, e.g., an uplink (UL) grant including resource allocation information for UE uplink transmission etc. According to the scheduling indicator, a UE transmits an uplink signal at n+k. For example, the UE transmits the uplink signal through Physical Uplink Shared Channel (PUSCH) or Physical Random Access Channel (PRACH). For downlink transmission, the base station transmits a scheduling indicator, e.g., a downlink (DL) assignment at n. The UE detects the scheduling indicator at n, and receives a downlink signal at n according to the scheduling indicator. For example, the UE receives the downlink signal through Physical Downlink Shared Channel (PDSCH).

When the UE has transmission in the unlicensed spectrum, the UE determines whether the uplink signal can be transmitted at n+k according to a CCA result at n+k.

In current LTE system, uplink control information (UCI) includes Acknowledgement/Negative Acknowledgement (ACK/NACK), a Scheduling Request (SR), a periodic Channel State Information (CSI) and an aperiodic CSI. The UCI can be carried on Physical Uplink Control Channel (PUCCH) or on PUSCH. When the UE is configured with multiple carriers, there are two conditions for UCI transmission according to whether the UE is configured to have simultaneous PUCCH and PUSCH transmission.

In a first condition, the UE is not configured to have simultaneous PUCCH and PUSCH transmission.

When the UE does not transmit the PUSCH, the UCI is carried through PUCCH format 1/1a/1b/3 or 2/2a/2b.

When the UCI includes the aperiodic CSI or when the UCI includes the aperiodic CSI and the ACK/NACK, the UCI is carried on the PUSCH scheduled through Downlink Control Information (DCI) including an aperiodic CSI trigger request.

When the UCI includes the periodic CSI and/or the ACK/NACK and the PUSCH is transmitted on a Primary cell (Pcell), the UCI is carried on the PUSCH on the Pcell. When the PUSCH is scheduled by a random access response or when a transmission block is re-transmitted on the PUSCH in a content-based random access process, the UCI is not carried on the PUSCH.

When the UCI includes the periodic CSI and/or the ACK/NACK and the PUSCH is not transmitted on the Pcell but is transmitted on a Secondary cell (Scell), the UCI is carried on the PUSCH on a Scell with a smallest Secondary cell Index (SCellIndex) in all Scells on which the PUSCH is transmitted.

In a second condition, the UE is not configured to have simultaneous PUCCH and PUSCH transmission.

When the UCI only includes the ACK/NACK and/or the SR, the UCI is carried through PUCCH format 1/1a/1b/3.

When the UCI only includes the periodic CSI, the UCI is carried through PUCCH format 2.

When the UCI includes the periodic CSI and the ACK/NACK and the PUSCH is not transmitted, the UCI is carried on PUCCH (details specified in TS 36.213 10.1.1).

When the UCI includes the periodic CSI and the ACK/NACK and the PUSCH is transmitted on the Pcell, the ACK/NACK is carried through PUCCH format 1a/1b/3, and the periodic CSI is carried on the PUSCH on the Pcell. When the PUSCH is scheduled by the random access response or when the transmission block is re-transmitted on the PUSCH in the content-based random access process, the UCI is not carried on the PUSCH.

When the UCI includes the periodic CSI and the ACK/NACK and the PUSCH is not transmitted on the Pcell but is transmitted on Scells, the ACK/NACK is transmitted on the PUCCH format 1a/1b/3, and the periodic CSI is carried on the PUSCH on the Scell with the smallest SCellIndex in the Scells on which the PUSCH is transmitted.

The UCI includes the aperiodic CSI, the ACK/NACK and the SR, the ACK/NACK and the SR are carried through PUCCH format 1/1a/1b/3, the aperiodic CSI is carried on the PUSCH scheduled through the DCI including the aperiodic CSI trigger request.

In LTE-U system, when the UE does not transmit the PUSCH on the Pcell, according to current specifications, the UE selects the PUSCH on the Scell with the smallest SCellIndex to carry all or some UCI. Thus, the PUSCH in the unlicensed spectrum may be selected to carry the UCI. Since the UE can transmit the uplink signal in the unlicensed spectrum only when a channel is idle, the UE may not transmit the UCI, or the base station has to increase times of blind detection to determine the PUSCH carrying the UCI.

In some countries and regions, a device in LTE-U system can directly transmits signals in a certain density without the CCA, which is referred to as a short control signalling. For example, the device can transmit signals at most in 2.5 ms per 50 ms, which is not nearly enough for the UCI. Further, although a LTE-U terminal can be directly feed a control signal (e.g., ACK) to a LTE-U control node without CCA after successfully receiving data from the LTE-U control node in specifications of some countries and regions, the process above have to be completed in a maximum occupancy time. Moreover, this mechanism above only contain a condition that the LTE-U terminal successful receives data, while the LTE system further supports NACK feedback when the data is not successfully demodulated to improve Hybrid Automatic Repeat Request (HARQ) performance. Further, if the maximum occupancy time is short, e.g., 4 ms specified in Japan, the ACK/NACK in LTE system cannot be fed back in the maximum occupancy time. For example, the LTE-U control node transmits data at n, the LTE-U terminal feeds the ACK/NACK at n+4. The whole process takes 5 ms, which exceeds the maximum occupancy time. Moreover, in LTE system, besides the ACK/NACK, CSI independently transmitted from data is further included in the UCI.

Further, in prior art, the UE considers that the base station can trigger the aperiodic CSI to obtain more plentiful information than the periodic CSI. Thus, when there are the periodic CSI and aperiodic CSI in a same subframe, the UE discards periodic CSI transmission, and only transmits the aperiodic CSI. However, when the aperiodic CSI report for a carrier in the unlicensed spectrum is triggered in the LTE-U system, two conditions may occur. In a first condition, since the base station may not occupy the channel in the unlicensed spectrum over a long period of time, the UE cannot obtain a CSI measurement result, and cannot report the aperiodic CSI accordingly. For example, it may be specified that when there is no valid CSI measurement in N ms, even though receiving the aperiodic CSI report trigger signalling, the UE does not report the aperiodic CSI, wherein N is a natural number. In a second condition, since an unlicensed carrier carrying the aperiodic CSI is busy, the UE cannot transmit the PUSCH and the aperiodic CSI. In this two conditions, if the UE reports the valid periodic CSI, the UE can uses the periodic CSI as a better scheduling reference.

In addition, in an aperiodic CSI measurement and report process in the LTE-U system, the UE may have already calculated and updated the CSI measurement result. However, since the channel is busy in the subframe where the CSI is reported, the UE may not transmit the CSI, thereby consuming UE calculation capability. In practice, a UE processing capability is limited, i.e., the number of CSI processes calculated by the UE is limited. Further, when the number of CSI processes to be updated exceeds the UE processing capability, the UE has to calculate or update a part of the CSI processes according to priorities, and discards CSI calculation for other CSI processes. If the calculated and updated CSI processes are not transmitted, the UE calculation efficiency is reduced. Further, if the UE has calculated and updated a CSI process with a high priority but there is no valid CSI report resource for the CSI process, the UE calculation efficiency is reduced.

Further, in the LTE-system, whether the CSI report resource is transmitted relies on a downlink LBT result. In particular, the CSI report resource is dynamically transmitted. Thus, it is not uncertain whether the UE can obtain the valid CSI measurement result at a certain point. However, an existing set corresponding to the aperiodic CSI report is semi-statically configured, and is not changed according to the CSI report resource. Thus, the set corresponding to the triggered aperiodic CSI report may include valid CSI measurement results and invalid CSI measurement results, thereby reducing aperiodic CSI report efficiency.

DISCLOSURE

Technical Problem

According to existing unlicensed spectrum technical solutions, the UCI cannot be efficiently transmitted in LTE system. Thus, technical problems to be solved are to implement efficient UCI transmission on an uplink carrier in the unlicensed spectrum and to implement uplink synchronization establishment.

It should be noted that the foregoing descriptions in the background are merely to clearly and completely illustrate technical solutions of the present disclosure, and to facilitate understanding of the present invention for those skilled in the art. Just because technical solutions are illustrated in the background of the present invention does not make the technical solutions common knowledge for those skilled in the art.

Technical Solution

The present invention provides uplink control information transmitting methods, so as to improve transmission efficiency and reduce impact on downlink signal scheduling when the UE is configured with the uplink carrier in the unlicensed spectrum and transmits the UCI.

The present invention provides uplink control information transmitting apparatuses, so as to improve transmission efficiency and reduce impact on downlink signal scheduling when the UE is configured with the uplink carrier in the unlicensed spectrum and transmits the UCI.

The present invention provides an uplink control information transmitting method, applying to a UE configured with an uplink carrier in an unlicensed spectrum, including:

detecting, by the UE, a UL grant from a base station;
  transmitting, by the UE, UCI through a pre-defined location and a pre-defined format in a licensed spectrum and/or a pre-defined location and a pre-defined format in an idle unlicensed spectrum according to the UL grant and the UCI to be transmitted.

The present invention provides an uplink control information transmission controlling method, applying to a user equipment (UE) configured with an uplink carrier in an licensed spectrum, including:

performing, by a base station, secondary cell index (SCellIndex) configuration for a secondary carrier, wherein when the base station configures multiple carriers for a UE, the base station configures that a SCellIndex of a carrier in a licensed spectrum is smaller than a SCellIndex of any carrier in an unlicensed spectrum, or performs scheduling configuration for the UE, wherein the scheduling configuration includes preferably scheduling transmission on a carrier in a licensed spectrum in an uplink subframe where the UE has a possibility to transmit UCI, or preferably scheduling transmission on a licensed carrier for triggered aperiodic Channel State Information (CSI) when the base station triggers the UE to transmit the aperiodic CSI;
  transmitting, by the base station, a SCellIndex configuration signalling according to the configuration, or transmitting an uplink (UL) grant according to the configuration.

The present invention provides an uplink control information transmission controlling base station, including:

a configuring module, to perform secondary cell index (SCellIndex) configuration for a secondary carrier, wherein when the base station configures multiple carriers for a UE, the base station configures that a SCellIndex of a carrier in a licensed spectrum is smaller than a SCellIndex of any carrier in an unlicensed spectrum, or performs scheduling configuration for the UE, wherein the scheduling configuration includes preferably scheduling transmission on a carrier in a licensed spectrum in an uplink subframe where the UE has a possibility to transmit UCI, or preferably scheduling transmission on a licensed carrier for triggered aperiodic Channel State Information (CSI) when the base station triggers the UE to transmit the aperiodic CSI;
  a transmitting module, to transmit a SCellIndex configuration signalling according to the configuration, or transmit a uplink (UL) grant according to the configuration.

It can be seen from the above technical solution that, when the UE is configured with an uplink carrier in an unlicensed spectrum, the UE transmits uplink control information through a pre-defined location and a pre-defined format in a licensed spectrum and/or a pre-defined location and a pre-defined format in an idle unlicensed spectrum according to an uplink (UL) grant transmitted from a base station and the UCI to be transmitted. According to the technical solution provided by the present invention, the UCI is flexibly transmitted in the licensed spectrum or in the idle unlicensed spectrum, thereby improving transmission efficiency and reducing impact on downlink signal scheduling when the UE is configured with the uplink carrier in the unlicensed spectrum and transmits the UCI, and further improving LTE network efficiency.

MODE FOR INVENTION

The present invention will be described in further detail hereinafter with reference to accompanying drawings and embodiments to make the objective, technical solution and merits therein clearer.

In order to improve transmission efficiency and reduce impact on downlink signal scheduling when an unlicensed spectrum is used to transmit UCI, when the UE is configured with an uplink carrier in the unlicensed spectrum, the UE transmits the UCI through a pre-defined location and a pre-defined format in a licensed spectrum and/or a pre-defined location and a pre-defined format in an idle unlicensed spectrum according to a UL grant transmitted from a base station and the UCI to be transmitted. According to the technical solution provided by the present invention, the UCI is flexibly transmitted in the licensed spectrum or in the idle unlicensed spectrum, thereby improving transmission efficiency and reducing impact on downlink signal scheduling when the UE is configured with the uplink carrier in the unlicensed spectrum and transmits the UCI, and further improving LTE network efficiency.

Figure 1:
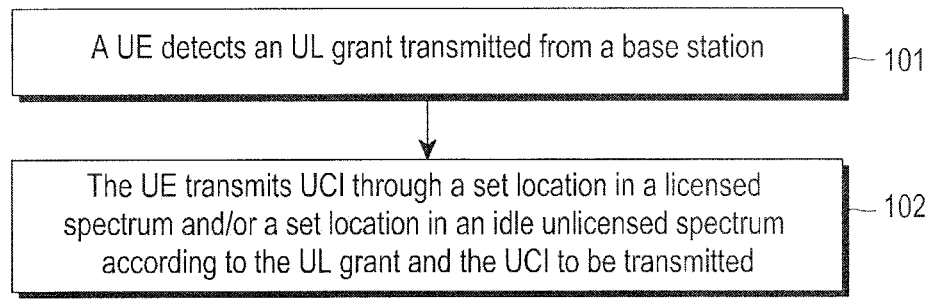
FIG. 1 is a flowchart illustrating an uplink control information transmitting method according to an embodiment of the present application.

FIG. 1 is a flowchart illustrating an uplink control information transmitting method according to an embodiment of the present application. The UE is configured with an uplink carrier in an unlicensed spectrum. As shown in FIG. 1, the method includes procedures as follow.

At block 101, the UE detects an UL grant transmitted from a base station.

At block 102, the UE transmits UCI through a pre-defined location and a pre-defined format in a licensed spectrum and/or a pre-defined location and a pre-defined format in an idle unlicensed spectrum according to the UL grant and the UCI to be transmitted.

Figure 2:
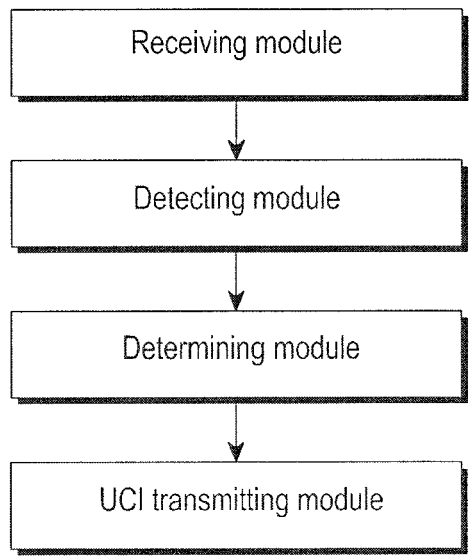
FIG. 2 is a schematic diagram illustrating a structure of an uplink control information transmitting apparatus according to an embodiment of the present application.

FIG. 2 is a schematic diagram illustrating a structure of an uplink control information transmitting apparatus according to an embodiment of the present application. As shown in FIG. 2, the apparatus includes a receiving module, a detecting module, a determining module and a UCI transmitting module.

The receiving module is to receive a UL grant from a base station.

The detecting module is to detect the UL grant.

The determining module is to determine a configured uplink carrier in an unlicensed carrier.

The UCI transmitting module is to transmit UCI through a pre-defined location and a pre-defined format in a licensed spectrum and/or a pre-defined location and a pre-defined format in an idle unlicensed spectrum according to the UL grant and the UCI to be transmitted.

In order to improve the method as shown in FIG. 1, three embodiments are illustrated as follows.

First Embodiment

Figure 3:
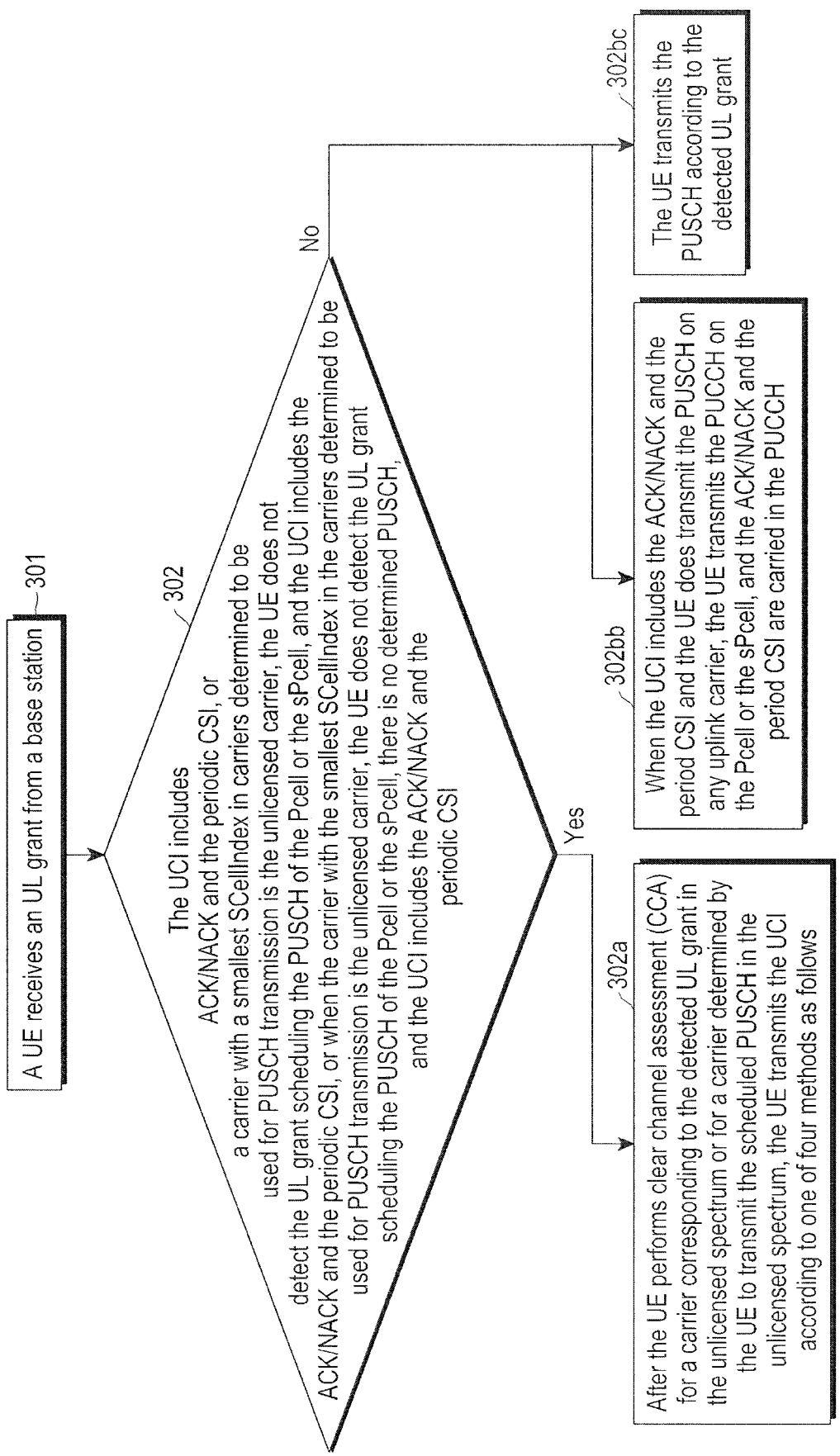
FIG. 3 is a flowchart illustrating an uplink control information transmitting method according to a first embodiment of the present application.

Methods in the first embodiment apply to a UE configured to have simultaneous PUCCH and PUSCH transmission. FIG. 3 is a flowchart illustrating an uplink control information transmitting method according to a first embodiment of the present application. As shown in FIG. 3, the method includes procedures as follow.

At block 301, the UE receives an UL grant from a base station.

In this block, the UE detects the UL grant transmitted from the base station.

At block 302, when the UE determines a carrier with a smallest SCellIndex in the detected UL grant is an unlicensed carrier according to the UL grant, the UE does not detect the UL grant scheduling a PUSCH of a Pcell or a sPcell, and UCI includes ACK/NACK and periodic CSI, or when the UE determines the carrier with the smallest SCellIndex in the detected UL grant is the unlicensed carrier according to the UL grant, the UE does not detect the UL grant scheduling the PUSCH of the Pcell or the sPcell, there is no determined PUSCH, and the UCI includes ACK/NACK and the periodic CSI, or when a carrier with a smallest SCellIndex in carriers determined to be used for PUSCH transmission is the unlicensed carrier, the UE does not detect the UL grant scheduling the PUSCH of the Pcell or the sPcell, and the UCI includes the ACK/NACK and the periodic CSI, or when the carrier with the smallest SCellIndex in the carriers determined to be used for PUSCH transmission is the unlicensed carrier, the UE does not detect the UL grant scheduling the PUSCH of the Pcell or the sPcell, there is no determined PUSCH, and the UCI includes the ACK/NACK and the periodic CSI, procedures in block 302a are performed. Otherwise, procedures in block 302b are performed.

In this block, for example, when there is neither non-adaptive retransmission nor Semi-Persistent Scheduling (SPS) transmission on the PUSCH in subframe n+k, there is no determined PUSCH.

In this block, for example, when there is the non-adaptive retransmission or the SPS transmission on the PUSCH in subframe n+k, there is the determined PUSCH.

Procedures in block 302b may be performed in two manners. In a manner, when the UE detects that the PUSCH may not be transmitted in any uplink carrier and the UCI includes the ACK/NACK and the periodic CSI, procedures in block 302bb are performed. In another manner, the UE directly transmits the PUSCH according to the UL grant, i.e., performing procedures in block 302bc.

At block 302a, after the UE performs clear channel assessment (CCA) for a carrier corresponding to the detected UL grant in the unlicensed spectrum or for a carrier determined by the UE to transmit the scheduled PUSCH in the unlicensed spectrum, the UE transmits the UCI according to one of four methods as follows.

In a first method, the UE transmits the UCI carried on the PUCCH on the Pcell or the sPcell, and/or transmits the scheduled PUSCH on a carrier in a licensed spectrum, and transmits the scheduled PUSCH on an idle carrier in the unlicensed spectrum.

In a second method, the UE transmits the scheduled PUSCH and the UCI in the licensed spectrum and transmits the scheduled PUSCH on the idle carrier in the unlicensed spectrum; or if there is no scheduled PUSCH in the licensed spectrum, the UE transmits the UCI carried the PUCCH on the Pcell or the sPcell, and transmits the scheduled PUSCH on the idle carrier in the unlicensed spectrum; or if there is no scheduled PUSCH in the licensed spectrum, the UE does not transmit the UCI, and only transmits the scheduled PUSCH on the idle carrier in the unlicensed spectrum.

In a third method, the UE transmits the scheduled PUSCH and the UCI in the licensed spectrum, and transmits the scheduled PUSCH on the idle carrier in the unlicensed spectrum; or if there is no scheduled PUSCH in licensed spectrum, the UE transmits the scheduled PUSCH and the UCI on the idle carrier in the unlicensed spectrum.

In a fourth method, the UE transmits the scheduled PUSCH and the UCI on the idle carrier in the unlicensed spectrum, and transmits the scheduled PUSCH in the licensed spectrum.

In this present invention, the PUCCH may have a newly-defined PUCCH format, e.g., an existing PUSCH format. For example, a convolutional code and Cyclical Redundancy Check (CRC) are used, and time-frequency mapping is in accordance with an existing PUSCH time-frequency mapping rule. However, PUSCH resource is not determined according to the real-time UL grant. In particular, the PUSCH resource is calculated according to a preset rule, or is configured through a higher layer signalling. The PUCCH in the present invention is still called as PUCCH. Alternatively, the PUCCH may be based on an existing PUCCH signal structure, but may have a newly-defined PUCCH format. Alternatively, a PUCCH format in existing specifications may be reused, e.g., PUCCH format 2a/2b/3.

The four methods above are described in detail as follows.

In the first method, the UE transmits the UCI carried on the PUCCH on the Pcell or the sPcell, and/or transmits the scheduled PUSCH on a carrier in a licensed spectrum, and transmits the scheduled PUSCH on an idle carrier in the unlicensed spectrum. In particular, the first method may be performed as follows.

Figure 4:
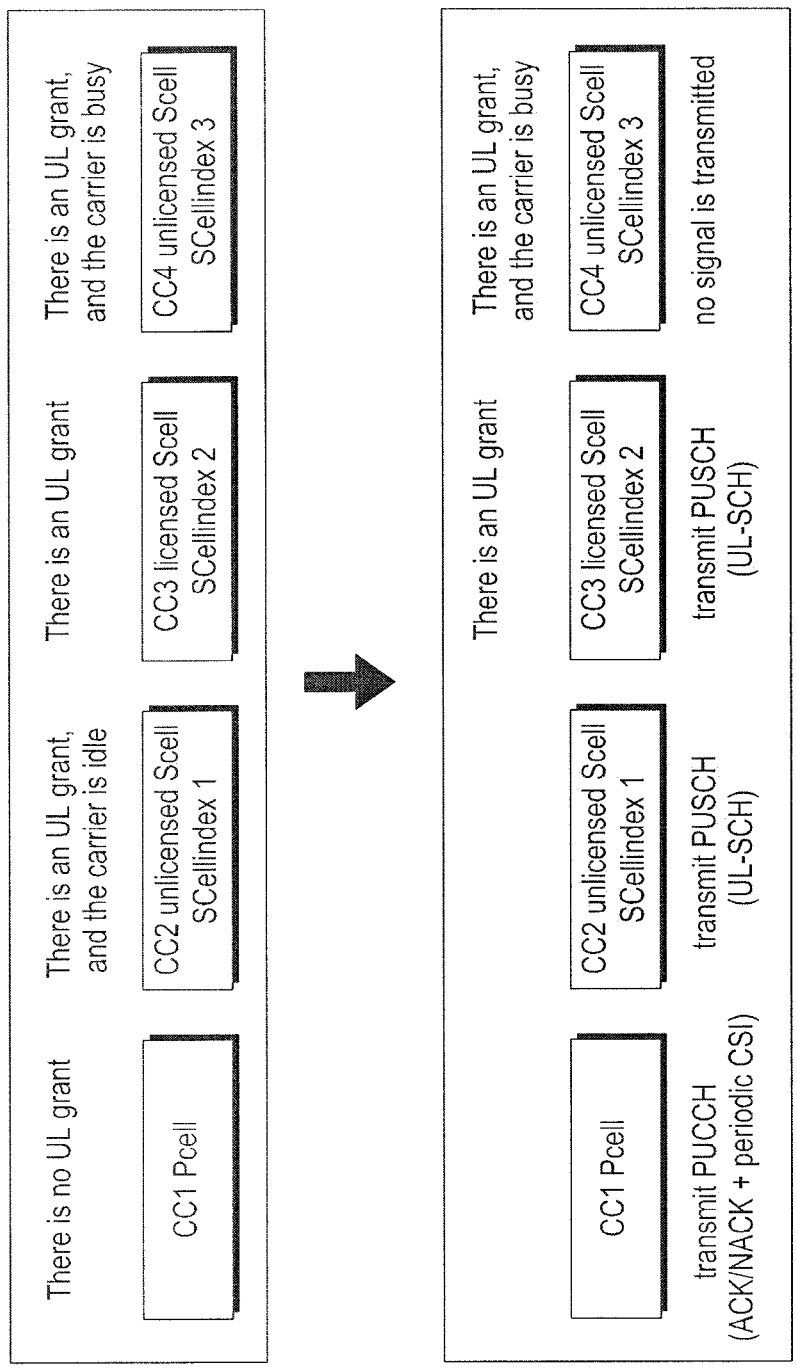
FIG. 4 is a schematic diagram illustrating an example of a first method according to a first embodiment of the present invention.

FIG. 4 is a schematic diagram illustrating an example of a first method according to a first embodiment of the present invention. As shown in FIG. 4, the ACK/NACK and periodic CSI are carried on the PUCCH on the Pcell or the sPcell, the PUSCH only including an Uplink Shared Channel (UL-SCH) is transmitted on the scheduled idle carrier in the unlicensed spectrum, and the PUSCH only including the UL-SCH is transmitted on the scheduled carrier in the licensed spectrum when there is the scheduled PUSCH in the licensed spectrum.

The PUCCH may have a newly-defined PUCCH format, e.g., an existing PUSCH format. For example, a convolutional code and Cyclical Redundancy Check (CRC) are used, and time-frequency mapping is in accordance with an existing PUSCH time-frequency mapping rule. However, PUSCH resource is not determined according to the real-time UL grant. In particular, the PUSCH resource is calculated according to a preset rule, or is configured through a higher layer signalling. The PUCCH in the present invention is still called as PUCCH. Alternatively, the PUCCH may be based on an existing PUCCH signal structure, but may have a newly-defined PUCCH format. Alternatively, a PUCCH format in existing specifications may be reused, e.g., PUCCH format 2a/2b/3.

Alternatively, according to a total load of the ACK/NACK and the periodic CSI, the PUCCH is selected to carry both the ACK/NACK and the periodic CSI, or the PUCCH is selected to carry the ACK/NACK and the PUSCH is selected to carry the periodic CSI. The PUSCH carrying the periodic CSI may be selected according to prior art, e.g., a component carrier (CC) with a smallest SCellIndex is selected to carry the periodic CSI. Alternatively, the PUSCH carrying the periodic CSI may be selected according to a method provided by the present invention. For example, if the total bit number of the ACK/NACK, a Scheduling Request (SR) (if the SR exists) and the CSI is not more than a preset X, e.g., 22 bits, the ACK/NACK and the periodic CSI are carried in the PUCCH, otherwise, the ACK/NACK is carried in the PUCCH and the periodic CSI is carried in the PUSCH.

In the second method, the UE transmits the scheduled PUSCH and the UCI in the licensed spectrum and transmits the scheduled PUSCH on the idle carrier in the unlicensed spectrum; or if there is no scheduled PUSCH in the licensed spectrum, the UE transmits the PUCCH carrying the UCI on the Pcell or the sPcell, and transmits the scheduled PUSCH on the idle carrier in the unlicensed spectrum; or if there is no scheduled PUSCH in the licensed spectrum, the UE does not transmit the UCI, and only transmits the scheduled PUSCH on the idle carrier in the unlicensed spectrum. In particular, the second method may be performed as follows.

Figure 5:
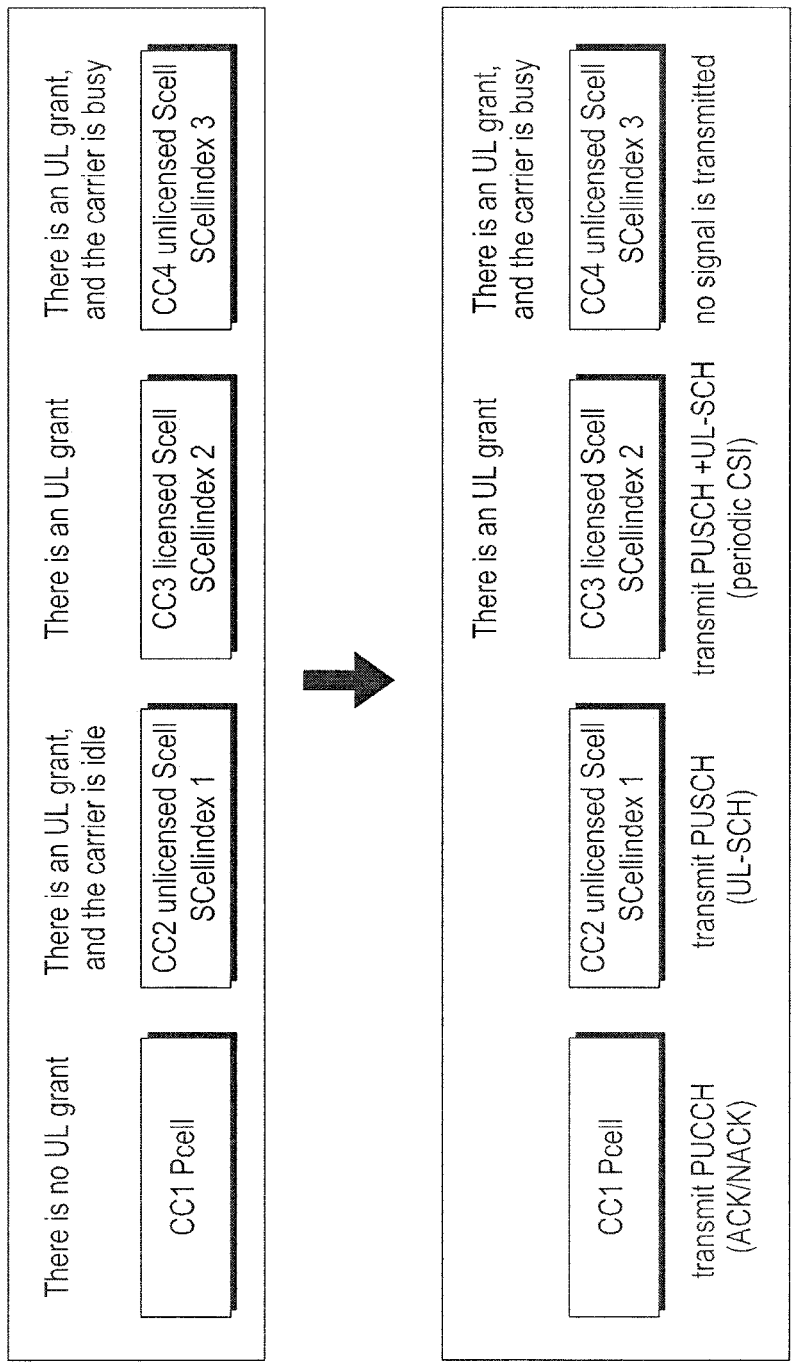
FIG. 5 is a schematic diagram illustrating a first example of a second method according to a first embodiment of the present invention.
Figure 6:
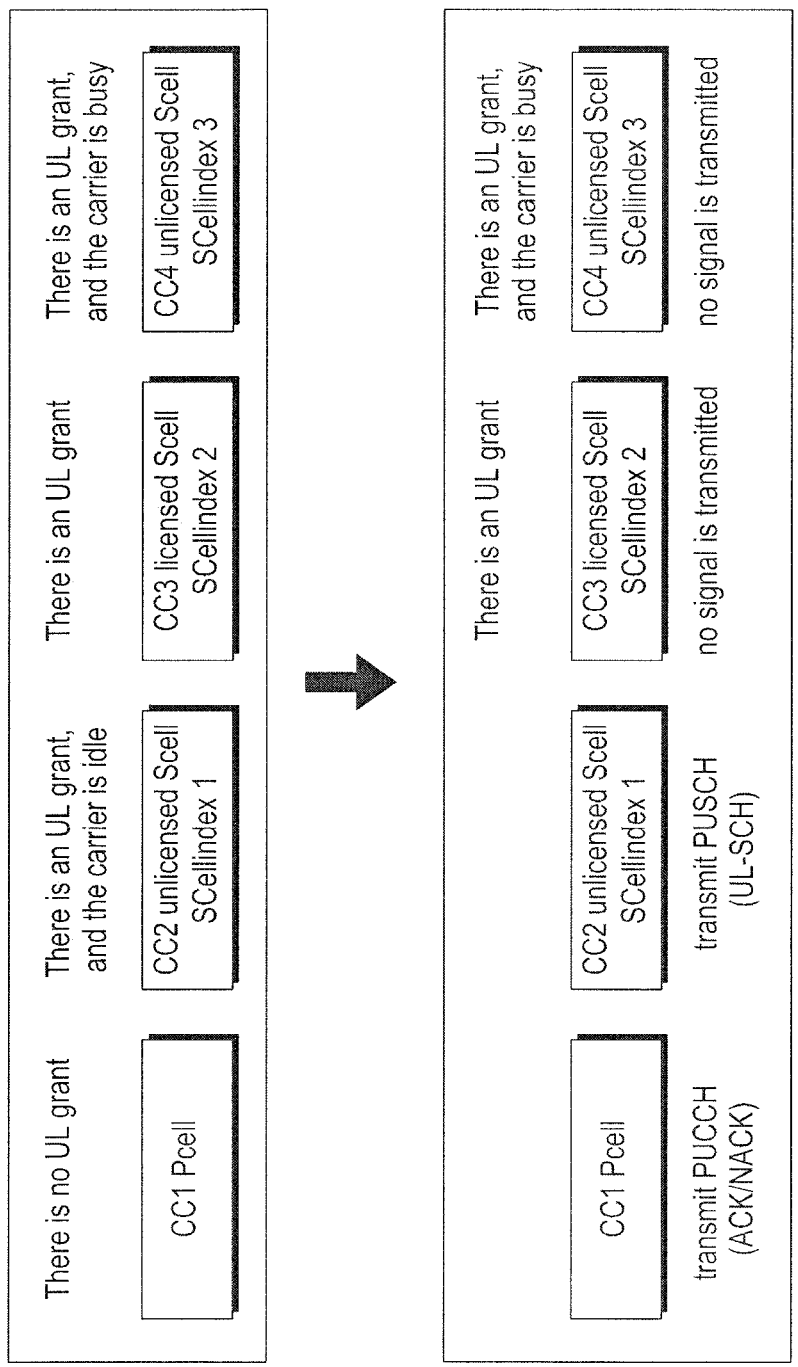
FIG. 6 is a schematic diagram illustrating a second example of a second method according to a first embodiment of the present invention.
Figure 7:
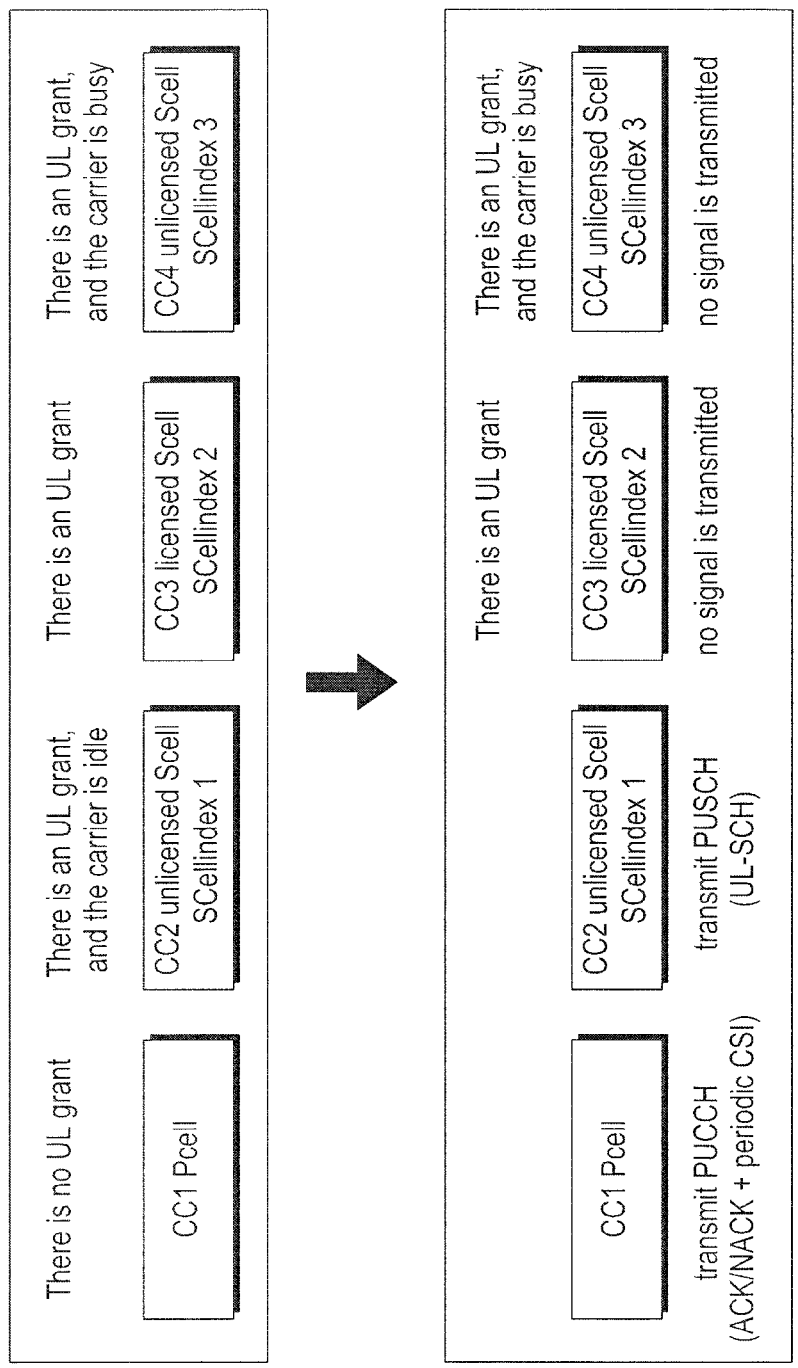
FIG. 7 is a schematic diagram illustrating a third example of a second method according to a first embodiment of the present invention.

FIG. 5 is a schematic diagram illustrating a first example of a second method according to a first embodiment of the present invention. As shown in FIG. 5, if the periodic CSI is carried on the PUSCH, the PUSCH carrying the periodic CSI is only transmitted on a carrier in the licensed spectrum, wherein the carrier has the smallest SCellIndex in the licensed spectrum. FIG. 6 is a schematic diagram illustrating a second example of a second method according to a first embodiment of the present invention. As shown in FIG. 6, if there is no PUSCH transmission in the licensed spectrum, the UE discards the periodic CSI transmission. FIG. 7 is a schematic diagram illustrating a third example of a second method according to a first embodiment of the present invention. As shown in FIG. 7, both the periodic CSI and the ACK/NACK are carried on the PUCCH transmitted on the Pcell or the sPcell.

In this manner, even if SCellIndex of an uplink carrier used for transmission in the unlicensed spectrum is smaller than SCellIndex of any uplink carrier used for transmission in the licensed spectrum, the PUSCH on the uplink carrier with the smallest SCellIndex in the licensed spectrum is still selected to carry the periodic CSI.

The base station may preferably schedule the PUSCH on the licensed spectrum in a subframe where the ACK/NACK and the periodic CSI may be fed back so as to reduce an occurrence probability of conditions in FIG. 6 or 7.

In the third method, the UE transmits the scheduled PUSCH and the UCI in the licensed spectrum, and transmits the scheduled PUSCH on the idle carrier in the unlicensed spectrum; or the UE transmits the scheduled PUSCH and the UCI on the idle carrier in the unlicensed spectrum when there is no scheduled PUSCH in licensed spectrum. In particular, the third method may be performed as follows.

The periodic CSI is preferably carried on the PUSCH transmitted on the carrier in the licensed spectrum, wherein the carrier on which the PUSCH is transmitted has the smallest SCellIndex in carriers in the licensed spectrum.

Figure 8:
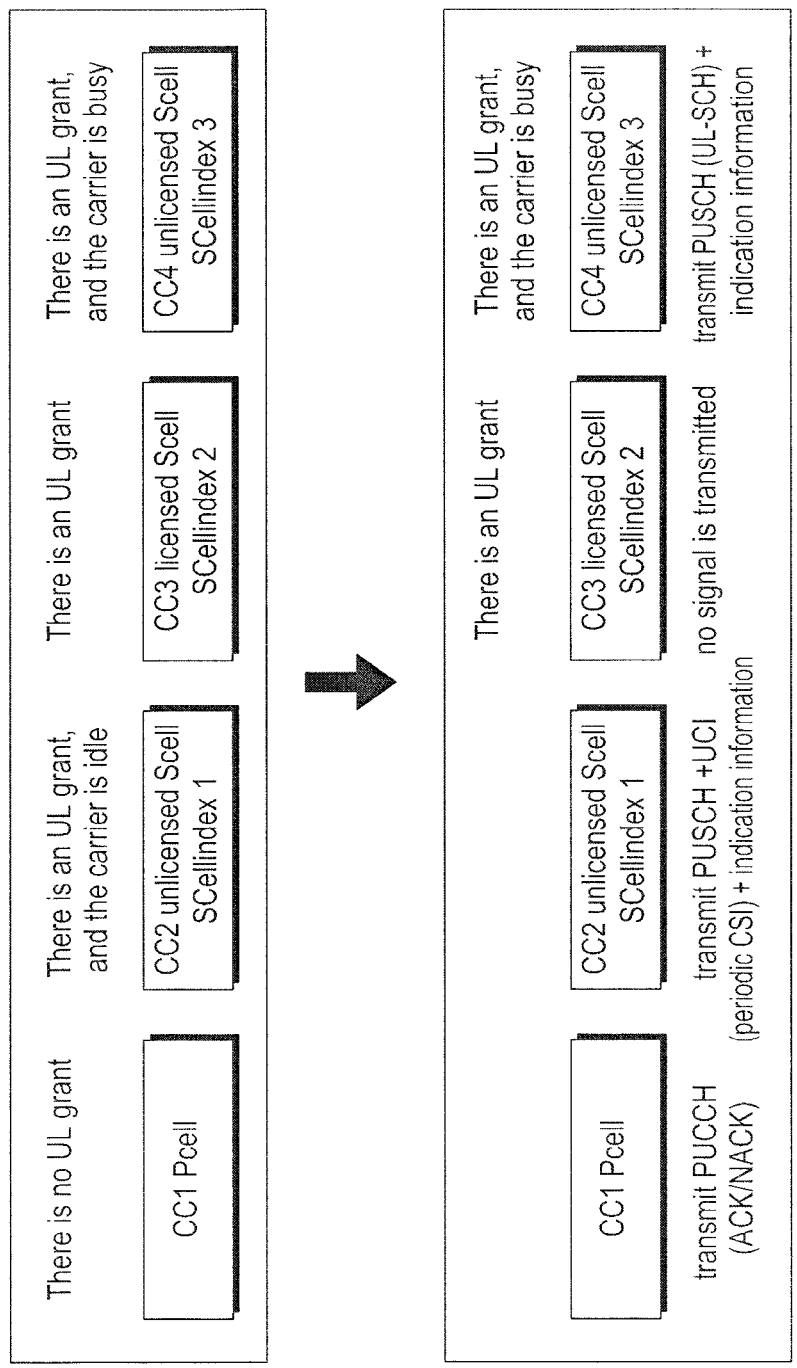
FIG. 8 is a schematic diagram illustrating a first example of a third method according to a first embodiment of the present invention.
Figure 9:
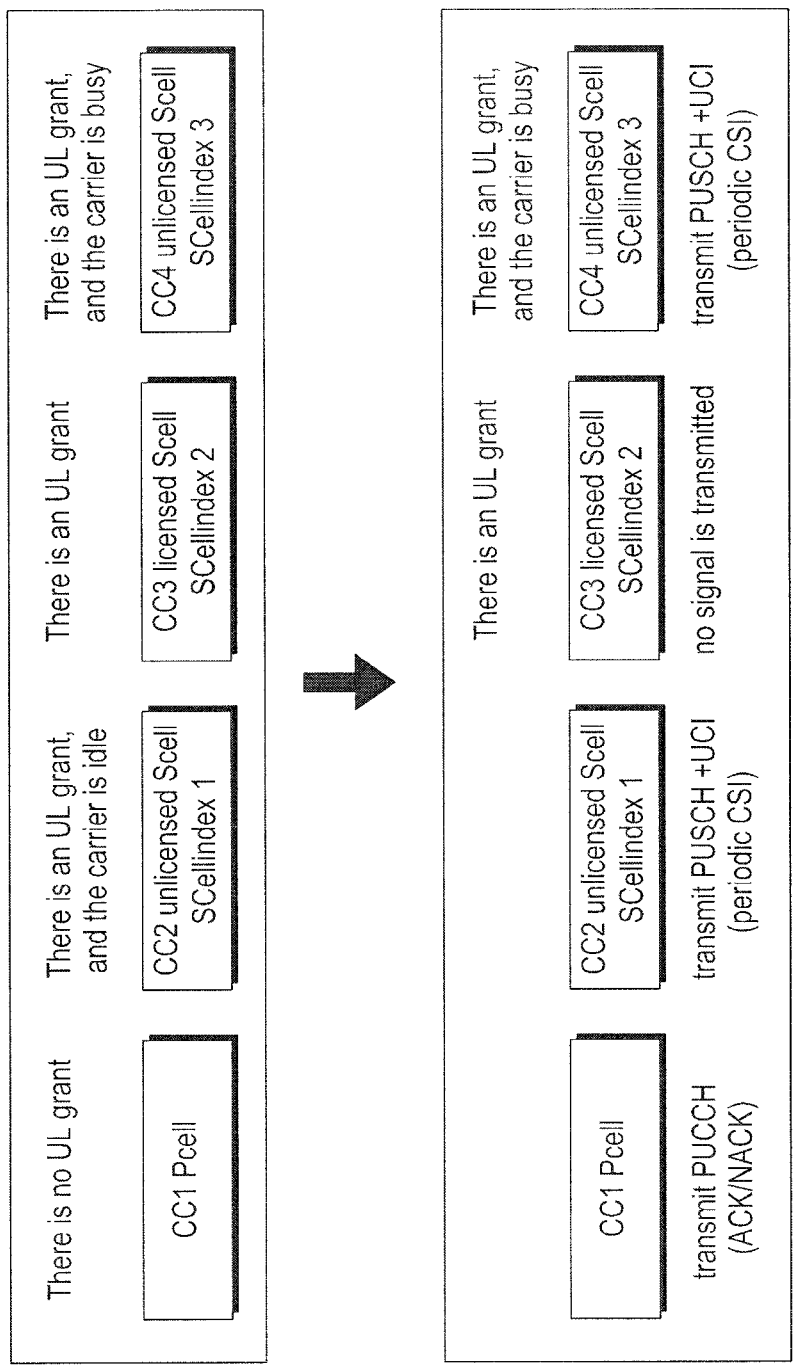
FIG. 9 is a schematic diagram illustrating a second example of a third method according to a first embodiment of the present invention.

When there is no PUSCH transmission in the licensed spectrum, the periodic CSI is carried on the PUSCH transmitted in the unlicensed spectrum according to a preset rule. For example, FIG. 8 is a schematic diagram illustrating a first example of a third method according to a first embodiment of the present invention. In a condition as shown in FIG. 8, the periodic CSI is carried on the PUSCH transmitted on the carrier with the smallest SCellIndex in the unlicensed spectrum. FIG. 9 is a schematic diagram illustrating a second example of a third method according to a first embodiment of the present invention. In another condition as shown in FIG. 9, the period CSI is carried on PUSCHs transmitted on all carriers or pre-configured carriers in the unlicensed spectrum, wherein the periodic CSI carried on a PUSCH transmitted on each of all the carriers or the pre-configured carriers in the unlicensed spectrum may be generated through performing a same modulation-encoding-rate-matching processing for the original periodic CSI, or may be generated by performing different modulation-encoding-rate-matching processings for the original periodic CSI.

When the PUSCH in the unlicensed spectrum carries the periodic CSI, the PUSCH in the unlicensed spectrum further carries the indication information to indicate on which carrier the PUSCH carries the periodic CSI. In particular, one of the following four manners may be used to carry the indication information.

1) 1-bit information is carried through a Demodulation Reference Signal (DM-RS) to indicate whether the current PUSCH carries the periodic CSI. For example, different DM-RS sequences may be used to indicate whether the current PUSCH carries the periodic CSI. DM-RS sequence 1 indicates that the current PUSCH carries the periodic CSI, and DM-RS sequence 2 indicate that the current PUSCH does not carry the periodic CSI. The DM-RS sequence may be a spreading sequence, or a DM-RS base sequence. Alternatively, the DM-RS sequence is dot-multiplied to a modulation symbol carrying the 1-bit information.

2) multiple-bit information is carried through the DM-RS to indicate which PUSCH carries the periodic CSI. The information respectively carried on PUSCHs transmitted on all carriers is same. For example, different DM-RS sequences may be used to indicate which PUSCH carries the periodic CSI, or a DM-RS sequence is respectively dot-multiplied to different modulation symbols.

3) 1-bit information is transmitted on a reversed location in a PUSCH resource element (RE) to indicate whether the current PUSCH carries the periodic CSI. For example, the 1-bit information is transmitted in the closest RE to the DM-RS. The 1-bit information is encoded, e.g., a RM encoding, a CRC encoding, or another encoding way, is modulated, e.g., QPSK modulation, and then rate matching is performed, e.g., repeating. The information may be mapped to the PUSCH through puncturing the PUSCH or through performing rate matching for the PUSCH around the location reversed for the information.

4) multiple-bit information is transmitted in a reversed location in a PUSCH RE to indicate which PUSCH carries the periodic CSI. The information respectively carried on PUSCHs transmitted on all carriers is same. For example, the information is transmitted in the closest RE to the DM-RS. The information is encoded, e.g., a RM encoding, a CRC encoding, or another encoding way, is modulated, e.g., QPSK modulation, and then rate matching is performed, e.g., repeating. The information may be mapped to the PUSCH through puncturing the PUSCH or through performing rate matching for the PUSCH around the location reversed for the information.

In the third method, the base station may preferably schedule the PUSCH on the licensed spectrum in a subframe where the ACK/NACK and the periodic CSI may be fed back so as to reduce a probability that the periodic CSI is transmitted on the unlicensed spectrum.

In the fourth method, the UE transmits the scheduled PUSCH and the UCI on the idle carrier in the unlicensed spectrum, and transmits the scheduled PUSCH in the licensed spectrum. In particular, the fourth method may be performed as follows.

The periodic CSI may be carried on the PUSCH transmitted on an uplink carrier with the smallest SCellIndex in uplink carriers used for transmission. The PUSCH may further carry indication information to indicate on which carrier the PUSCH carries the periodic CSI.

Figure 10:
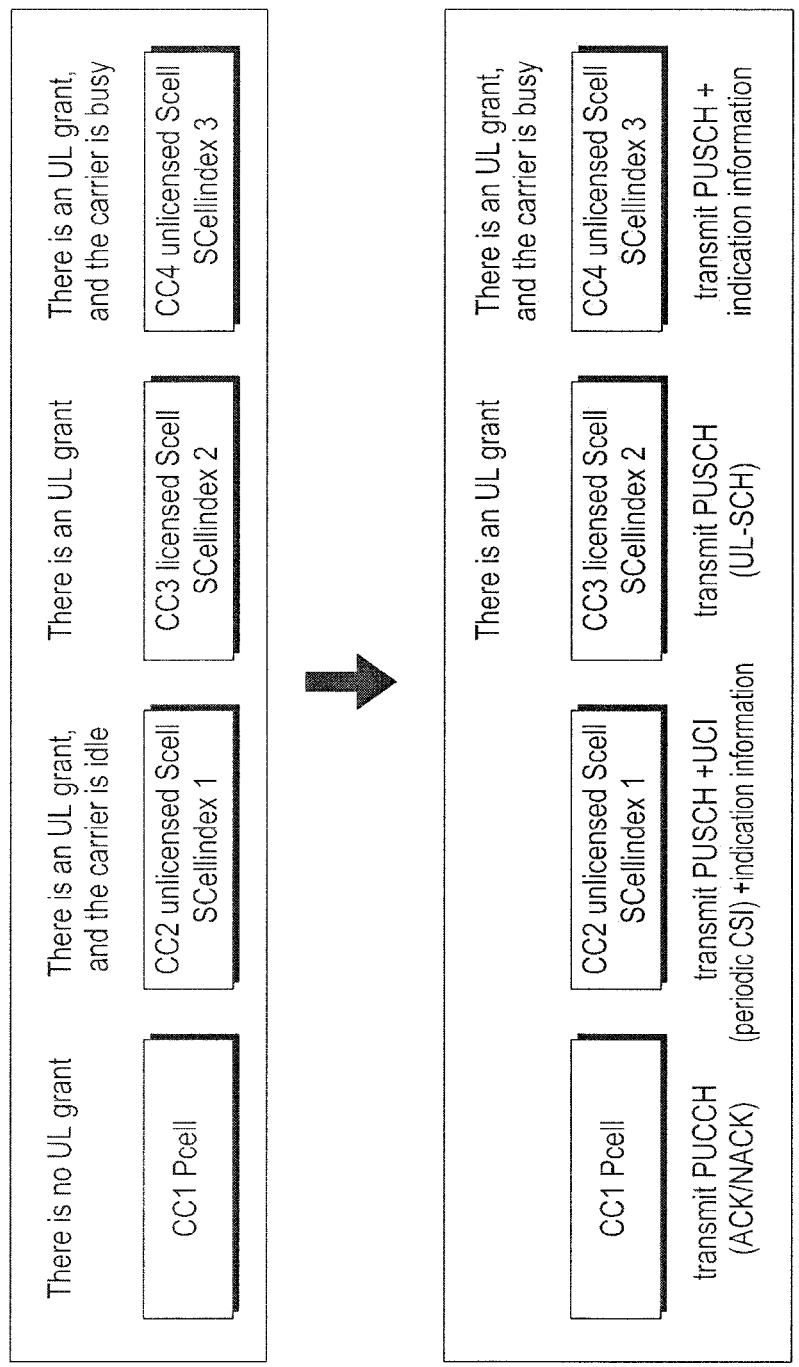
FIG. 10 is a schematic diagram illustrating an example of a fourth method according to a first embodiment of the present invention.

The PUSCH on the uplink carrier with the smallest SCellIndex in carriers used for transmission is selected to carry the periodic CSI, wherein it is not distinguished whether the uplink carrier is in the unlicensed spectrum. FIG. 10 is a schematic diagram illustrating an example of a fourth method according to a first embodiment of the present invention. As shown in FIG. 10, when the PUSCH in the unlicensed spectrum carries the periodic CSI, the PUSCH in the unlicensed spectrum further carries the indication information to indicate on which carrier the PUSCH carries the periodic CSI. In particular, one of the following four manners may be used to carry the indication information.

1) 1-bit information is carried through a Demodulation Reference Signal (DM-RS) to indicate whether the current PUSCH carries the periodic CSI. For example, different DM-RS sequences may be used to indicate whether the current PUSCH carries the periodic CSI. DM-RS sequence 1 indicates that the current PUSCH carries the periodic CSI, and DM-RS sequence 2 indicate that the current PUSCH does not carry the periodic CSI. The DM-RS sequence may be a spreading sequence, or a DM-RS base sequence. Alternatively, the DM-RS sequence is dot-multiplied to a modulation symbol carrying the 1-bit information.

2) multiple-bit information is carried through the DM-RS to indicate which PUSCH carries the periodic CSI. The information respectively carried on PUSCHs transmitted on all carriers is same. For example, different DM-RS sequences may be used to indicate which PUSCH carries the periodic CSI, or a DM-RS sequence is respectively dot-multiplied to different modulation symbols.

3) 1-bit information is transmitted on a reversed location in a PUSCH RE to indicate whether the current PUSCH carries the periodic CSI. For example, the information is transmitted in the closest RE to the DM-RS. The 1-bit information is encoded, e.g., a RM encoding, a CRC encoding, or another encoding way, is modulated, e.g., QPSK modulation, and then rate matching is performed, e.g., repeating. The information may be mapped to the PUSCH through puncturing the PUSCH or through performing rate matching for the PUSCH around the location reversed for the information.

4) multiple-bit information is transmitted in a reversed location in a PUSCH RE to indicate which PUSCH carries the periodic CSI. The information respectively carried on PUSCHs on all carriers is same. For example, the information is transmitted in the closest RE to the DM-RS. The information is encoded, e.g., a RM encoding, a CRC encoding, or another encoding way, is modulated, e.g., QPSK modulation, and then rate matching is performed, e.g., repeating. The information may be mapped to the PUSCH through puncturing the PUSCH or through performing rate matching for the PUSCH around the location reversed for the information.

In the fourth method, the base station may allocate a small SCellIndex for a carrier in the licensed spectrum, may allocate a large SCellIndex for a carrier in the unlicensed spectrum, and may preferably schedule the PUSCH on the licensed spectrum in a subframe where the ACK/NACK and the periodic CSI may be fed back so as to reduce a probability that the periodic CSI is transmitted on the unlicensed spectrum At block 302*bb*, when the UCI includes the ACK/NACK and the period CSI and the UE does transmit the PUSCH on any uplink carrier, the UE transmits the PUCCH on the Pcell or the sPcell, and the ACK/NACK and the period CSI are carried in the PUCCH.

At block 302*bc*, the UE transmits the PUSCH according to the detected UL grant.

In this block, if the carrier with the smallest SCellIndex in the detected UL grant is the unlicensed carrier and there is no determined PUSCH to be transmitted on the Pcell and/or the sPcell or if the carrier with the smallest SCellIndex in carriers determined by the UE to be used for PUSCH transmission is the unlicensed carrier and there is no determined PUSCH to be transmitted on the Pcell and/or the sPcell, the UE firstly perform the CCA estimation. Only when the carrier is idle, the UE transmits the PUSCH and the UCI on the carrier. Otherwise the UE discards or delays UCI transmission. If the carrier with the smallest SCellIndex in the detected UL grant is the licensed carrier or if the carrier with the smallest SCellIndex in the carriers determined by the UE to be used for PUSCH transmission is the licensed carrier, the UE transmits the PUSCH according to the UL grant, and transmits the UCI in the carrier with the smallest SCellIndex.

In the embodiment, take the UCI including the periodic CSI and the ACK/NACK as an example for description. The present invention further applies to a condition that the UCI only includes the ACK/NACK or the periodic CSI and the UCI is carried on the PUSCH. For example, in the second method in the first embodiment, when there is PUSCH transmission in the licensed spectrum, the UE selects the PUSCH on the carrier with the smallest SCellIndex in the licensed spectrum to carry the UCI.

Second Embodiment

Methods in the second embodiment apply to a UE not configured to have simultaneous PUCCH and PUSCH transmission. In particular, four methods are illustrated in this embodiment as follows.

Figure 11:
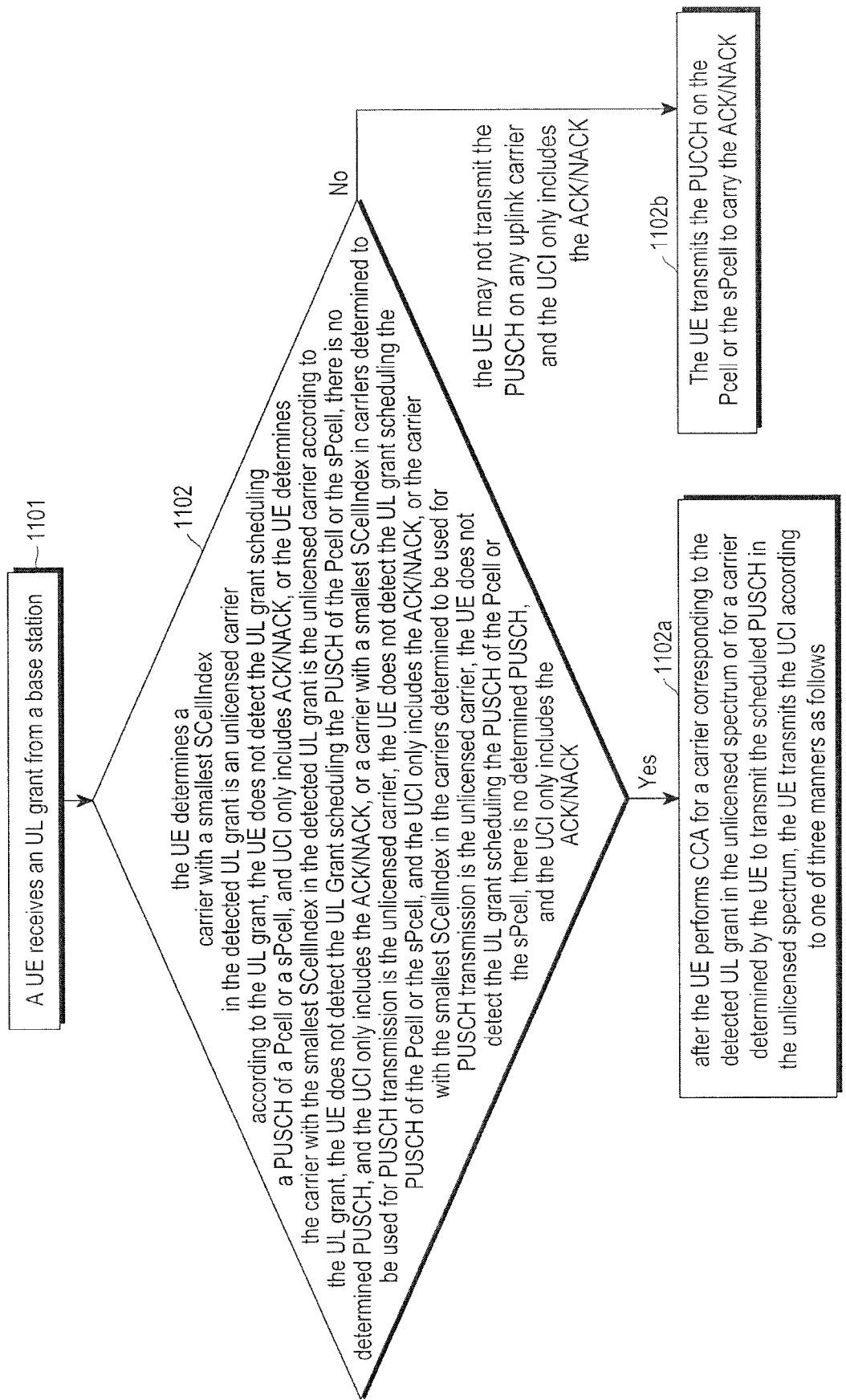
FIG. 11 is a flowchart illustrating an uplink control information transmitting first method according to a second embodiment of the present application.

FIG. 11 is a flowchart illustrating an uplink control information transmitting first method according to a second embodiment of the present application. As shown in FIG. 11, the first method includes procedures as follow.

At block 1101, the UE receives an UL grant from a base station.

In this block, the UE detects the UL grant transmitted from the base station.

At block 1102, if the UE determines a carrier with a smallest SCellIndex in the detected UL grant is an unlicensed carrier according to the UL grant, the UE does not detect the UL grant scheduling a PUSCH of a Pcell or a sPcell, and UCI only includes ACK/NACK, or if the UE determines the carrier with the smallest SCellIndex in the detected UL grant is the unlicensed carrier according to the UL grant, the UE does not detect the UL grant scheduling the PUSCH of the Pcell or the sPcell, there is no determined PUSCH, and the UCI only includes the ACK/NACK, or if a carrier with a smallest SCellIndex in carriers determined to be used for PUSCH transmission is the unlicensed carrier, the UE does not detect the UL grant scheduling PUSCH of the Pcell or the sPcell, and the UCI only includes the ACK/NACK, or if the carrier with the smallest SCellIndex in the carriers determined to be used for PUSCH transmission is the unlicensed carrier, the UE does not detect the UL grant scheduling the PUSCH of the Pcell or the sPcell, there is no determined PUSCH, and the UCI only includes the ACK/NACK, procedures in block 1102a are performed. If the UE may not transmit the PUSCH on any uplink carrier and the UCI only includes the ACK/NACK, procedures in block 1102b are performed.

In this block, for example, when there is neither non-adaptive retransmission nor SPS transmission on the PUSCH in subframe n+k, there is no determined PUSCH.

In this block, for example, when there is the non-adaptive retransmission or the SPS transmission on the PUSCH in subframe n+k, there is the determined PUSCH.

At block 1102a, after the UE performs CCA for a carrier corresponding to the detected UL grant in the unlicensed spectrum or for a carrier determined by the UE to transmit the scheduled PUSCH in the unlicensed spectrum, the UE transmits the UCI according to one of three manners as follows.

In a first manner, the UE transmits the ACK/NACK carried on the PUCCH on the Pcell or the sPcell, and does not transmit the PUSCH for any carrier.

In a second manner, the UE transmits the scheduled PUSCH and the UCI in a licensed spectrum, wherein a carrier on which the UCI is transmitted has the smallest SCellIndex in carriers in the licensed spectrum, and the UE transmits the scheduled PUSCH on an idle carrier in the unlicensed spectrum; or when there is no scheduled PUSCH in the licensed spectrum, the UE transmits the ACK/NACK carried on the PUCCH on the Pcell or the sPcell, or the UE does not transmits the ACK/NACK.

In a third manner, the UE transmits the scheduled PUSCH and the ACK/NACK in the licensed spectrum, wherein a carrier on which the ACK/NACK is transmitted has the smallest SCellIndex in the carriers in the licensed spectrum, and the UE transmits the scheduled PUSCH on an idle carrier in the unlicensed spectrum; or when there is no scheduled PUSCH in the licensed spectrum, the UE transmits the scheduled PUSCH and the ACK/NACK on the idle carrier in the unlicensed spectrum.

In this present invention, the PUCCH may have a newly-defined PUCCH format, e.g., an existing PUSCH format. For example, a convolutional code and Cyclical Redundancy Check (CRC) are used, and time-frequency mapping is in accordance with an existing PUSCH time-frequency mapping rule. However, PUSCH resource is not determined according to real-time UL grant. In particular, the PUSCH resource is calculated according to a preset rule, or is configured through a higher layer signalling. The PUCCH in the present invention is still called as PUCCH. Alternatively, the PUCCH may be based on an existing PUCCH signal structure, but may have a newly-defined PUCCH format. Alternatively, a PUCCH format in existing specifications may be reused, e.g., PUCCH format 2a/2b/3.

The three manners above are described in detail as follows.

In the first manner, the UE transmits the ACK/NACK carried on the PUCCH on the Pcell or the sPcell, and does not transmit the PUSCH for any carrier. In particular, the first manner may be performed as follows.

Figure 12:
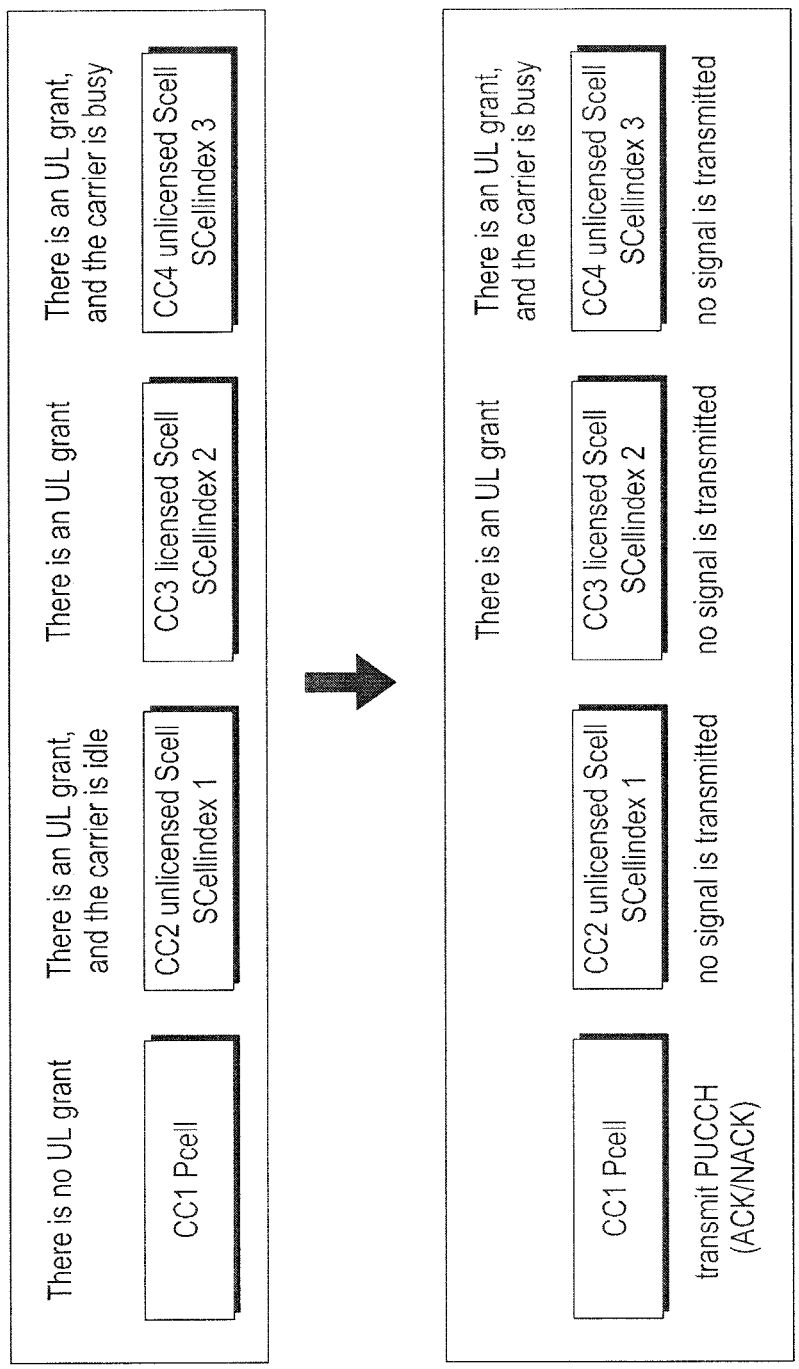
FIG. 12 is a schematic diagram illustrating an example of a first manner in a first method according to a second embodiment of the present invention.

FIG. 12 is a schematic diagram illustrating an example of a first manner in a first method according to a second embodiment of the present invention. As shown in FIG. 12, the UE transmits the ACK/NACK carried on the PUCCH on the Pcell or the sPcell, and simultaneously discards PUSCH transmission on all other carriers.

In the second manner, the UE transmits the scheduled PUSCH and the ACK/NACK in the licensed spectrum, and transmits the scheduled PUSCH on the idle carrier in the unlicensed spectrum; when there is no scheduled PUSCH in the licensed spectrum, the UE transmits the ACK/NACK carried on the PUCCH on the Pcell or the sPcell, or the UE does not transmits the ACK/NACK. In particular, the second manner may be performed as follows.

Figure 13:
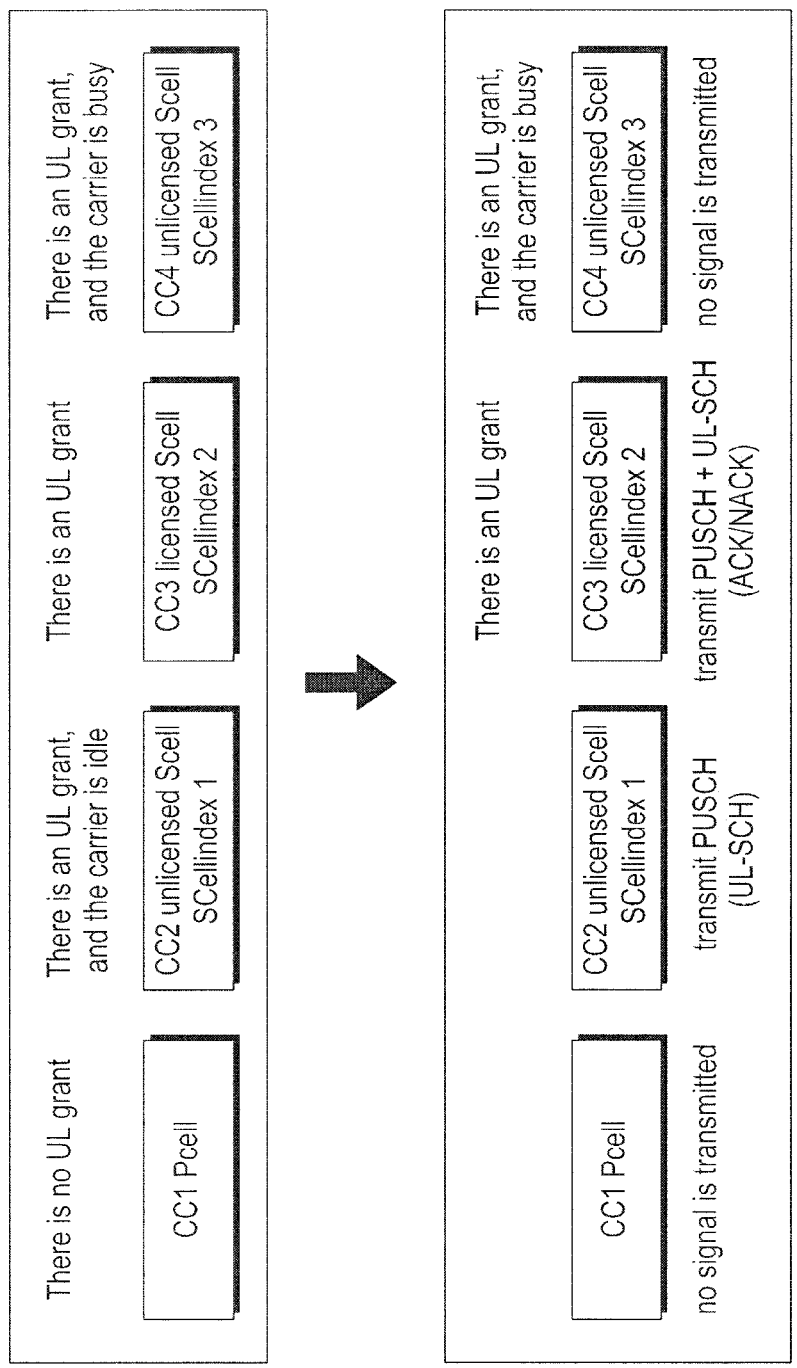
FIG. 13 is a schematic diagram illustrating a first example of a second manner in a first method according to a second embodiment of the present invention.

FIG. 13 is a schematic diagram illustrating a first example of a second manner in a first method according to a second embodiment of the present invention. As shown in FIG. 13, when the ACK/NACK is carried on the PUSCH, the PUSCH carrying the ACN/NACK is only transmitted on the carrier in the licensed spectrum, wherein the carrier on which the PUSCH is transmitted has the smallest SCellIndex in carriers in the licensed spectrum.

Figure 14:
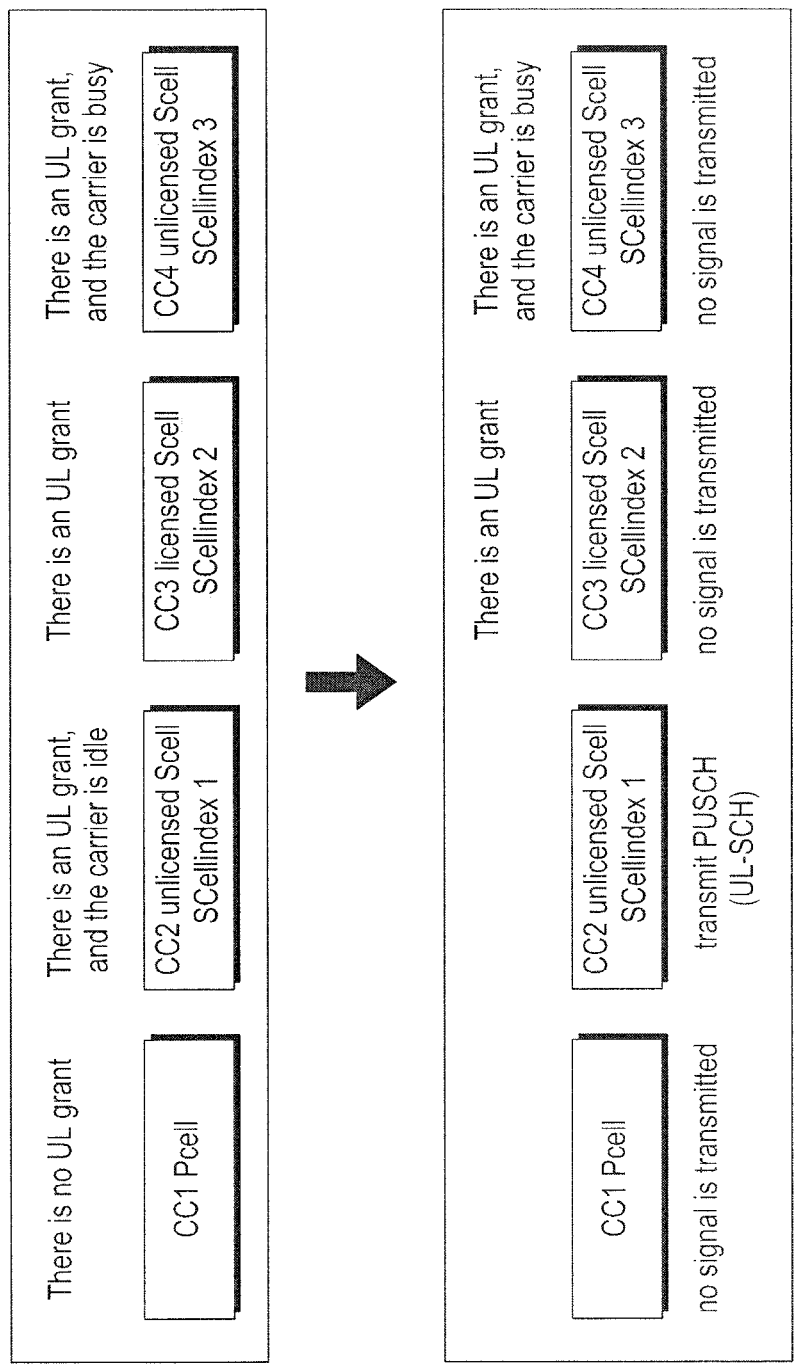
FIG. 14 is a schematic diagram illustrating a second example of a second manner in a first method according to a second embodiment of the present invention.

FIG. 14 is a schematic diagram illustrating a second example of a second manner in a first method according to a second embodiment of the present invention. As shown in FIG. 14, when there is no PUSCH transmission in the licensed spectrum, the UE does not transmits the ACK/NACK. Alternatively, the UE transmits the ACK/NACK carried on the PUCCH on the Pcell or the sPcell, and simultaneously discards PUSCH transmission on all other carriers.

In this manner, even if SCellIndex of an uplink carrier used for transmission in the unlicensed spectrum is smaller than SCellIndex of any uplink carrier used for transmission in the licensed spectrum, the PUSCH on the uplink carrier with the smallest SCellIndex in the licensed spectrum is still selected to carry the periodic CSI.

When there is no PUSCH transmission in the licensed spectrum, two ways are used to implement the method as follows.

In a first way, the ACK/NACK is not transmitted, and the PUSCH only including the UL-SCH is transmitted on a scheduled idle unlicensed carrier.

In a second way, the ACK/NACK is carried on the PUCCH on the Pcell or the sPcell, and no PUSCH is transmitted on any carrier.

The base station may preferably schedule the PUSCH on the licensed spectrum in a subframe where the ACK/NACK may be fed back so as to reduce an occurrence probability of the first way or the second way.

In the third manner, the UE transmits the scheduled PUSCH and the ACK/NACK in the licensed spectrum, and transmits the scheduled PUSCH on the idle carrier in the unlicensed spectrum; when there is no scheduled PUSCH in the licensed spectrum, the UE transmits the scheduled PUSCH and the ACK/NACK on the idle carrier in the unlicensed spectrum. In particular, the third manner may be performed as follows.

The ACK/NACK is preferably carried on the PUSCH on the carrier in the licensed spectrum, wherein the carrier on which the PUSCH is transmitted has the smallest SCellIndex in the carriers in the licensed spectrum.

When there is no PUSCH transmission in the licensed spectrum, the ACK/NACK is carried on the PUSCH transmitted in the unlicensed spectrum according to a preset rule, which may be implemented as follows.

Figure 15:
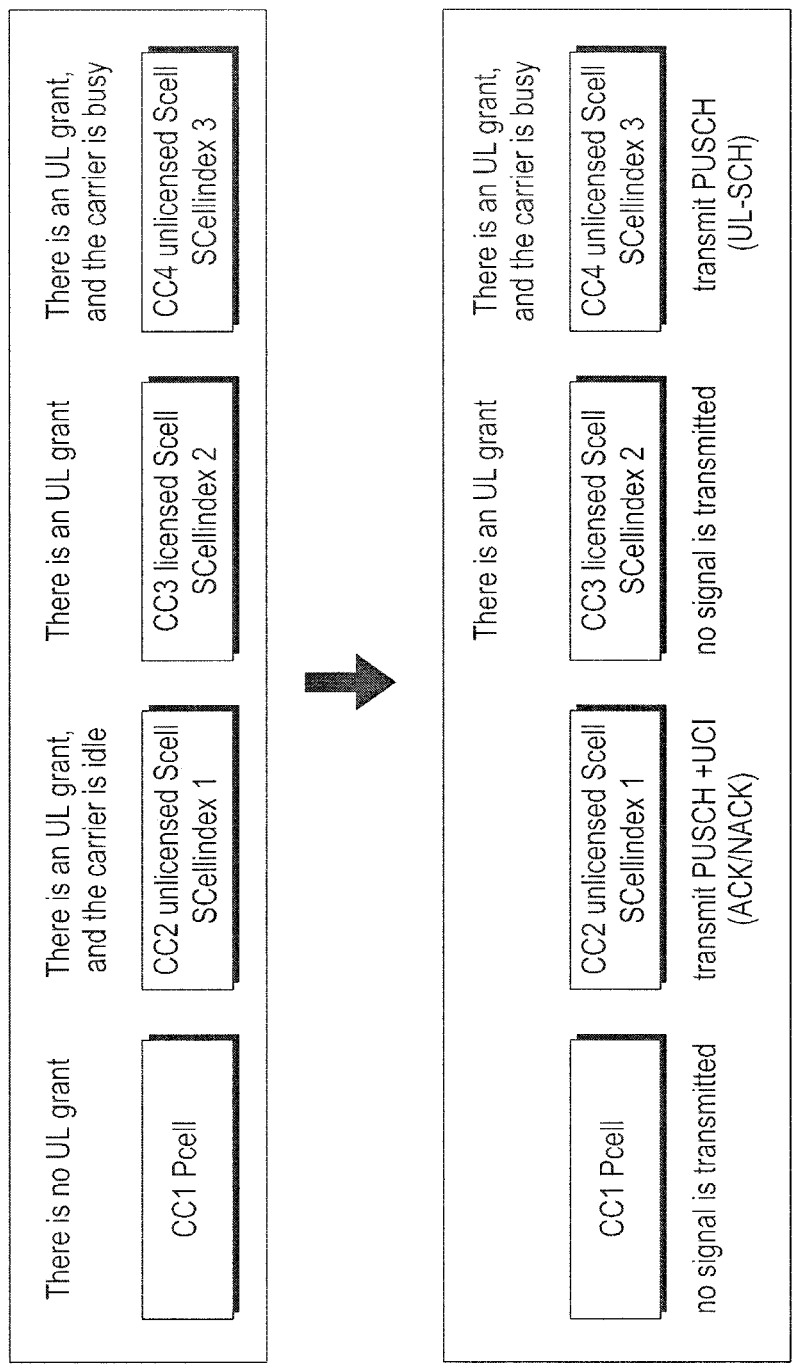
FIG. 15 is a schematic diagram illustrating a first example of a third manner in a first method according to a second embodiment of the present invention.

In a first way, the ACK/NACK is carried on the PUSCH on the uplink carrier with the smallest SCellIndex in the unlicensed spectrum, as shown in FIG. 15. FIG. 15 is a schematic diagram illustrating a first example of a third manner in a first method according to a second embodiment of the present invention.

Figure 16:
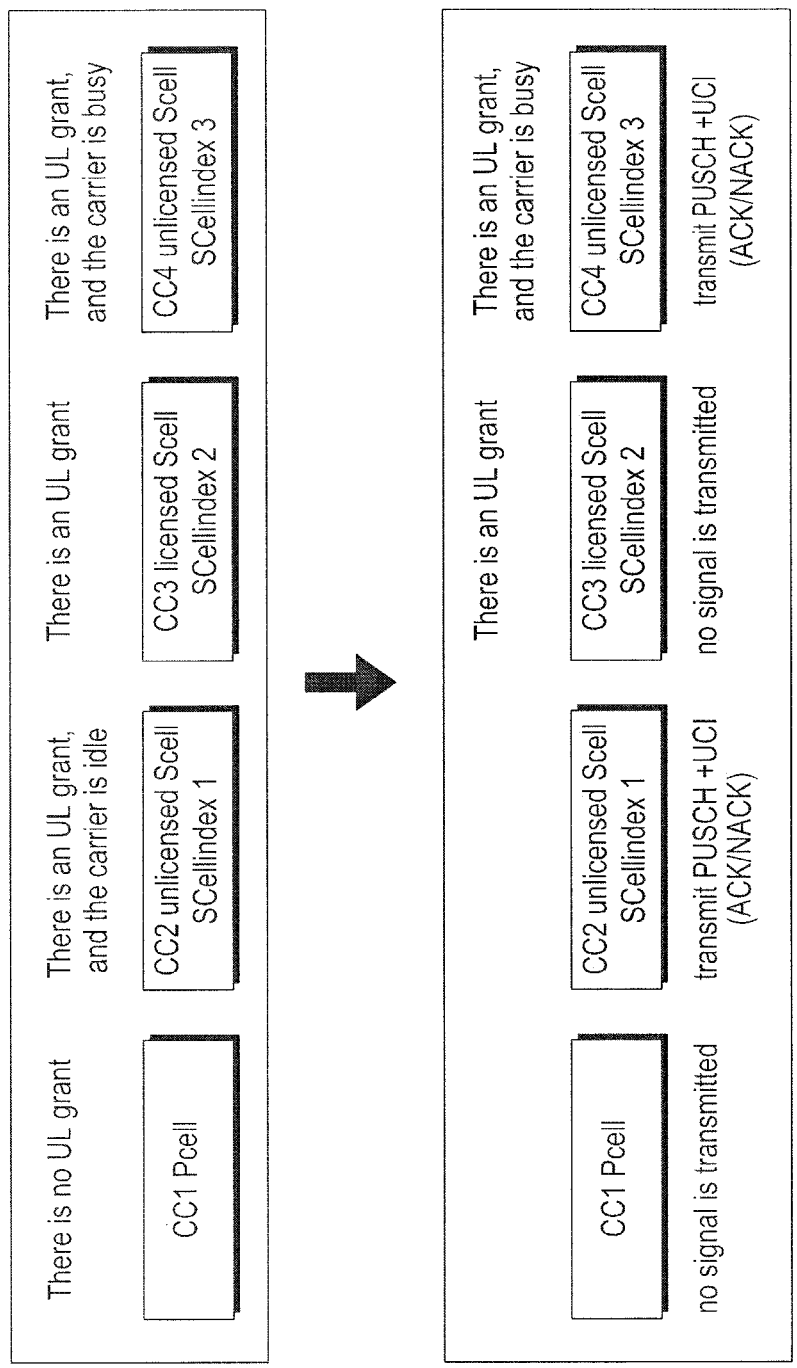
FIG. 16 is a schematic diagram illustrating a second example of a third manner in a first method according to a second embodiment of the present invention.

In a second way, the ACK/NACK is carried in each PUSCH transmitted in the unlicensed spectrum, as shown in FIG. 16. FIG. 16 is a schematic diagram illustrating a second example of a third manner in a first method according to a second embodiment of the present invention. The ACK/NACK carried in each PUSCH transmitted in the unlicensed spectrum may be generated through a same modulation encoding rate matching processing, or may be generated through different modulation encoding rate matching processings from each other.

A rate matching factor $\beta_{offset}^{HARQ-ACK}$ used to transmit the ACK/NACK in the unlicensed spectrum may be different from a rate matching factor used to transmit the ACK/NACK in the licensed spectrum.

In the third manner, the base station may preferably schedule the PUSCH on the licensed spectrum in a subframe where the ACK/NACK may be fed back so as to reduce an occurrence probability of the first way or the second way.

At block 1102b, the UE transmits the PUCCH on the Pcell or the sPcell to carry the ACK/NACK.

Figure 17:
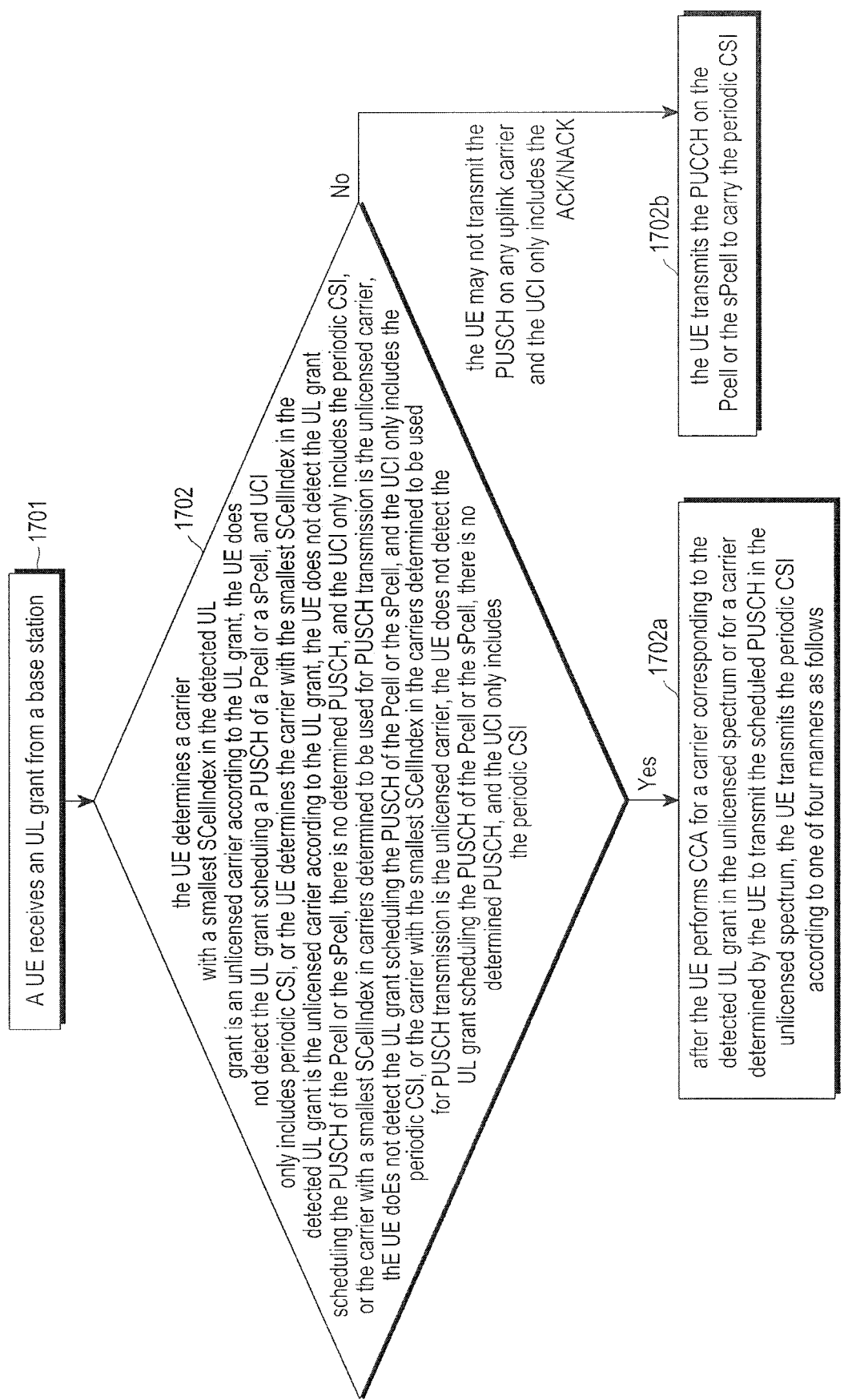
FIG. 17 is a flowchart illustrating an uplink control information transmitting second method according to a second embodiment of the present application.

FIG. 17 is a flowchart illustrating an uplink control information transmitting second method according to a second embodiment of the present application. As shown in FIG. 17, the second method includes procedures as follow.

At block 1701, the UE receives an UL grant from a base station.

In this block, the UE detects the UL grant transmitted from the base station.

At block 1702, if the UE determines a carrier with a smallest SCellIndex in the detected UL grant is an unlicensed carrier according to the UL grant, the UE does not detect the UL grant scheduling a PUSCH of a Pcell or a sPcell, and UCI only includes periodic CSI, or if the UE determines the carrier with the smallest SCellIndex in the detected UL grant is the unlicensed carrier according to the UL grant, the UE does not detect the UL grant scheduling the PUSCH of the Pcell or the sPcell, there is no determined PUSCH, and the UCI only includes the periodic CSI, or if the carrier with a smallest SCellIndex in carriers determined to be used for PUSCH transmission is the unlicensed carrier, the UE does not detect the UL grant scheduling the PUSCH of the Pcell or the sPcell, and the UCI only includes the periodic CSI, or if the carrier with the smallest SCellIndex in the carriers determined to be used for PUSCH transmission is the unlicensed carrier, the UE does not detect the UL grant scheduling the PUSCH of the Pcell or the sPcell, there is no determined PUSCH, and the UCI only includes the periodic CSI, procedures in block 1702a are performed. If the UE may not transmit the PUSCH on any uplink carrier, procedures in block 1702b are performed.

In this block, for example, when there is neither non-adaptive retransmission nor SPS transmission on the PUSCH in subframe n+k, there is no determined PUSCH.

In this block, for example, when there is the non-adaptive retransmission or the SPS transmission on the PUSCH in subframe n+k, there is the determined PUSCH.

At block 1702a, after the UE performs CCA for a carrier corresponding to the detected UL grant in the unlicensed spectrum or for a carrier determined by the UE to transmit the scheduled PUSCH in the unlicensed spectrum, the UE transmits the periodic CSI according to one of four manners as follows.

In a first manner, the UE transmits the periodic CSI carried on the PUCCH on the Pcell or the sPcell.

In a second manner, the UE transmits the scheduled PUSCH and the periodic CSI in a licensed spectrum, and transmits the scheduled PUSCH on an idle carrier in the unlicensed spectrum; when there is no scheduled PUSCH in the licensed spectrum, the UE transmits the periodic CSI carried on the PUCCH on the Pcell or the sPcell, or the UE does not transmits the periodic CSI.

In a third manner, the UE transmits the scheduled PUSCH and the periodic CSI in the licensed spectrum, and transmits the scheduled PUSCH on an idle carrier in the unlicensed spectrum; when there is no scheduled PUSCH in the licensed spectrum, the UE transmits the scheduled PUSCH and the periodic CSI on the idle carrier in the unlicensed spectrum.

In a fourth manner, the UE transmits the scheduled PUSCH and the periodic CSI on the idle carrier in the unlicensed spectrum, and transmits the scheduled PUSCH in the licensed spectrum.

In this present invention, the PUCCH may have a newly-defined PUCCH format, e.g., an existing PUSCH format. For example, a convolutional code and Cyclical Redundancy Check (CRC) are used, and time-frequency mapping is in accordance with an existing PUSCH time-frequency mapping rule. However, PUSCH resource is not determined according to real-time UL grant. In particular, the PUSCH resource is calculated according to a preset rule, or is configured through a higher layer signalling. The PUCCH in the present invention is still called as PUCCH. Alternatively, the PUCCH may be based on an existing PUCCH signal structure, but may have a newly-defined PUCCH format. Alternatively, a PUCCH format in existing specifications may be reused, e.g., PUCCH format 2a/2b/3.

The four manners above are described in detail as follows.

In the first manner, the UE transmits the periodic CSI carried on the PUCCH on the Pcell or the sPcell. In particular, the first manner may be performed as follows.

Figure 18:
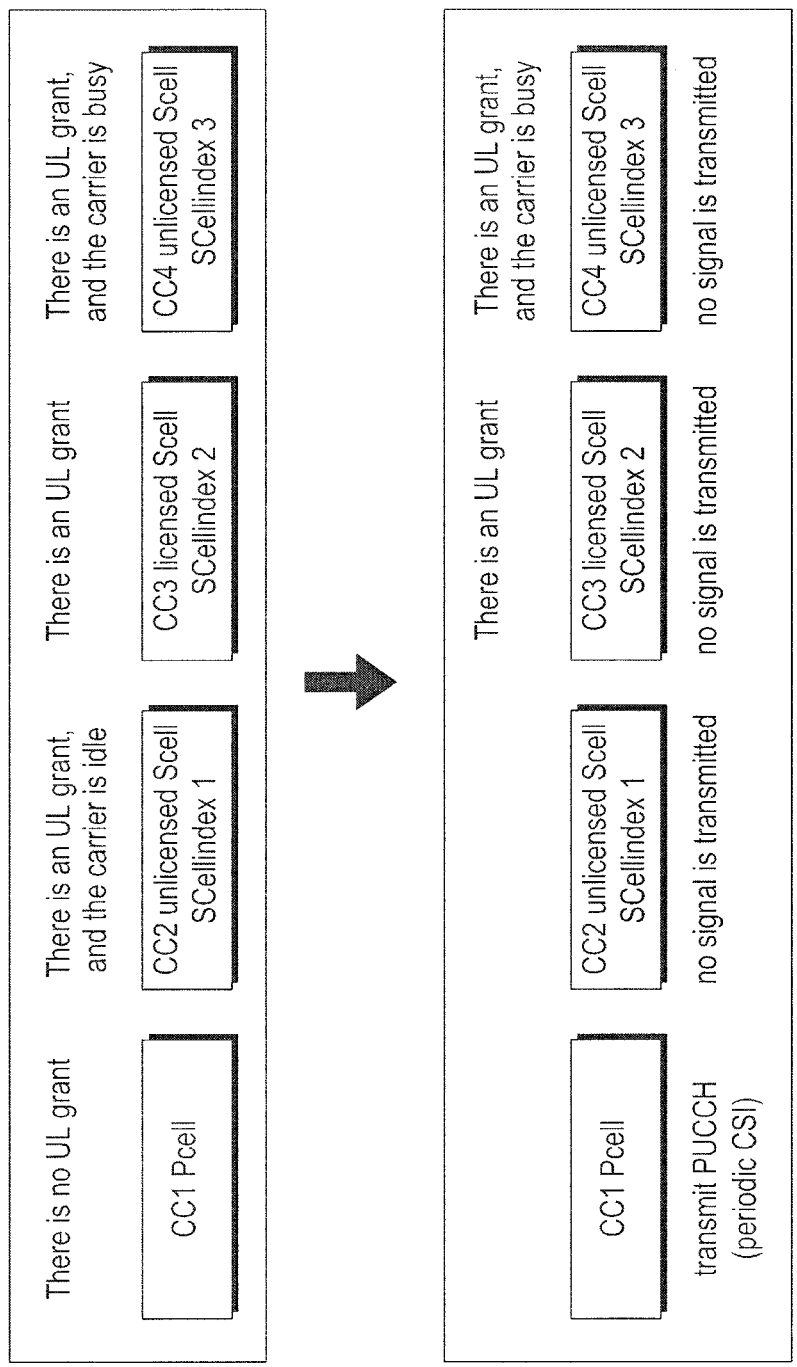
FIG. 18 is a schematic diagram illustrating an example of a first manner in a second method according to a second embodiment of the present invention.

FIG. 18 is a schematic diagram illustrating an example of a first manner in a second method according to a second embodiment of the present invention. As shown in FIG. 18, the UE transmits the periodic CSI carried on the PUCCH on the Pcell or the sPcell, and simultaneously discards PUSCH transmission on all other carriers.

In the second manner, the UE transmits the scheduled PUSCH and the periodic CSI in a licensed spectrum, and transmits the scheduled PUSCH on an idle carrier in the unlicensed spectrum; when there is no scheduled PUSCH in the licensed spectrum, the UE transmits the periodic CSI carried on the PUCCH on the Pcell or the sPcell, or the UE does not transmits the periodic CSI. In particular, the second manner may be performed as follows.

Figure 19:
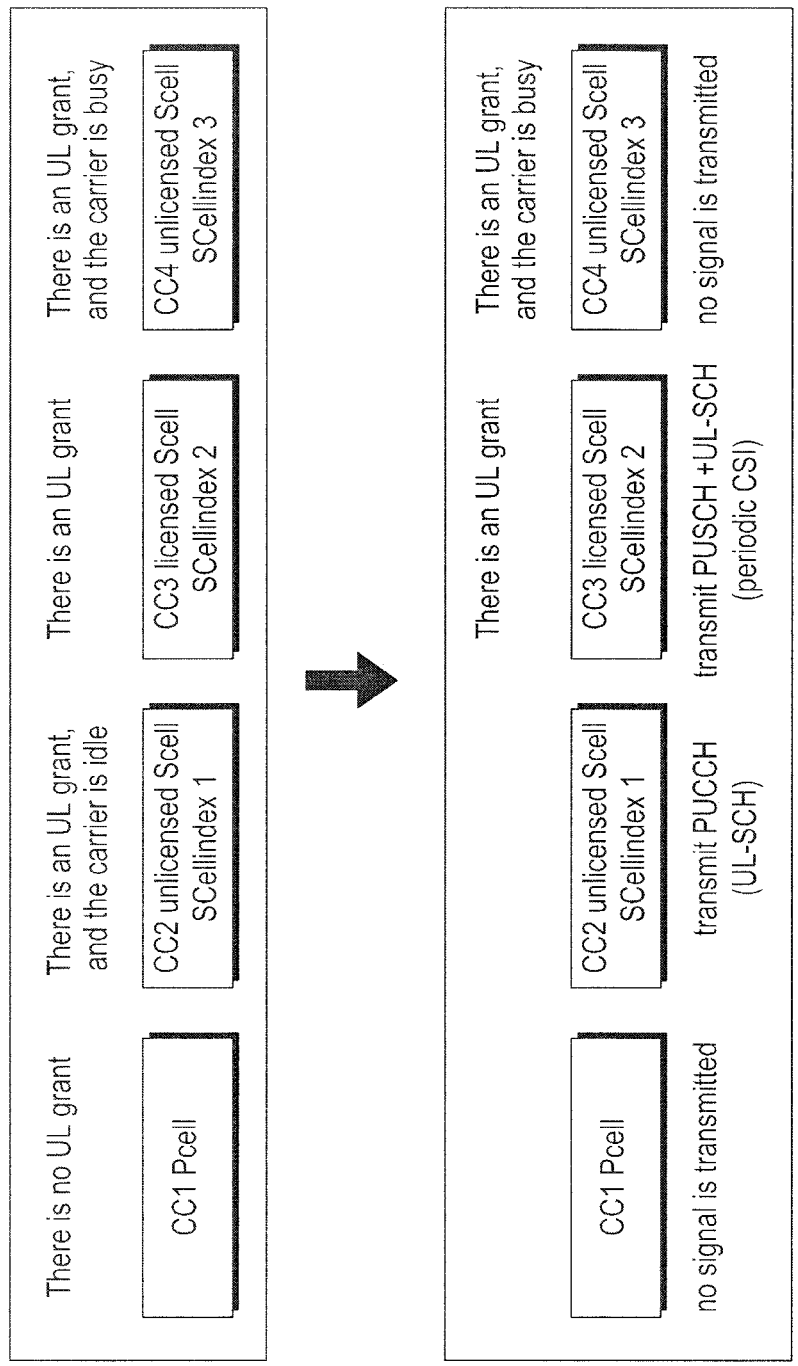
FIG. 19 is a schematic diagram illustrating an example of a second manner in a second method according to a second embodiment of the present invention.

FIG. 19 is a schematic diagram illustrating an example of a second manner in a second method according to a second embodiment of the present invention. As shown in FIG. 19, when the periodic CSI is carried on the PUSCH, the PUSCH carrying the periodic CSI is only transmitted on the carrier in the licensed spectrum, wherein the carrier on which the PUSCH is transmitted has the smallest SCellIndex in carriers in the licensed spectrum.

When there is no PUSCH transmission in the licensed spectrum, the UE does not transmits the periodic CSI, or the UE transmits the periodic CSI carried on the PUCCH on the Pcell or the sPcell.

In this manner, even if SCellIndex of an uplink carrier used for transmission in the unlicensed spectrum is smaller than SCellIndex of any uplink carrier used for transmission in the licensed spectrum, the PUSCH on the uplink carrier with the smallest SCellIndex in the licensed spectrum is still selected to carry the periodic CSI.

When there is no PUSCH transmission in the licensed spectrum, this manner may be implemented according to two ways are as follows.

In a first way, the periodic CSI is not transmitted, and the PUSCH only including the UL-SCH is transmitted on a scheduled idle unlicensed carrier.

In a second way, the periodic CSI is carried on the PUCCH on the Pcell or the sPcell, and no PUSCH is transmitted on any carrier.

The base station may preferably schedule the PUSCH on the licensed spectrum in a subframe where the periodic CSI may be fed back so as to reduce an occurrence probability of the first way or the second way.

In the third manner, the UE transmits the scheduled PUSCH and the periodic CSI in the licensed spectrum, and transmits the scheduled PUSCH on an idle carrier in the unlicensed spectrum; when there is no scheduled PUSCH in the licensed spectrum, the UE transmits the scheduled PUSCH and the periodic CSI on the idle carrier in the unlicensed spectrum. In particular, the third manner may be performed as follows.

Figure 20:
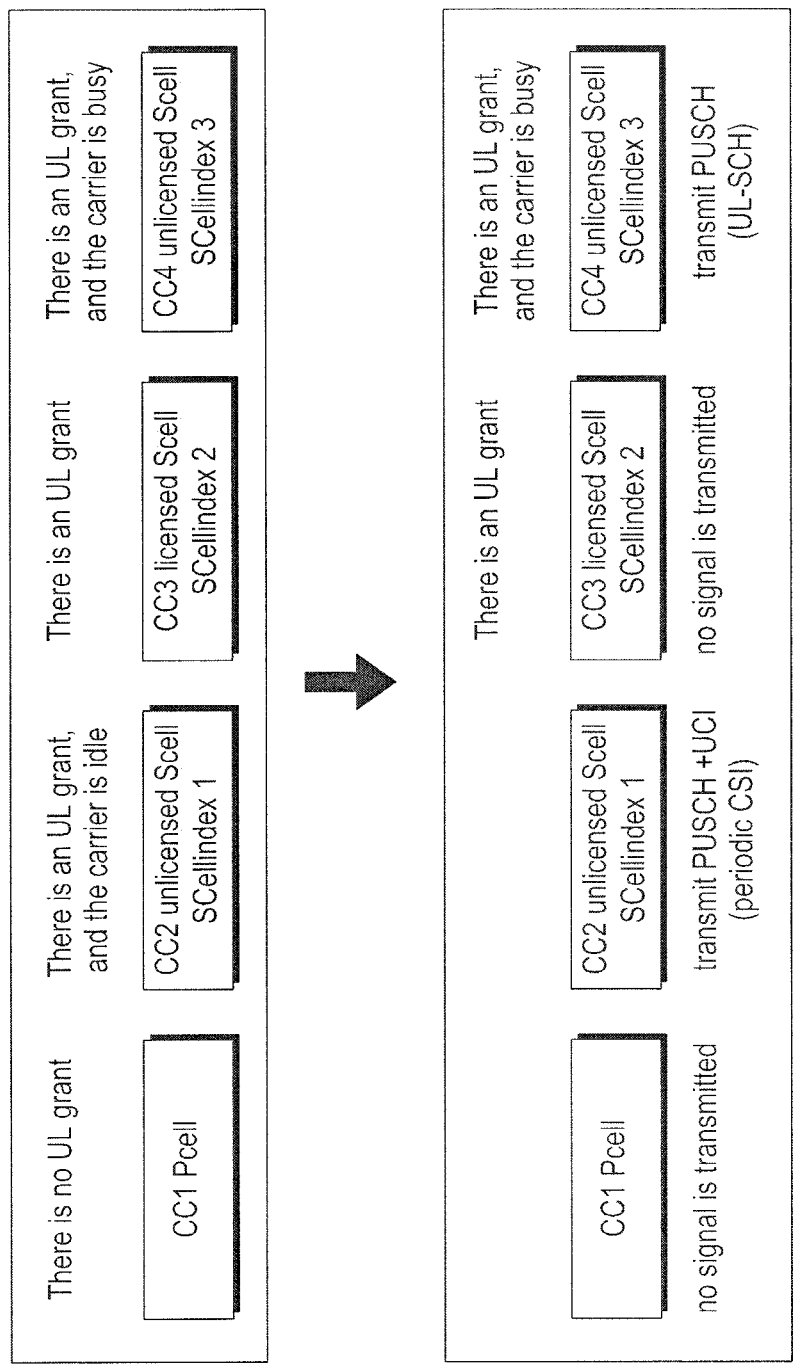
FIG. 20 is a schematic diagram illustrating a first example of a third manner in a second method according to a second embodiment of the present invention.
Figure 21:
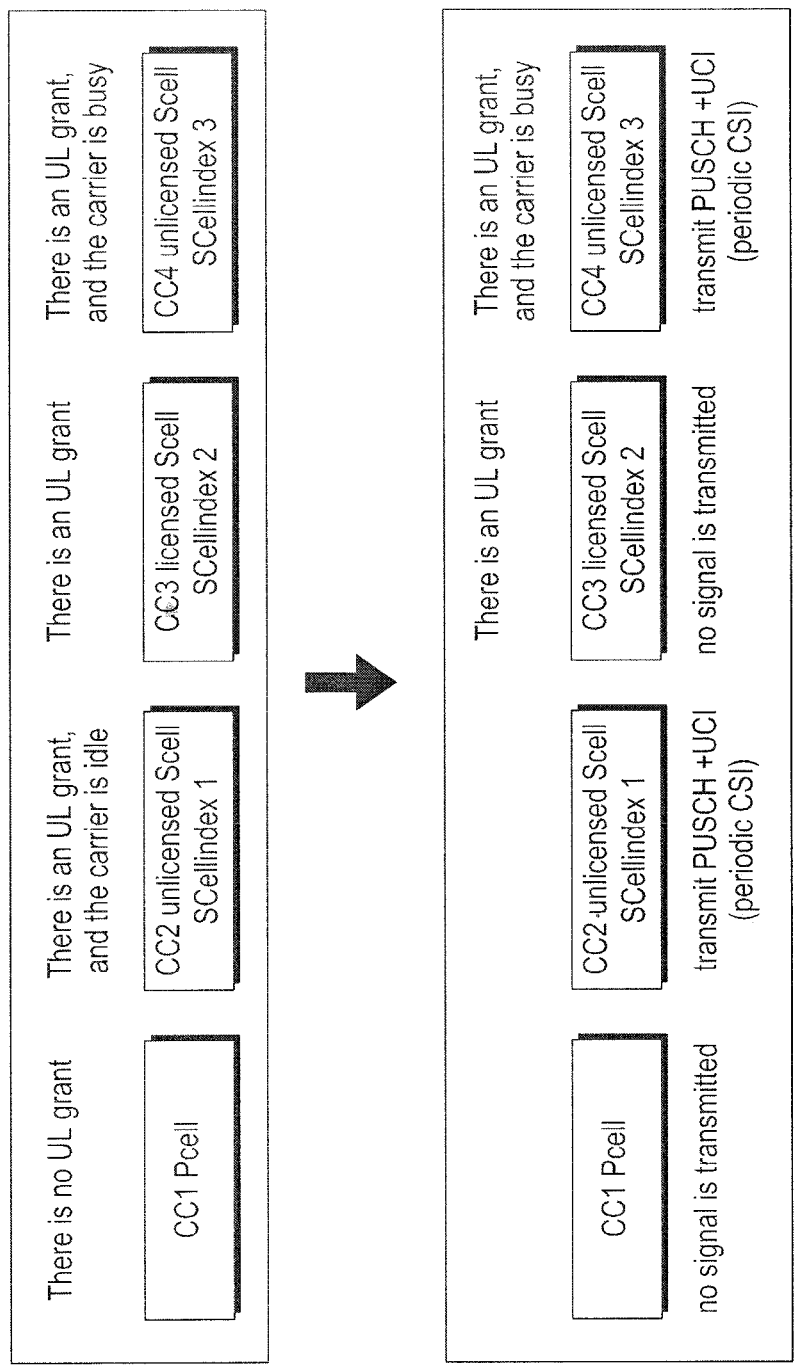
FIG. 21 is a schematic diagram illustrating a second example of a third manner in a second method according to a second embodiment of the present invention.

The periodic CSI is preferably carried on the PUSCH transmitted on the carrier in the licensed spectrum, wherein the carrier on which the PUSCH is transmitted has the smallest SCellIndex in carriers in the licensed spectrum. When there is no PUSCH transmission in the licensed spectrum, the periodic CSI is carried on the PUSCH transmitted in the unlicensed spectrum according to a preset rule. For example, FIG. 20 is a schematic diagram illustrating a first example of a third manner in a second method according to a second embodiment of the present invention. In a condition as shown in FIG. 20, the periodic CSI is carried on the PUSCH transmitted on the uplink carrier with the smallest SCellIndex in the unlicensed spectrum. FIG. 21 is a schematic diagram illustrating a second example of a third manner in a second method according to a second embodiment of the present invention. In another condition as shown in FIG. 21, the period CSI is carried on PUSCHs transmitted on all carriers or pre-configured carriers in the unlicensed spectrum, wherein the periodic CSI carried on a PUSCH transmitted on each of all the carriers or the pre-configured carriers in the unlicensed spectrum may be generated through performing a same modulation-encoding-rate-matching processing for the original periodic CSI, or may be generated through performing different modulation-encoding-rate-matching processings for the original periodic CSI. When the periodic CSI is carried on the PUSCH in the unlicensed spectrum, the PUSCH in the unlicensed spectrum further carries indication information to indicate on which carrier the PUSCH carries the periodic CSI. Detail methods are similar as the four manners in the fourth method in the first embodiment, which are not described repeatedly.

The base station may preferably schedule the PUSCH on the licensed spectrum in a subframe where the periodic CSI may be fed back so as to reduce an occurrence probability of the first condition.

In the fourth manner, the UE transmits the scheduled PUSCH and the periodic CSI on the idle carrier in the unlicensed spectrum, and transmits the scheduled PUSCH in the licensed spectrum. In particular, the fourth manner may be performed as follows.

Figure 22:
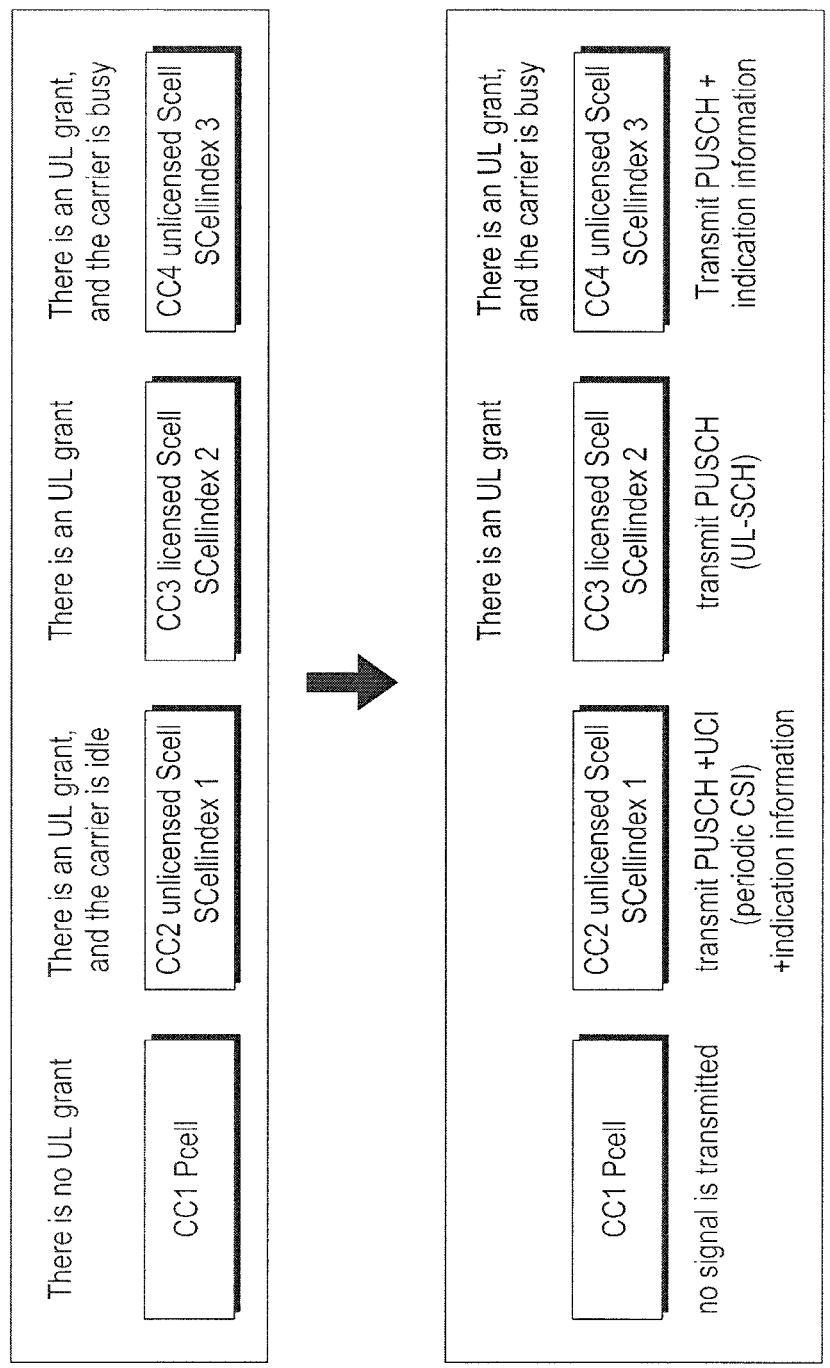
FIG. 22 is a schematic diagram illustrating an example of a fourth manner in a second method according to a second embodiment of the present invention.

FIG. 22 is a schematic diagram illustrating an example of a fourth manner in a second method according to a second embodiment of the present invention. As shown in FIG. 22, the periodic CSI is carried on the PUSCH transmitted on an uplink carrier with the smallest SCellIndex in uplink carriers used for transmission. The PUSCH may further carry indication information to indicate on which carrier the PUSCH carries the periodic CSI.

The PUSCH on the uplink carrier with the smallest SCellIndex in carriers used for transmission is selected to carry the periodic CSI, wherein it is not distinguished whether the uplink carrier is in the unlicensed spectrum. When the periodic CSI is carried on the PUSCH in the unlicensed spectrum, the PUSCH in the unlicensed spectrum further carries the indication information to indicate on which carrier the PUSCH carries the periodic CSI. In particular, detail methods are similar as the four manners in the fourth method in a first embodiment, which are not described repeatedly.

The base station may allocate a small SCellIndex for a carrier in the licensed spectrum, may allocate a large SCellIndex for a carrier in the unlicensed spectrum, and may preferably schedule the PUSCH on the licensed spectrum in a subframe where the periodic CSI may be fed back so as to reduce an occurrence probability of the condition that it is not distinguished whether the uplink carrier carrying the periodic CSI is in the unlicensed spectrum.

At block 1702b, the UE transmits the PUCCH on the Pcell or the sPcell to carry the periodic CSI.

Figure 23:
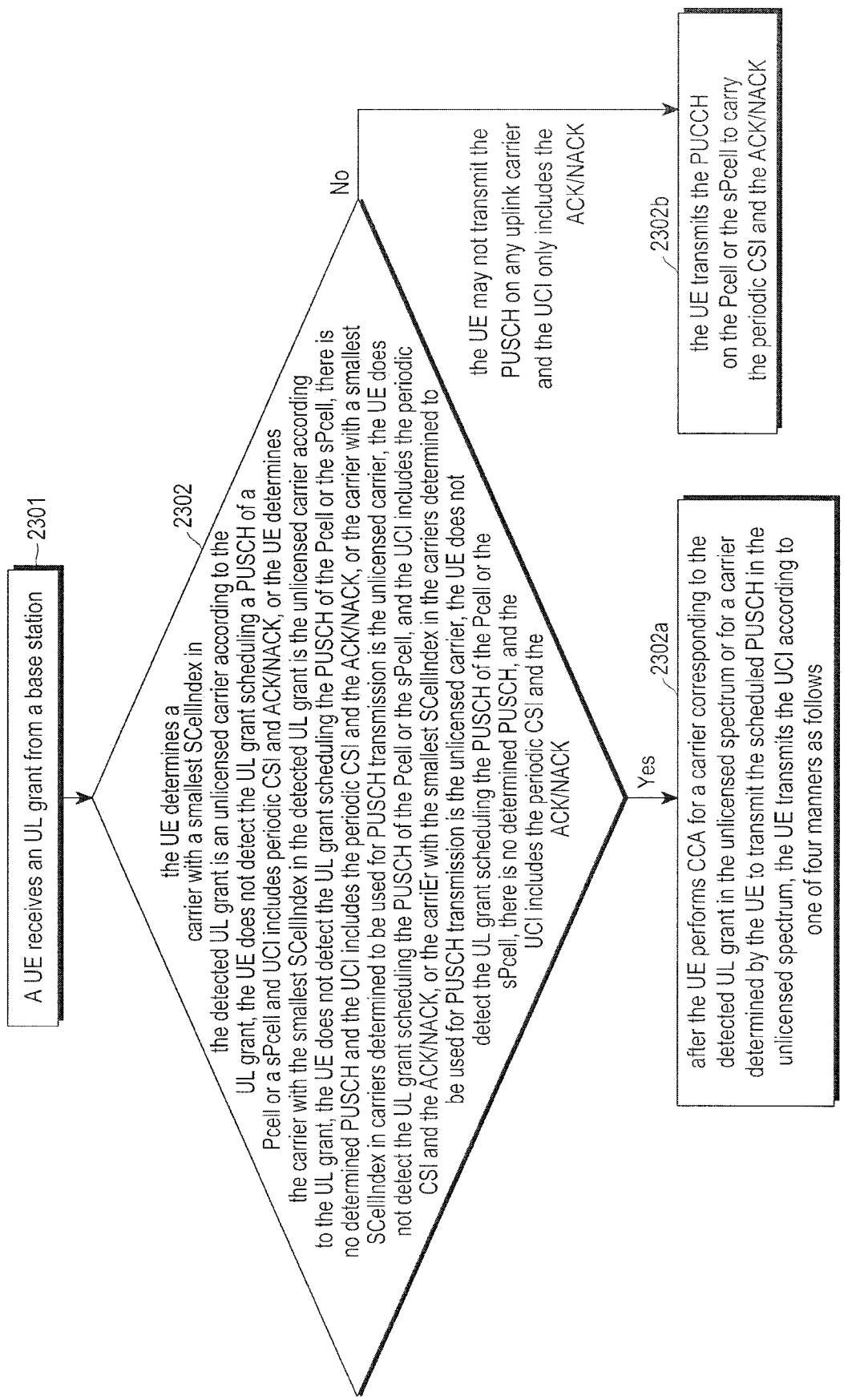
FIG. 23 is a flowchart illustrating an uplink control information transmitting third method according to a second embodiment of the present application.

FIG. 23 is a flowchart illustrating an uplink control information transmitting third method according to a second embodiment of the present application. As shown in FIG. 23, the third method includes procedures as follow.

At block 2301, the UE receives an UL grant from a base station.

In this block, the UE detects the UL grant transmitted from the base station.

At block 2302, if the UE determines a carrier with a smallest SCellIndex in the detected UL grant is an unlicensed carrier according to the UL grant, the UE does not detect the UL grant scheduling a PUSCH of a Pcell or a sPcell and UCI includes periodic CSI and ACK/NACK, or if the UE determines the carrier with the smallest SCellIndex in the detected UL grant is the unlicensed carrier according to the UL grant, the UE does not detect the UL grant scheduling the PUSCH of the Pcell or the sPcell, there is no determined PUSCH and the UCI includes the periodic CSI and the ACK/NACK, or if the carrier with a smallest SCellIndex in carriers determined to be used for PUSCH transmission is the unlicensed carrier, the UE does not detect the UL grant scheduling the PUSCH of the Pcell or the sPcell, and the UCI includes the periodic CSI and the ACK/NACK, or if the carrier with the smallest SCellIndex in the carriers determined to be used for PUSCH transmission is the unlicensed carrier, the UE does not detect the UL grant scheduling the PUSCH of the Pcell or the sPcell, there is no determined PUSCH, and the UCI includes the periodic CSI and the ACK/NACK, procedures in block 2302a are performed. If the UE may not transmit the PUSCH on any uplink carrier and the UCI includes the periodic CSI and the ACK/NACK, procedures in block 2302b are performed.

In this block, for example, when there is neither non-adaptive retransmission nor SPS transmission on the PUSCH in subframe n+k, there is no determined PUSCH.

In this block, for example, when there is the non-adaptive retransmission or the SPS transmission on the PUSCH in subframe n+k, there is the determined PUSCH.

At block 2302a, after the UE performs CCA for a carrier corresponding to the detected UL grant in the unlicensed spectrum or for a carrier determined by the UE to transmit the scheduled PUSCH in the unlicensed spectrum, the UE transmits the UCI according to one of four manners as follows.

In a first manner, the UE transmits the UCI carried on the PUCCH on the Pcell or the sPcell, wherein the UCI includes the periodic CSI and the ACK/NACK.

In a second manner, the UE transmits the scheduled PUSCH and the UCI in the licensed spectrum, and transmits the scheduled PUSCH on an idle carrier in the unlicensed spectrum, wherein the UCI includes the periodic CSI and the ACK/NACK; when there is no scheduled PUSCH in the licensed spectrum, the UE does not transmit the periodic CSI and the ACK/NACK, or the UE transmits the periodic CSI and the ACK/NACK carried on the PUCCH on the Pcell or the sPcell.

In a third manner, the UE transmits the scheduled PUSCH and the UCI in the licensed spectrum, and transmits the scheduled PUSCH on an idle carrier in the unlicensed spectrum, wherein the UCI includes the periodic CSI and the ACK/NACK; when there is no scheduled PUSCH in the licensed spectrum, the UE transmits the scheduled PUSCH and the UCI on the idle carrier in the unlicensed spectrum, wherein the UCI includes the periodic CSI and the ACK/NACK.

In a fourth manner, the UE transmits the scheduled PUSCH and the UCI on the idle carrier in the unlicensed spectrum, wherein the UCI includes the periodic CSI and the ACK/NACK.

In this present invention, the PUCCH may have a newly-defined PUCCH format, e.g., an existing PUSCH format. For example, a convolutional code and Cyclical Redundancy Check (CRC) are used, and time-frequency mapping is in accordance with an existing PUSCH time-frequency mapping rule. However, PUSCH resource is not determined according to real-time UL grant. In particular, the PUSCH resource is calculated according to a preset rule, or is configured through a higher layer signalling. The PUCCH in the present invention is still called as PUCCH. Alternatively, the PUCCH may be based on an existing PUCCH signal structure, but may have a newly-defined PUCCH format. Alternatively, a PUCCH format in existing specifications may be reused, e.g., PUCCH format 2a/2b/3.

The four manners above are described in detail as follows.

In the first manner, the UE transmits the UCI carried on the PUCCH on the Pcell or the sPcell. In particular, the first manner may be performed as follows.

Figure 24:
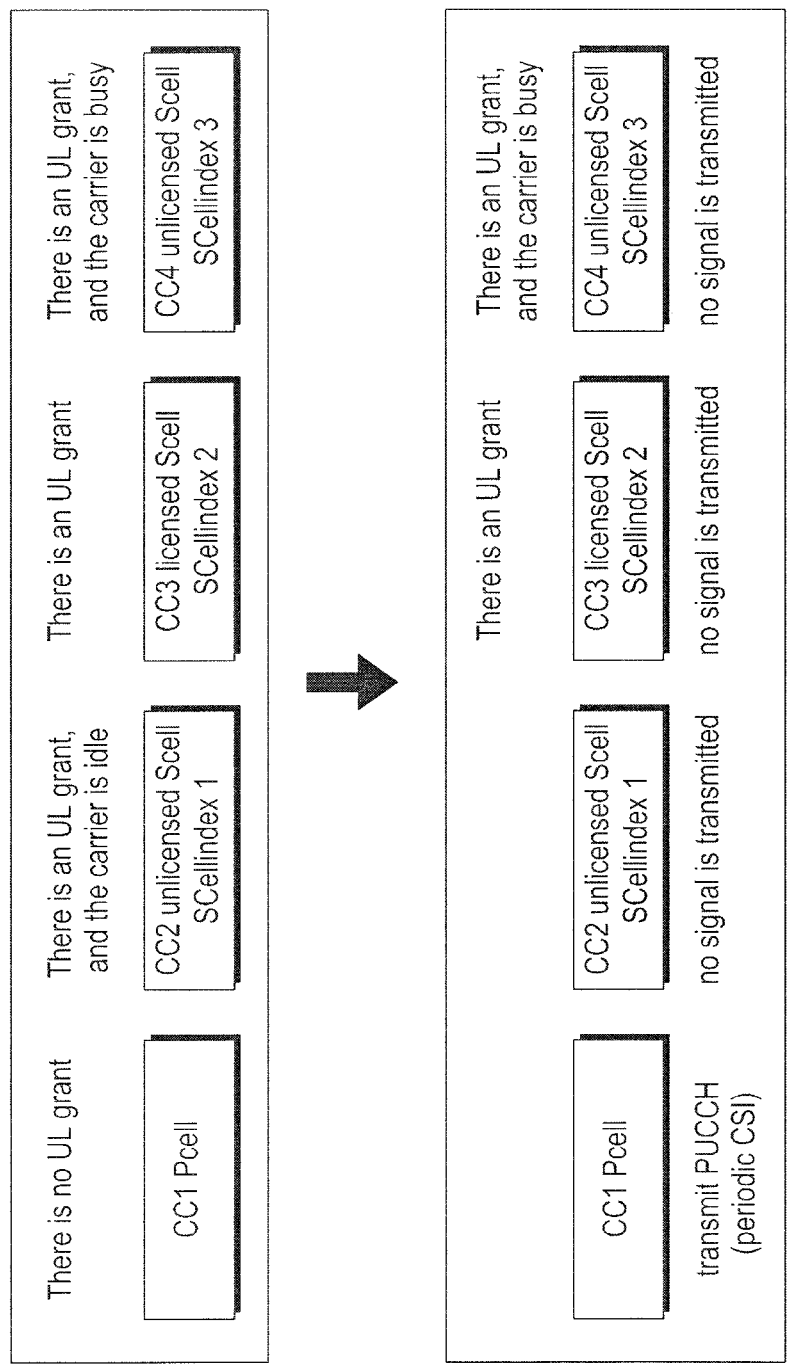
FIG. 24 is a schematic diagram illustrating an example of a first manner in a third method according to a second embodiment of the present invention.

FIG. 24 is a schematic diagram illustrating an example of a first manner in a third method according to a second embodiment of the present invention. As shown in FIG. 24, the UE transmits the periodic CSI and the ACK/NACK carried on the PUCCH on the Pcell or the sPcell, and simultaneously discards PUSCH transmission on all other carriers.

In the second manner, the UE transmits the scheduled PUSCH and the UCI in the licensed spectrum, and transmits the scheduled PUSCH on an idle carrier in the unlicensed spectrum; when there is no scheduled PUSCH in the licensed spectrum, the UE does not transmit the periodic CSI and the ACK/NACK, or the UE transmits the periodic CSI and the ACK/NACK carried on the PUCCH on the Pcell or the sPcell. In particular, the second manner may be performed as follows.

When the periodic CSI and the ACK/NACK are carried on the PUSCH, the PUSCH carrying the periodic CSI and the ACK/NACK is only transmitted on the carrier in the licensed spectrum, wherein the carrier on which the PUSCH is transmitted has the smallest SCellIndex in carriers in the licensed spectrum.

When there is no PUSCH transmission in the licensed spectrum, there are two conditions as follows.

In a first condition, the periodic CSI and the ACK/NACK are not transmitted, and the PUSCH only including the UL-SCH is transmitted on a scheduled idle unlicensed carrier.

In a second condition, the UE transmits the periodic CSI and the ACK/NACK carried on the PUCCH on the Pcell or the sPcell, and simultaneously discards PUSCH transmission on all other carriers.

In the third manner, the UE transmits the scheduled PUSCH and the UCI in the licensed spectrum, and transmits the scheduled PUSCH on an idle carrier in the unlicensed spectrum, wherein the UCI includes the periodic CSI and the ACK/NACK; when there is no scheduled PUSCH in the licensed spectrum, the UE transmits the scheduled PUSCH and the UCI on the idle carrier in the unlicensed spectrum. In particular, the third manner may be performed as follows.

The periodic CSI and the ACK/NACK are preferably carried on the PUSCH transmitted on the carrier in the licensed spectrum, wherein the carrier on which the PUSCH is transmitted has the smallest SCellIndex in carriers in the licensed spectrum.

When there is no PUSCH transmission in the licensed spectrum, the periodic CSI and/or the ACK/NACK may be transmitted according to three ways as follows.

In a first way, the ACK/NACK and the periodic CSI are carried on the PUSCH on the uplink carrier with the smallest SCellIndex in the unlicensed spectrum, or are carried on each PUSCH in the unlicensed spectrum. The periodic CSI and the ACK/NACK carried on each PUSCH in the unlicensed spectrum may be generated through performing a same modulation-encoding-rate-matching processing for the original periodic CSI and the original ACK/NACK, or may be generated through performing different modulation-encoding-rate-matching processings for the original periodic CSI and the original ACK/NACK. Rate matching factors $\beta_{offset}^{HARQ-ACK}$, $\beta_{offset}^{RI}$, $\beta_{offset}^{CQI}$ used to transmit the ACK/NACK in the unlicensed spectrum may be different from rate matching factors used to transmit the ACK/NACK in the licensed spectrum. The PUSCH may further carry indication information to indicate on which carrier the PUSCH carries the periodic CSI and the ACK/NACK.

Figure 25:
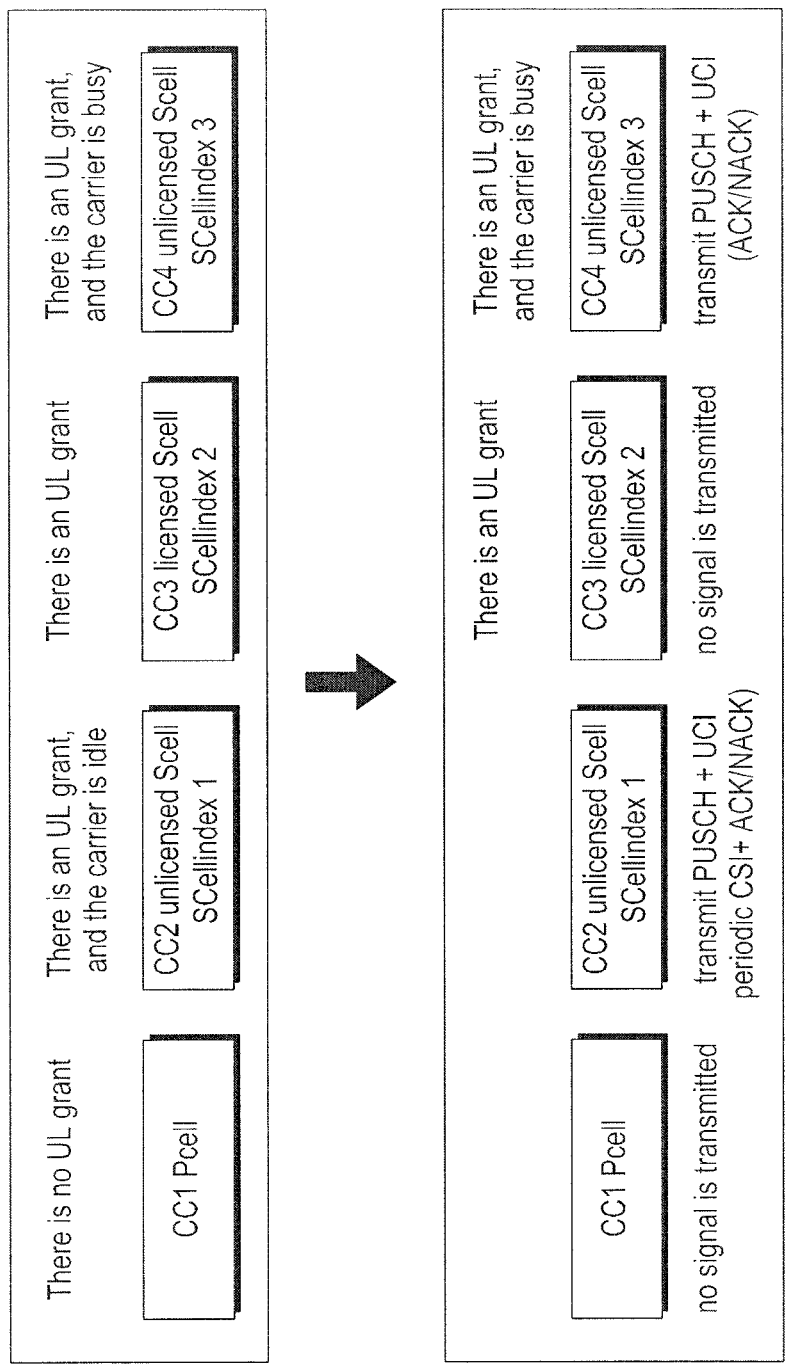
FIG. 25 is a schematic diagram illustrating a second example of a third manner in a third method according to a second embodiment of the present invention.

In a second way, the periodic CSI is carried on the PUSCH on the uplink carrier with the smallest SCellIndex in the unlicensed spectrum, and the ACK/NACK is carried on the PUSCH on each uplink carrier in the unlicensed spectrum; or the ACK/NACK is carried on the PUSCH on the uplink carrier with the smallest SCellIndex in the unlicensed spectrum, and the periodic CSI is carried on the PUSCH on each uplink carrier in the unlicensed spectrum. FIG. 25 is a schematic diagram illustrating a second example of a third manner in a third method according to a second embodiment of the present invention. The PUSCH may further carry indication information to indicate on which carrier the PUSCH carries the periodic CSI or the ACK/NACK.

Figure 26:
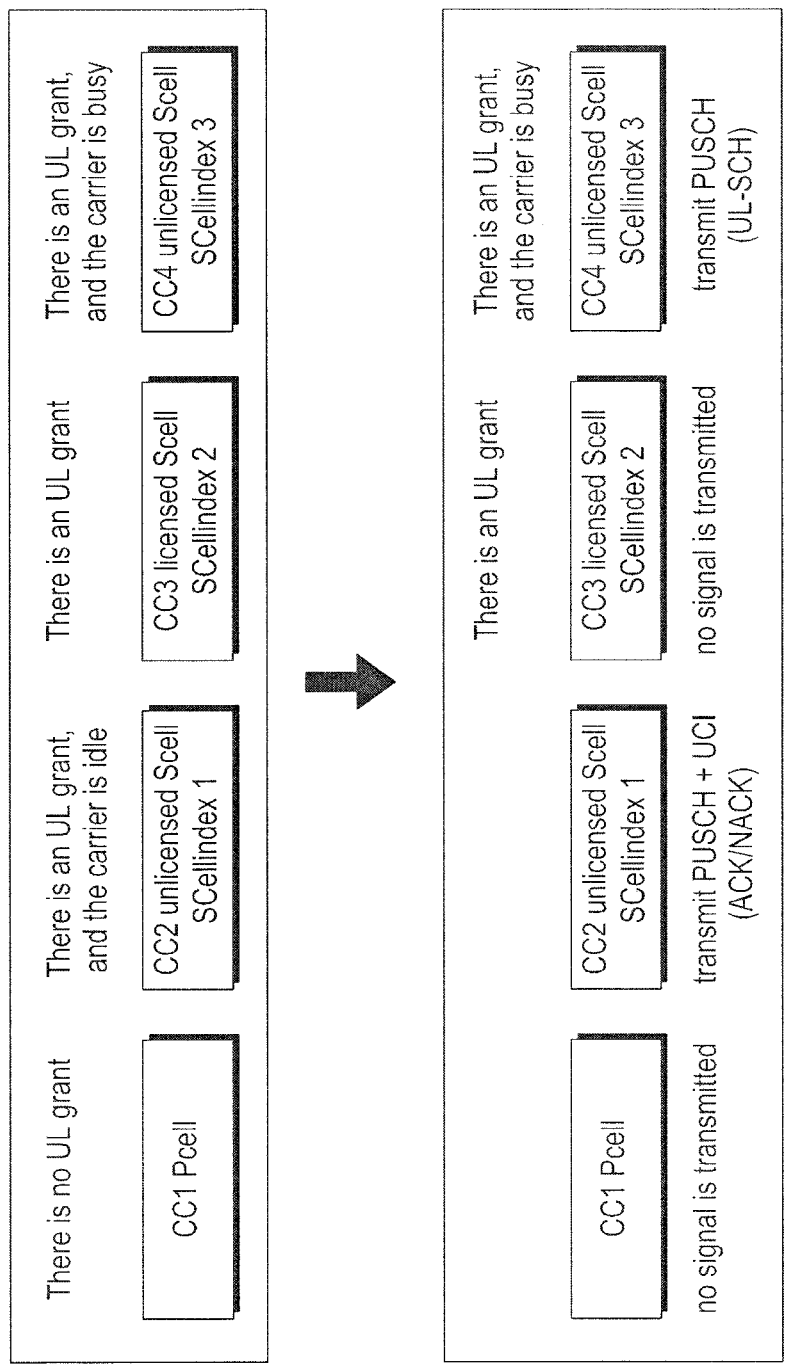
FIG. 26 is a schematic diagram illustrating a third example of a third manner in a third method according to a second embodiment of the present invention.

In a third way, the ACK/NACK is carried on the PUSCH on the uplink carrier with the smallest SCellIndex in the unlicensed spectrum, or is carried on the PUSCH transmitted on each uplink carrier in the unlicensed spectrum, but the periodic CSI transmission is discarded. FIG. 26 is a schematic diagram illustrating a third example of a third manner in a third method according to a second embodiment of the present invention.

In the fourth manner, the UE transmits the scheduled PUSCH and the UCI on the idle carrier in the unlicensed spectrum. In particular, the third manner may be performed as follows.

The periodic CSI and the ACK/NACK are carried on the PUSCH on the uplink carrier with the smallest SCellIndex in uplink carriers used for transmission. The PUSCH may further carry indication information to indicate on which carrier the PUSCH carries the periodic CSI.

At block 2302b, the UE transmits the PUCCH on the Pcell or the sPcell to carry the periodic CSI and the ACK/NACK.

Figure 27:
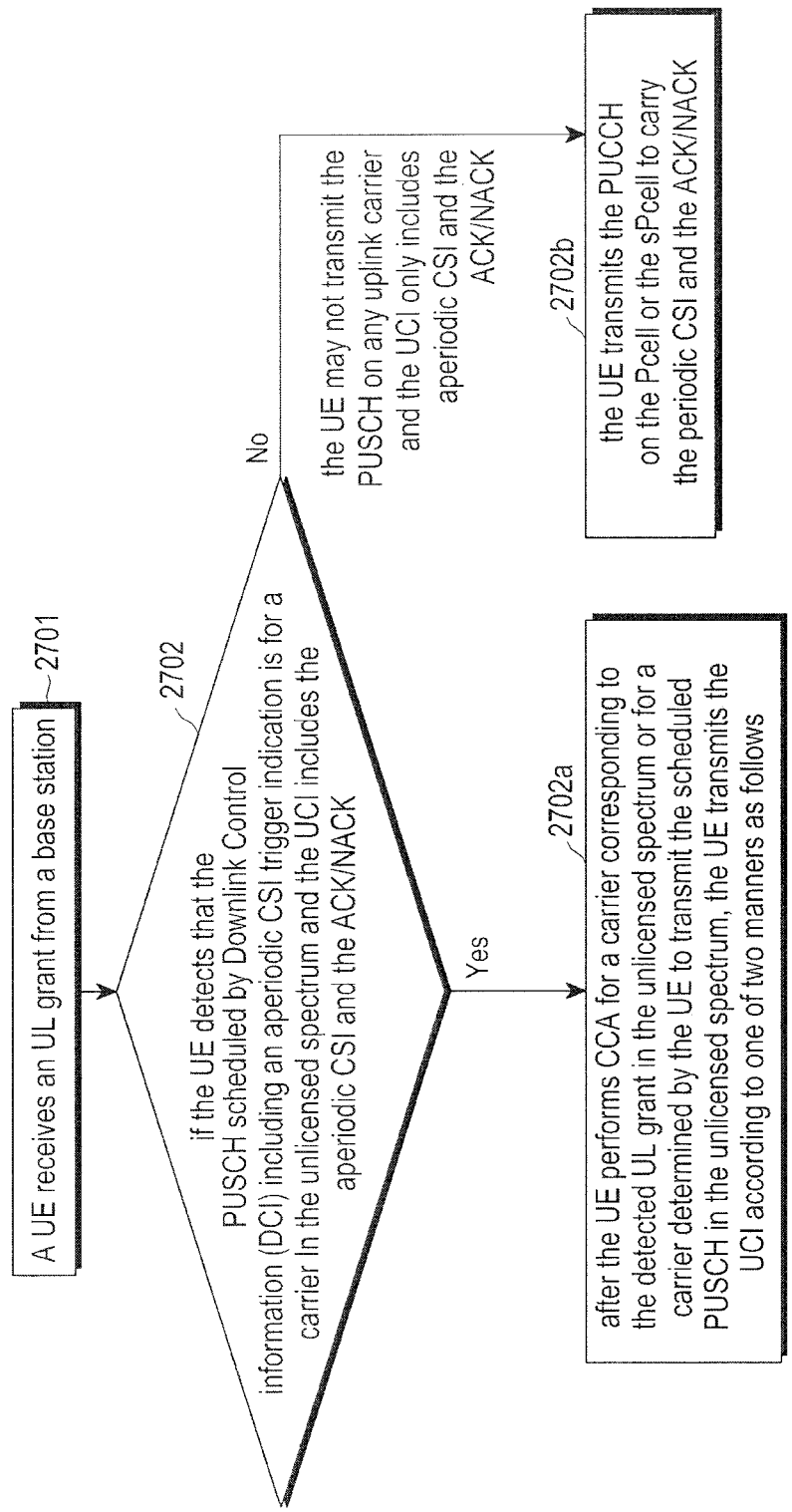
FIG. 27 is a flowchart illustrating an uplink control information transmitting fourth method according to a second embodiment of the present application.

FIG. 27 is a flowchart illustrating an uplink control information transmitting fourth method according to a second embodiment of the present application. As shown in FIG. 27, the fourth method includes procedures as follow.

At block 2701, the UE receives an UL grant from a base station.

In this block, the UE detects the UL grant transmitted from the base station.

At block 2702, if the UE detects that the PUSCH scheduled by Downlink Control Information (DCI) including an aperiodic CSI trigger indication is for a carrier in the unlicensed spectrum and the UCI includes the aperiodic CSI and the ACK/NACK, procedures at block 2702a are performed; If the UE may not transmit the PUSCH on any uplink carrier and the UCI only includes the aperiodic CSI and the ACK/NACK, procedures in block 2702b are performed.

At block 2702a, after the UE performs CCA for a carrier corresponding to the detected UL grant in the unlicensed spectrum or for a carrier determined by the UE to transmit the scheduled PUSCH in the unlicensed spectrum, the UE transmits the UCI according to one of two manners as follows.

Figure 28:
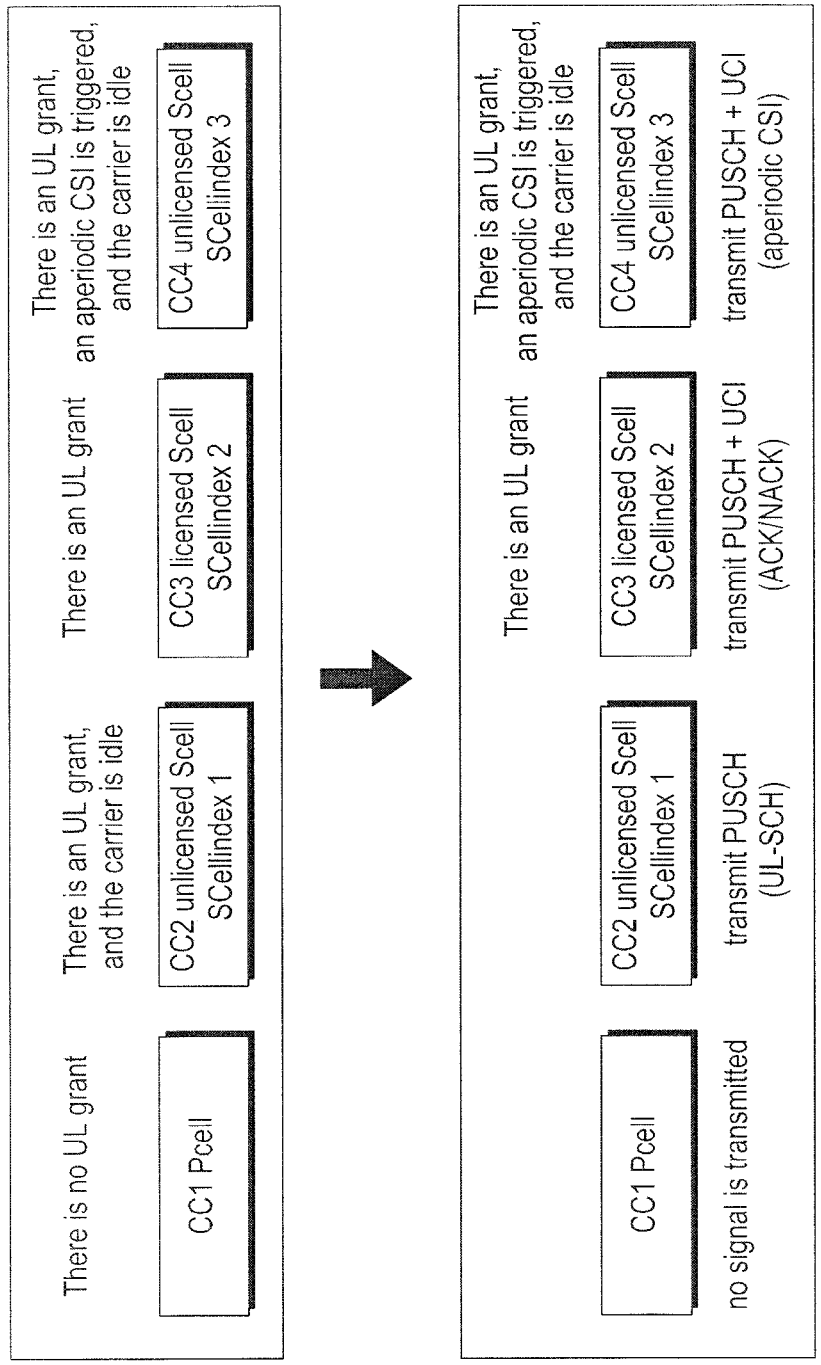
FIG. 28 is a schematic diagram illustrating an example of a first manner in a fourth method according to a second embodiment of the present invention.

In a first manner, the ACK/NACK is only carried on the PUSCH on a carrier in a licensed spectrum, wherein the carrier on which the PUSCH is transmitted has the smallest SCellIndex in carriers in the licensed spectrum. The aperiodic CSI is carried on the PUSCH scheduled by the DCI including the aperiodic CSI trigger indication. FIG. 28 is a schematic diagram illustrating an example of a first manner in a fourth method according to a second embodiment of the present invention. When there is no scheduled PUSCH in the licensed spectrum, the ACK/NACK is not transmitted, the scheduled PUSCH is transmitted in an idle carrier in the unlicensed spectrum, and the aperiodic CSI is carried on the PUSCH scheduled by the DCI including the aperiodic CSI trigger indication. Alternatively, when there is no scheduled PUSCH in the licensed spectrum, the ACK/NACK is carried on the PUCCH on the Pcell or the sPcell, and the UE simultaneously discards the PUSCH and aperiodic CSI to be transmitted on all other carriers.

Figure 29:
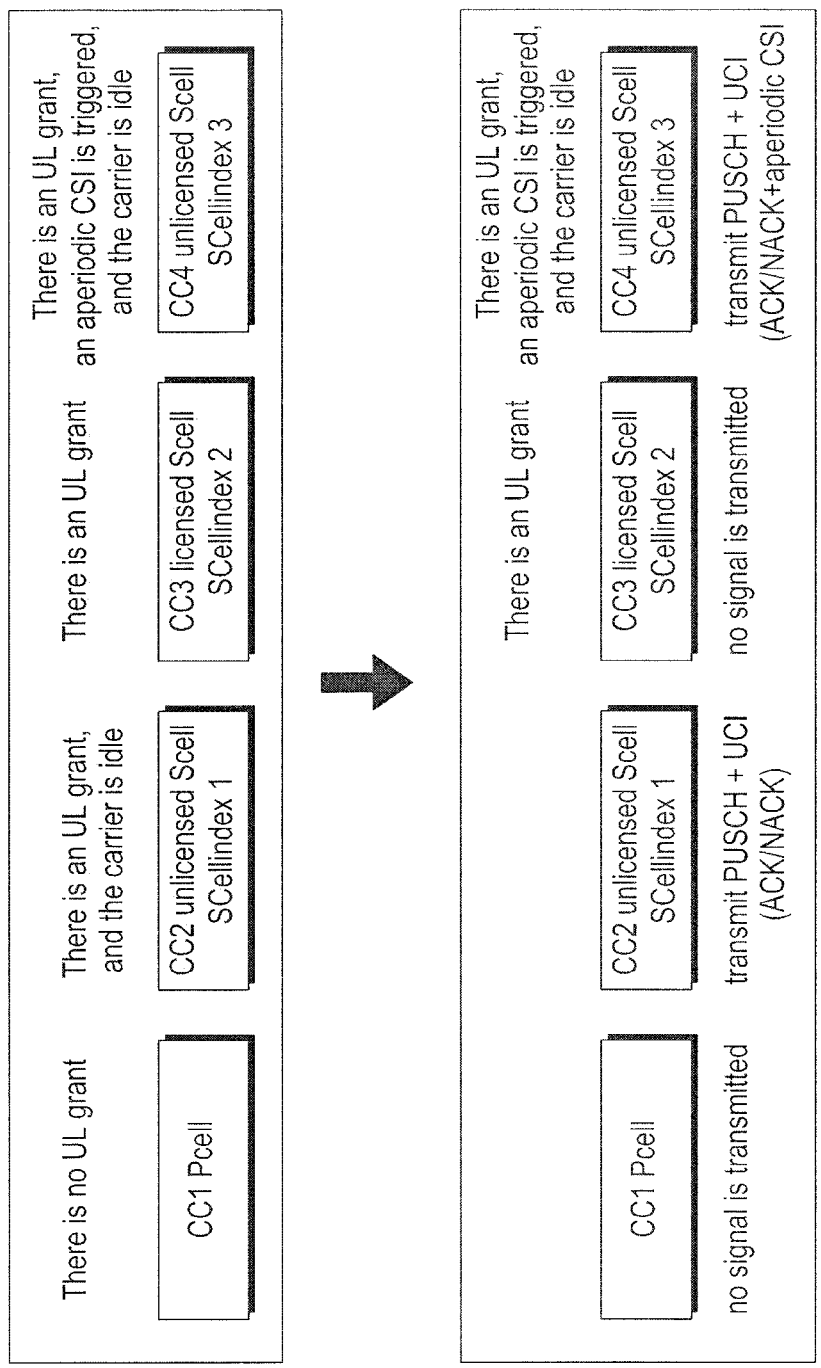
FIG. 29 is a schematic diagram illustrating an example of a second manner in a fourth method according to a second embodiment of the present invention.

In a second manner, the ACK/NACK is preferably carried on the PUSCH on a carrier in a licensed spectrum, wherein the carrier on which the PUSCH is transmitted has the smallest SCellIndex in carriers in the licensed spectrum. When there is no scheduled PUSCH in the licensed spectrum, the scheduled PUSCH and the UCI are transmitted on an idle carrier in the unlicensed spectrum, and the aperiodic CSI is carried on the PUSCH scheduled by the DCI including the aperiodic CSI trigger indication. FIG. 29 is a schematic diagram illustrating an example of a second manner in a fourth method according to a second embodiment of the present invention. When there is no scheduled PUSCH in the licensed spectrum, the ACK/NACK may be transmitted on the PUSCH in the unlicensed spectrum according to two ways as follows.

In a first way, the ACK/NACK and the aperiodic CSI are carried on the PUSCH scheduled by the DCI including the aperiodic CSI trigger indication.

In a second way, the ACK/NACK is carried on each PUSCH transmitted in the unlicensed spectrum. The ACK/NACK information carried in each PUSCH transmitted in the unlicensed spectrum may be generated through performing a same modulation-encoding-rate-matching processing for the original ACK/NACK, or may be generated through performing different modulation-encoding-rate-matching processings for the original ACK/NACK. A Rate matching factor $\beta_{offset}^{HARQ-ACK}$ used to transmit the ACK/NACK in the unlicensed spectrum may be different from a rate matching factor used to transmit the ACK/NACK in the licensed spectrum.

At block 2702b, the UE transmits the PUCCH on the Pcell or the sPcell to carry the ACK/NACK.

In the present invention, the base station is uncertain whether the PUSCH is transmitted on the uplink carrier in the unlicensed spectrum. The base station may determine whether the PUSCH is transmitted on the uplink carrier according to blind detection. For example, according to CRC, the base station may determine whether the PUSCH is successfully transmitted. According to implementation algorithm, based on the CRC, the base station may determine whether the PUSCH is not transmitted, or whether the PUSCH is transmitted but is not correctly demodulated. Alternatively, the base station may determine whether the PUSCH is transmitted through detecting another uplink signal, e.g., a reference signal.

When same information is transmitted in multiple carriers, e.g., the ACK/NACK is transmitted on multiple PUSCHs, the base station may perform demodulation through jointly decoding or independently decoding ACK/NACK signals on the multiple PUSCHs.

Third Embodiment

In this embodiment, when the UCI includes periodic CSI (a subframe where the UCI is transmitted is a subframe where the periodic CSI is reported), the UCI further includes aperiodic CSI in the same subframe and an uplink carrier carrying the aperiodic CSI is a carrier in the unlicensed spectrum, the periodic CSI is transmitted on a carrier in the licensed spectrum, or the periodic CSI is transmitted according to a method when the UCI is only includes the periodic CSI according to another embodiment of the present invention, or the periodic CSI and the ACK/NACK is transmitted according to a method when the UCI is only includes the periodic CSI according to another example of the present invention. The UE transmits the aperiodic CSI in the unlicensed spectrum when the unlicensed spectrum is idle, or only transmits the periodic CSI on the uplink carrier in the licensed spectrum when the uplink carrier carrying the aperiodic CSI in the unlicensed spectrum is not used for transmission in the same subframe.

In particular, the method in FIG. 1 may apply to a first scenario. In the first scenario, the uplink carrier scheduled by an UL grant triggering the aperiodic CSI is a carrier in the unlicensed spectrum, i.e., the carrier carrying the aperiodic CSI is a carrier in the unlicensed carrier.

There are two implementation manners in the first scenario.

In an implementation manner, when there is the periodic CSI and the aperiodic CSI in a same subframe, the UE may simultaneously transmit the periodic CSI and the aperiodic CSI.

In another implementation manner, when the uplink carrier carrying the aperiodic CSI in the unlicensed spectrum is not used for transmission in the same subframe, the UE transmits the periodic CSI.

When the UCI includes periodic CSI (i.e., a subframe where the UCI is transmitted is a subframe where the periodic CSI is reported), the UCI includes the periodic CSI, the pre-defined location includes a subframe where the periodic CSI is reported.

When the UCI in the same subframe further includes the aperiodic CSI and all downlink carriers corresponding to the aperiodic CSI are carriers in the unlicensed spectrum, the periodic CSI is transmitted on the licensed spectrum, or the periodic CSI is transmitted according to a method when the UCI is only includes the periodic CSI according to another embodiment of the present invention, or the periodic CSI and the ACK/NACK is transmitted according to a method when the UCI is only includes the periodic CSI according to another example of the present invention. The aperiodic CSI is transmitted on a carrier in the licensed spectrum when the carrier carrying the aperiodic CSI is in the licensed spectrum; the aperiodic CSI is transmitted on a carrier in the unlicensed spectrum when the carrier carrying the aperiodic CSI is an idle carrier in the unlicensed spectrum; or the UE only transmits the periodic CSI on the carrier in the licensed carrier when there is no valid CSI measurement result for any downlink unlicensed carrier corresponding to the aperiodic CSI in the same subframe.

In particular, the method in FIG. 1 may apply to a second scenario. In the second scenario, all downlink carriers corresponding to the aperiodic CSI are carriers in the unlicensed spectrum.

There are two implementation manners in the second scenario.

In an implementation manner, when there is the periodic CSI and the aperiodic CSI in a same subframe, the UE may simultaneously respectively transmit the periodic CSI and the aperiodic CSI.

In another implementation manner, in the same subframe, when there is no valid CSI measurement result for any downlink unlicensed carrier corresponding to the aperiodic CSI, the UE transmits the periodic CSI.

Four implementation manners are respectively described in detail as follows.

Figure 30:
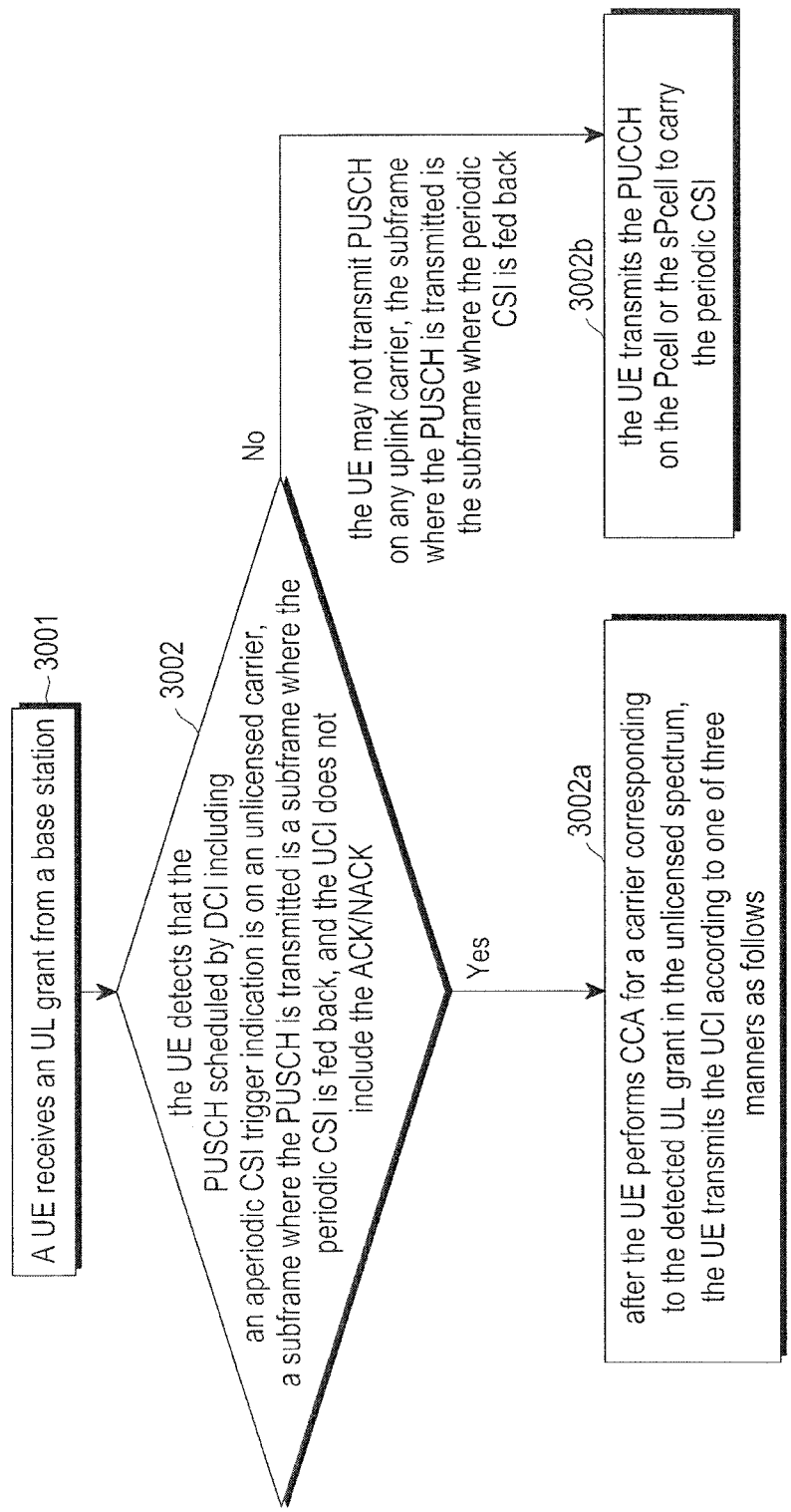
FIG. 30 is a flowchart illustrating a first implementing manner of a method in FIG. 1 applying to a first scenario according to an embodiment of the present invention.

FIG. 30 is a flowchart illustrating a first implementing manner of a method in FIG. 1 applying to a first scenario according to an embodiment of the present invention. The first implementing manner includes procedures as follows.

At block 3001, a UE receives a UL grant from a base station.

The UE detects the UL grant transmitted by the base station.

At block 3002, when the UE detects that the PUSCH scheduled by DCI including an aperiodic CSI trigger indication is on an unlicensed carrier, a subframe where the PUSCH is transmitted is a subframe where the periodic CSI is fed back, and the UCI does not include the ACK/NACK, procedures at block 3002a are performed; when the UE may not transmit PUSCH on any uplink carrier, the subframe where the PUSCH is transmitted is the subframe where the periodic CSI is fed back, and the UCI does not include the ACK/NACK, procedures at block 3002b are performed.

At block 3002a, after the UE performs CCA for a carrier corresponding to the detected UL grant in the unlicensed spectrum or for a carrier determined by the UE to transmit the scheduled PUSCH in the unlicensed spectrum, the UE transmits the UCI according to one of three manners as follows.

In a first manner, if the subframe where the PUSCH is to be transmitted is the subframe where the periodic CSI is fed back, and a downlink carrier corresponding to the periodic CSI belongs to a different PUCCH group from the unlicensed carrier where the PUSCH including the aperiodic CSI may be transmitted (that is, downlink carries carrying PUCCHs are different from each other, e.g., a downlink carrier corresponding to the periodic CSI belongs to a same PUCCH group with the Pcell, referred to as a P-PUCCH group; an unlicensed carrier where the PUSCH may be transmitted belongs to another PUCCH group referred to as a S-PUCCH group), the periodic CSI may be transmitted on a corresponding carrier in the PUCCH group to which the periodic CSI belongs, which is not related to whether the unlicensed carrier where the PUSCH including the aperiodic CSI may be transmitted is idle.

The periodic CSI may be transmitted in the corresponding carrier in the PUCCH group to which the periodic CSI belongs according to the following ways. In a first way, if the UE is configured to simultaneously transmit PUCCH and PUSCH in different PUCCH groups and to simultaneously transmit PUCCH and PUSCH in a same PUCCH group, the periodic CSI is carried on the PUCCH on the carrier where the PUCCH can be transmitted in the PUCCH group. In a second way, if the UE is configured to simultaneously transmit PUCCH and PUSCH in different PUCCH groups and not to simultaneously transmit PUCCH and PUSCH in a same PUCCH group and if there is no PUSCH transmission on any licensed carrier in the PUCCH group, the periodic CSI is carried according to a method when the UCI only includes the periodic CSI provided in embodiments of the present invention, or the UE discards the periodic CSI transmission; and/or if the UE is configured to simultaneously transmit PUCCH and PUSCH in different PUCCH groups and not to simultaneously transmit PUCCH and PUSCH in the PUCCH group and if there is PUSCH transmission on licensed carriers in the PUCCH group, the periodic CSI is carried on the PUSCH on a carrier with the smallest carrier index in the licensed carriers where the PUSCH is transmitted no matter whether the carrier index of the licensed carrier is larger than that of an unlicensed carrier where the PUSCH is transmitted in the PUCCH group, or the periodic CSI is carried according to a method when the UCI only includes the periodic CSI provided in embodiments of the present invention. In a third way, if the UE is configured not to simultaneously transmit PUCCH and PUSCH in different PUCCH groups and not to simultaneously transmit PUCCH and PUSCH in a same PUCCH group and if there is no PUSCH transmission on any licensed carrier in the PUCCH group, the UE discards the periodic CSI transmission, or the periodic CSI is carried on the PUSCH transmitted on a licensed carrier; and/or if the UE is configured not to simultaneously transmit PUCCH and PUSCH in different PUCCH groups and not to simultaneously transmit PUCCH and PUSCH in the PUCCH group and if there is PUSCH transmission on a licensed carrier in the PUCCH group but the carrier index of the licensed carrier is larger than that of an unlicensed carrier where the PUSCH is transmitted in the PUCCH group, the periodic CSI is carried according to a method when the UCI only includes the periodic CSI provided in embodiments of the present invention. For example, a carrier with the smallest cell index is selected in licensed carriers where the PUSCH is transmitted.

In a second manner, if the subframe where the PUSCH is to be transmitted is the subframe where the periodic CSI is fed back, and a downlink carrier corresponding to the periodic CSI belongs to a same PUCCH group with an unlicensed carrier where the PUSCH including the aperiodic CSI may be transmitted, the periodic CSI may be transmitted on a corresponding carrier in the PUCCH group to which the periodic CSI belongs, which is not related to whether the unlicensed carrier where the PUSCH including the aperiodic CSI may be transmitted is idle.

The periodic CSI may be transmitted in the corresponding carrier in the PUCCH group to which the periodic CSI belongs according to the following ways. In a first way, if the UE is configured to simultaneously transmit PUCCH and PUSCH in different PUCCH groups and to simultaneously transmit PUCCH and PUSCH in a same PUCCH group, the periodic CSI is carried on the PUCCH on the carrier the PUCCH can be transmitted in the PUCCH group. In a second way, if the UE is configured to simultaneously transmit PUCCH and PUSCH in different PUCCH groups and not to simultaneously transmit PUCCH and PUSCH in a same PUCCH group and if there is no PUSCH transmission on any licensed carrier in the PUCCH group, the UE discards the periodic CSI transmission, or the periodic CSI is carried on the PUCCH on the carrier where the PUCCH can be transmitted in the PUCCH group and the UE discards PUSCH transmission on other unlicensed carriers in the PUCCH group; and/or if the UE is configured to simultaneously transmit PUCCH and PUSCH in different PUCCH groups and not to simultaneously transmit PUCCH and PUSCH in the PUCCH group and if there is PUSCH transmission on licensed carriers in the PUCCH group, the periodic CSI is carried on the PUSCH on a carrier with the smallest carrier index in the licensed carriers where the PUSCH is transmitted no matter whether the carrier index of the licensed carrier is larger than that of an unlicensed carrier where the PUSCH is transmitted in the PUCCH group, or the periodic CSI is carried according to a method when the UCI only includes the periodic CSI provided in embodiments of the present invention. In a third way, if the UE is configured not to simultaneously transmit PUCCH and PUSCH in different PUCCH groups and not to simultaneously transmit PUCCH and PUSCH in a same PUCCH group and if there is no PUSCH transmission on any licensed carrier in the PUCCH group, the UE discards the periodic CSI transmission. Alternatively, the periodic CSI is carried on the PUCCH on the carrier where the PUCCH can be transmitted in the PUCCH group, and the UE discards PUSCH transmission on other unlicensed carriers in the PUCCH group. Further, whether the periodic CSI is transmitted is ultimately determined according to transmission conditions of other PUCCH groups.

In the two manners above, when the unlicensed carrier where the PUSCH including the aperiodic CSI may be transmitted is idle, the PUSCH including the aperiodic CSI is transmitted on the unlicensed carrier; when the unlicensed carrier where the PUSCH including the aperiodic CSI may be transmitted is busy, the UE discards PUSCH transmission and aperiodic CSI transmission.

In a third manner, if the subframe where the PUSCH is to be transmitted is the subframe where the periodic CSI is fed back, and a downlink carrier corresponding to the periodic CSI belongs to a same PUCCH group with an unlicensed carrier where the PUSCH including the aperiodic CSI may be transmitted, the periodic CSI may be transmitted on a corresponding carrier in the PUCCH group to which the periodic CSI belongs, which is related to whether the unlicensed carrier where the PUSCH including the aperiodic CSI may be transmitted is idle.

The periodic CSI may be transmitted in the corresponding carrier in the PUCCH group to which the periodic CSI belongs. When the unlicensed carrier where the PUSCH including the aperiodic CSI can be transmitted is idle, the UE discards the periodic CSI transmission, and transmits the PUSCH including the aperiodic CSI on the idle unlicensed carrier. When the unlicensed carrier where the PUSCH including the aperiodic CSI can be transmitted is busy, the UE discards PUSCH transmission and aperiodic CSI transmission, and transmits the periodic CSI on another carrier. The periodic CSI may be transmitted according to the following ways. In a first way, if the UE is configured to simultaneously transmit PUCCH and PUSCH in different PUCCH groups and to simultaneously transmit PUCCH and PUSCH in a same PUCCH group, the periodic CSI is carried on the PUCCH on the carrier where the PUCCH can be transmitted in the PUCCH group. In a second way, if the UE is configured to simultaneously transmit PUCCH and PUSCH in different PUCCH groups and not to simultaneously transmit PUCCH and PUSCH in a same PUCCH group and if there is no PUSCH transmission on any licensed carrier in the PUCCH group, the UE discards the periodic CSI transmission, or the periodic CSI is carried on the PUCCH on the carrier where the PUCCH can be transmitted in the PUCCH group, and the UE discards PUSCH transmission on other unlicensed carriers in the PUCCH group; and/or if the UE is configured to simultaneously transmit PUCCH and PUSCH in different PUCCH groups and not to simultaneously transmit PUCCH and PUSCH in the PUCCH group and if there is PUSCH transmission on licensed carriers in the PUCCH group, the periodic CSI is carried on the PUSCH on a carrier with the smallest carrier index in the licensed carriers where the PUSCH is transmitted no matter whether the carrier index of the licensed carrier is larger than that of an unlicensed carrier where the PUSCH is transmitted in the PUCCH group, or the periodic CSI is carried according to a method when the UCI only includes the periodic CSI provided in embodiments of the present invention. In a third way, if the UE is configured not to simultaneously transmit PUCCH and PUSCH in different PUCCH groups and not to simultaneously transmit PUCCH and PUSCH in a same PUCCH group and if there is no PUSCH transmission on any licensed carrier in the PUCCH group, the UE discards the periodic CSI transmission. Alternatively, the periodic CSI is carried on the PUCCH on the carrier where the PUCCH can be transmitted in the PUCCH group, and the UE discards PUSCH transmission on other unlicensed carriers in the PUCCH group. Further, whether the periodic CSI is transmitted is ultimately determined according to transmission conditions of other PUCCH groups.

In this manner, the UE may in advance prepare multiple sets of bits corresponding to PUSCH transmission and periodic CSI transmission according to multiple conditions that may possibly occur, and may select a corresponding set of bits to be transmitted according to a real-time CCA result. Alternatively, when the UE has a strong processing capability, the UE may prepare a corresponding set of bits to be transmitted according to the real-time CCA result.

One of the three manners above may be set in specifications, or may be semi-statically configured by a higher layer, or may be selected through a pre-defined rule. However, it should be ensured that the base station has a same understanding with the UE. For example, a pre-defined rule may include that a first manner or a second manner is used only when an uplink transmission time of the unlicensed carrier where the PUSCH carrying the aperiodic CSI is transmitted is earlier than another carrier in the licensed spectrum, and the third manner is used when the uplink transmission time of the unlicensed carrier where the PUSCH carrying the aperiodic CSI is transmitted is later than another carrier in the licensed spectrum.

At block 3002b, the UE transmits the PUCCH on the Pcell or the sPcell to carry the periodic CSI.

When the UE may not transmit the PUSCH on any uplink carrier, the subframe where the PUSCH is transmitted is the subframe where the periodic CSI is fed back, and the UCI does not include the ACK/NACK, the UE transmits the PUCCH on the Pcell or the sPcell to carry the periodic CSI according to one of two manners as follows.

In a first manner, when the UE does not have PUSCH transmission on any configured uplink carrier, the periodic CSI is carried on the PUCCH on the carrier where the PUCCH can be transmitted in a PUCCH group to which the downlink carrier corresponding to the periodic CSI belongs. For example, the PUCCH carrying the periodic CSI is transmitted on the Pcell when the PUCCH group includes the Pcell; the PUCCH carrying the periodic CSI is transmitted on the sPcell when the PUCCH group does not include the Pcell.

In a second manner, when the UE does not have PUSCH transmission on any uplink carrier in a PUCCH group including the unlicensed carrier where the PUSCH including the aperiodic CSI is transmitted, the periodic CSI is carried on the PUCCH on the carrier where the PUCCH can be transmitted in the PUCCH group. For example, the PUCCH carrying the periodic CSI is transmitted on the Pcell when the PUCCH group includes the Pcell; the PUCCH carrying the periodic CSI is transmitted on the sPcell when the PUCCH group does not include the Pcell.

Further, when the UE is configured not to simultaneously transmit PUCCH and PUSCH in different PUCCH groups, whether the periodic CSI transmission is discarded is ultimately determined according to transmission conditions of other PUCCH groups.

Figure 31:
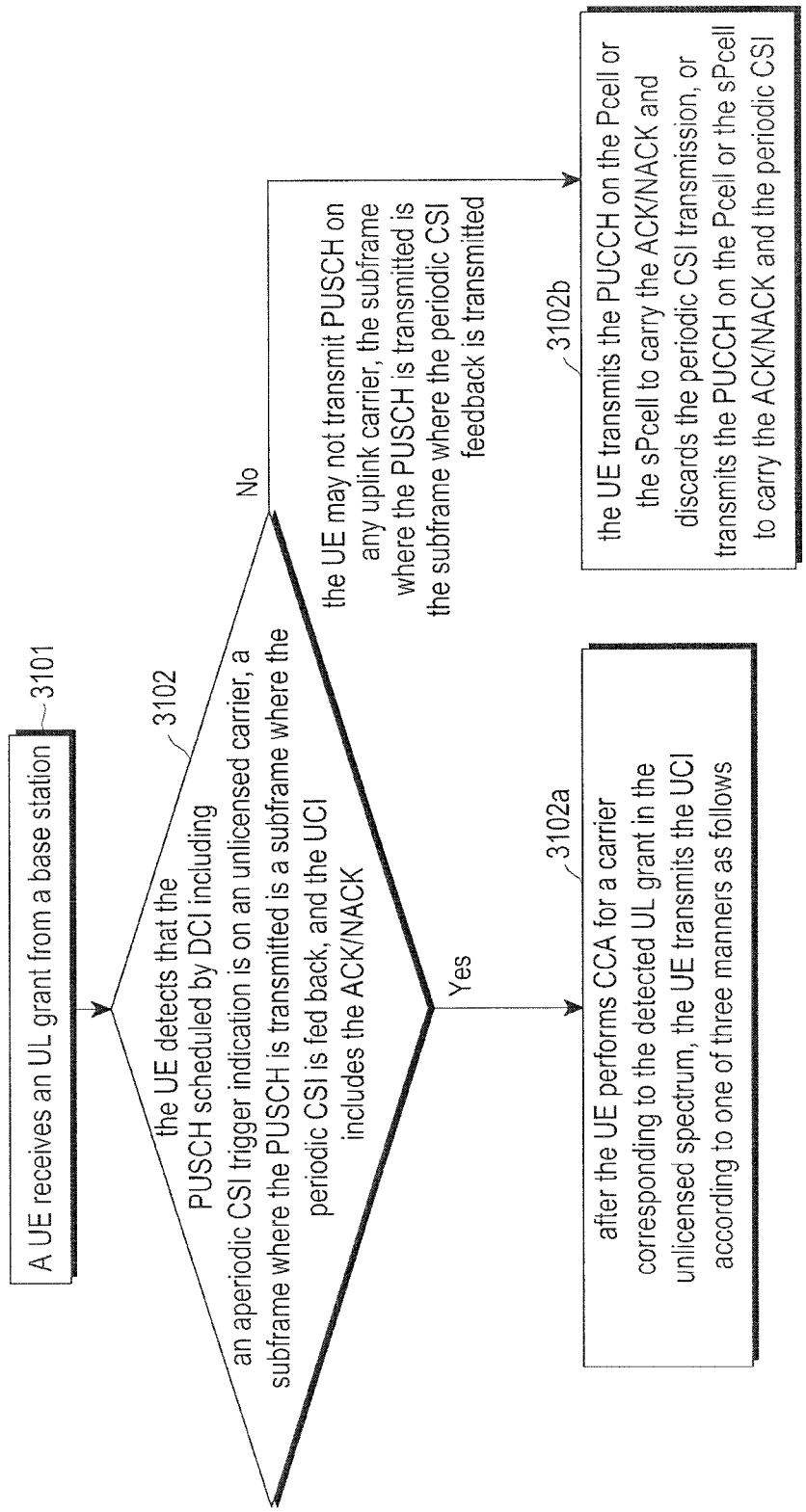
FIG. 31 is a flowchart illustrating a second implementing manner of a method in FIG. 1 applying to a first scenario according to an embodiment of the present invention.

FIG. 31 is a flowchart illustrating a second implementing manner of a method in FIG. 1 applying to a first scenario according to an embodiment of the present invention. The second implementing manner includes procedures as follows.

At block 3101, a UE receives a UL grant from a base station.

The UE detects the UL grant transmitted by the base station.

At block 3102, when the UE detects that the PUSCH scheduled by DCI including an aperiodic CSI trigger indication is on an unlicensed carrier, a subframe where the PUSCH is transmitted is a subframe where the periodic CSI is fed back, and the UCI includes the ACK/NACK, procedures at block 3102a are performed; when the UE may not transmit PUSCH on any uplink carrier, the subframe where the PUSCH is transmitted is the subframe where the periodic CSI feedback is transmitted, and the UCI includes the ACK/NACK, procedures at block 3102b are performed.

At block 3102a, after the UE performs CCA for a carrier corresponding to the detected UL grant in the unlicensed spectrum or for a carrier determined by the UE to transmit the scheduled PUSCH in the unlicensed spectrum, the UE transmits the UCI according to one of three manners as follows.

In a first manner, if the subframe where the PUSCH is to be transmitted is the subframe where the periodic CSI is fed back, and a downlink carrier corresponding to the periodic CSI belongs to a different PUCCH group from the unlicensed carrier where the PUSCH including the aperiodic CSI may be transmitted (that is, downlink carries carrying PUCCHs are different from each other, e.g., a downlink carrier corresponding to the periodic CSI belongs to a same PUCCH group with the Pcell, referred to as a P-PUCCH group; an unlicensed carrier where the PUSCH may be transmitted belongs to another PUCCH group referred to as a S-PUCCH group), the periodic CSI and the ACK/NACK belonging to a same PUCCH group with the periodic CSI may be transmitted on a corresponding carrier in the PUCCH group to which the periodic CSI and the ACK/NACK belong, which is not related to whether the unlicensed carrier where the PUSCH including the aperiodic CSI may be transmitted is idle.

The periodic CSI and the ACK/NACK belonging to the same PUCCH group with the periodic CSI may be transmitted in the corresponding carrier in the PUCCH group according to the following ways. In a first way, if the UE is configured to simultaneously transmit PUCCH and PUSCH in different PUCCH groups and to simultaneously transmit PUCCH and PUSCH in a same PUCCH group and if there is no PUSCH transmission on any licensed carrier in the PUCCH group, the ACK/NACK is carried on the PUCCH on the carrier where the PUCCH can be transmitted in the PUCCH group and the periodic CSI transmission is discarded, or the periodic CSI and the ACK/NACK may be transmitted in the corresponding carrier in the PUCCH group according to a method when the UCI only includes the periodic CSI and the ACK/NACK provided in embodiments of the present invention; and/or if the UE is configured to simultaneously transmit PUCCH and PUSCH in different PUCCH groups and to simultaneously transmit PUCCH and PUSCH in the PUCCH group and if there is PUSCH transmission on licensed carriers in the PUCCH group, the periodic CSI is carried on the PUSCH on a carrier with the smallest carrier index in the licensed carriers where the PUSCH is transmitted no matter whether the carrier index of the licensed carrier is larger than that of an unlicensed carrier where the PUSCH is transmitted in the PUCCH group and the ACK/NACK is carried on the PUCCH on the carrier where the PUCCH can be transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention. In a second way, if the UE is configured to simultaneously transmit PUCCH and PUSCH in different PUCCH groups and not to simultaneously transmit PUCCH and PUSCH in a same PUCCH group and if there is no PUSCH transmission on any licensed carrier in the PUCCH group, the ACK/NACK is carried on the PUCCH on the carrier where the PUCCH can be transmitted in the PUCCH group and the UE discards the periodic CSI transmission, or the periodic CSI and the ACK/NACK are carried on the PUCCH on the carrier where the PUCCH can be transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention; and/or if the UE is configured to simultaneously transmit PUCCH and PUSCH in different PUCCH groups and not to simultaneously transmit PUCCH and PUSCH in the PUCCH group and if there is PUSCH transmission on licensed carriers in the PUCCH group, the periodic CSI and the ACK/NACK are carried on the PUSCH on a carrier with the smallest carrier index in the licensed carriers where the PUSCH is transmitted no matter whether the carrier index of the licensed carrier is larger than that of an unlicensed carrier where the PUSCH is transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention.

In a second manner, if the subframe where the PUSCH is to be transmitted is the subframe where the periodic CSI is fed back, and a downlink carrier corresponding to the periodic CSI belongs to a same PUCCH group with an unlicensed carrier where the PUSCH including the aperiodic CSI may be transmitted, the periodic CSI and the ACK/NACK belonging to a same PUCCH group with the periodic CSI may be transmitted on a corresponding carrier in the PUCCH group to which the periodic CSI and the ACK/NACK belong, which is not related to whether the unlicensed carrier where the PUSCH including the aperiodic CSI may be transmitted is idle.

The periodic CSI and the ACK/NACK belonging to the same PUCCH group with the periodic CSI may be transmitted on the corresponding carrier in the PUCCH group according to the following ways. In a first way, if the UE is configured to simultaneously transmit PUCCH and PUSCH in different PUCCH groups and to simultaneously transmit PUCCH and PUSCH in a same PUCCH group and if there is no PUSCH transmission on any licensed carrier in the PUCCH group, the ACK/NACK is carried on the PUCCH on the carrier where the PUCCH can be transmitted in the PUCCH group, and the periodic CSI transmission is discarded, or the periodic CSI and the ACK/NACK are carried on the PUCCH on the carrier where the PUCCH can be transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention; and/or if the UE is configured to simultaneously transmit PUCCH and PUSCH in different PUCCH groups and to simultaneously transmit PUCCH and PUSCH in the PUCCH group and if there is PUSCH transmission on licensed carriers in the PUCCH group, the periodic CSI is carried on the PUSCH on a carrier with the smallest carrier index in the licensed carriers where the PUSCH is transmitted no matter whether the carrier index of the licensed carrier is larger than that of an unlicensed carrier where the PUSCH is transmitted in the PUCCH group, and the ACK/NACK is carried on the PUCCH on the carrier where the PUCCH can be transmitted in the PUCCH group, or the periodic CSI and the ACK/NACK may be transmitted in the corresponding carrier in the PUCCH group according to a method when the UCI only includes the periodic CSI provided in embodiments of the present invention. In a second way, if the UE is configured to simultaneously transmit PUCCH and PUSCH in different PUCCH groups and not to simultaneously transmit PUCCH and PUSCH in a same PUCCH group and if there is no PUSCH transmission on any licensed carrier in the PUCCH group, the ACK/NACK is carried on the PUCCH on the carrier where the PUCCH can be transmitted in the PUCCH group and the UE discards the periodic CSI transmission, or the periodic CSI and the ACK/NACK are carried on the PUCCH on the carrier where the PUCCH can be transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention; and/or if the UE is configured to simultaneously transmit PUCCH and PUSCH in different PUCCH groups and not to simultaneously transmit PUCCH and PUSCH in the PUCCH group and if there is PUSCH transmission on licensed carriers in the PUCCH group, the periodic CSI and the ACK/NACK are carried on the PUSCH on a carrier with the smallest carrier index in the licensed carriers where the PUSCH is transmitted no matter whether the carrier index of the licensed carrier is larger than that of an unlicensed carrier where the PUSCH is transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention.

In the two manners above, when the unlicensed carrier where the PUSCH including the aperiodic CSI may be transmitted is idle, the PUSCH including the aperiodic CSI is transmitted on the unlicensed carrier; when the unlicensed carrier where the PUSCH including the aperiodic CSI may be transmitted is busy, PUSCH transmission and aperiodic CSI transmission are discarded.

In a third manner, if the subframe where the PUSCH is to be transmitted is the subframe where the periodic CSI is fed back, and a downlink carrier corresponding to the periodic CSI belongs to a same PUCCH group with an unlicensed carrier where the PUSCH including the aperiodic CSI may be transmitted, the periodic CSI and the ACK/NACK belonging to a same PUCCH group with the periodic CSI may be transmitted on a corresponding carrier in the PUCCH group to which the periodic CSI and the ACK/NACK belong, which is related to whether the unlicensed carrier where the PUSCH including the aperiodic CSI may be transmitted is idle.

The periodic CSI and the ACK/NACK belonging to the same PUCCH group with the periodic CSI may be transmitted in the corresponding carrier in the PUCCH group to which the periodic CSI belongs. When the unlicensed carrier where the PUSCH including the aperiodic CSI may be transmitted is idle, the UE discards the periodic CSI transmission, still transmits the ACK/NACK on the corresponding carrier in the PUCCH group, and transmits the PUSCH including the aperiodic CSI on the idle unlicensed carrier. An aperiodic CSI and ACK/NACK transmitting method may be in accordance with a method when the UCI only includes the aperiodic CSI and the ACK/NACK provided in embodiments of the present invention. When the unlicensed carrier where the PUSCH including the aperiodic CSI may be transmitted is busy, PUSCH transmission and aperiodic CSI transmission are discarded, and the periodic CSI and the ACK/NACK are transmitted on another carrier. The periodic CSI and the ACK/NACK may be transmitted on the corresponding carrier in the PUCCH group according to the following ways. In a first way, if the UE is configured to simultaneously transmit PUCCH and PUSCH in different PUCCH groups and to simultaneously transmit PUCCH and PUSCH in a same PUCCH group and if there is no PUSCH transmission on any licensed carrier in the PUCCH group, the ACK/NACK is carried on the PUCCH on the carrier where the PUCCH can be transmitted in the PUCCH group, and the periodic CSI to be transmitted is discarded, or the periodic CSI and the ACK/NACK are carried on the PUCCH on the carrier where the PUCCH can be transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention; and/or if the UE is configured to simultaneously transmit PUCCH and PUSCH in different PUCCH groups and to simultaneously transmit PUCCH and PUSCH in the PUCCH group and if there is PUSCH transmission on licensed carriers in the PUCCH group, the periodic CSI is carried on the PUSCH on a carrier with the smallest carrier index in the licensed carriers where the PUSCH is transmitted no matter whether the carrier index of the licensed carrier is larger than that of an unlicensed carrier where the PUSCH is transmitted in the PUCCH group and the ACK/NACK is carried on the PUCCH on the carrier where the PUCCH can be transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention. In a second way, if the UE is configured to simultaneously transmit PUCCH and PUSCH in different PUCCH groups and not to simultaneously transmit PUCCH and PUSCH in a same PUCCH group and if there is no PUSCH transmission on any licensed carrier in the PUCCH group, the ACK/NACK is carried on the PUCCH on the carrier where the PUCCH can be transmitted in the PUCCH group and the UE discards the periodic CSI transmission, or the periodic CSI and the ACK/NACK are carried on the PUCCH on the carrier where the PUCCH can be transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention; and/or if the UE is configured to simultaneously transmit PUCCH and PUSCH in different PUCCH groups and not to simultaneously transmit PUCCH and PUSCH in the PUCCH group and if there is PUSCH transmission on licensed carriers in the PUCCH group, the periodic CSI and the ACK/NACK are carried on the PUSCH on a carrier with the smallest carrier index in the licensed carriers where the PUSCH is transmitted no matter whether the carrier index of the licensed carrier is larger than that of an unlicensed carrier where the PUSCH is transmitted in the PUCCH group, or the periodic CSI and the ACK/NACK may be transmitted in the corresponding carrier in the PUCCH group according to a method when the UCI only includes the periodic CSI and the ACK/NACK provided in embodiments of the present invention.

In this manner, the UE may in advance prepare multiple sets of bits corresponding to PUSCH transmission, periodic CSI transmission and ACK/NACK transmission according to multiple conditions that may possibly occur, and may select a corresponding set of bits to be transmitted according to a real-time CCA result. Alternatively, when the UE has a strong processing capability, the UE may prepare a corresponding set of bits to be transmitted according to the real-time CCA result.

One of the three manners above may be set in specifications, or may be semi-statically configured by a higher layer, or may be selected through a pre-defined rule. However, it should be ensured that the base station has a same understanding with the UE. For example, a pre-defined rule may include that a first manner or a second manner is used only when an uplink transmission time of the unlicensed carrier where the PUSCH carrying the aperiodic CSI is transmitted is earlier than another carrier in the licensed spectrum, and the third manner is used when the uplink transmission time of the unlicensed carrier where the PUSCH carrying the aperiodic CSI is transmitted is later than another carrier in the licensed spectrum.

At block 3102b, the UE transmits the PUCCH on the Pcell or the sPcell to carry the ACK/NACK and discards the periodic CSI transmission, or transmits the PUCCH on the Pcell or the sPcell to carry the ACK/NACK and the periodic CSI.

When the UE may not transmit the PUSCH on any uplink carrier, the subframe where the PUSCH is transmitted is the subframe where the periodic CSI is fed back, and the UCI includes the ACK/NACK, the UE transmits the PUCCH on the Pcell or the sPcell to carry the periodic CSI according to one of two manners as follows.

In a first manner, when the UE does not have PUSCH transmission on any configured uplink carrier, the periodic CSI and the ACK/NACK are carried on the PUCCH on the carrier where the PUCCH can be transmitted in a PUCCH group to which the downlink carrier corresponding to the periodic CSI belongs, or the ACK/NACK is carried on the PUCCH on the carrier where the PUCCH can be transmitted in the PUCCH group but the periodic CSI transmission is discarded.

In a second manner, when the UE does not have PUSCH transmission on any uplink carrier in a PUCCH group including the unlicensed carrier where the PUSCH including the aperiodic CSI is transmitted, the periodic CSI and the ACK/NACK are carried on the PUCCH on the carrier where the PUCCH can be transmitted in the PUCCH group, or the ACK/NACK is carried on the PUCCH on the carrier where the PUCCH can be transmitted in the PUCCH group but the periodic CSI transmission is discarded.

Further, when the UE is configured not to simultaneously transmit PUCCH and PUSCH in different PUCCH groups, whether the periodic CSI transmission and/or the ACK/NACK transmission is discarded is ultimately determined according to transmission conditions of other PUCCH groups.

Further, when the UE is configured not to simultaneously transmit PUCCH and PUSCH in different PUCCH groups, whether the periodic CSI transmission is discarded is ultimately determined according to transmission conditions of other PUCCH groups.

According to each manner in the embodiment, when the downlink carrier corresponding to the periodic CSI is a carrier in the unlicensed spectrum, it may be further limited that periodic CSI transmission is discarded when there is no valid CSI for the downlink carrier in the unlicensed spectrum. For example, when a reference signal used for CSI measurement is not transmitted in N ms on the downlink carrier in the unlicensed spectrum, it is determined that there is no valid CSI for the periodic CSI this time, and periodic CSI transmission is discarded. Alternatively, there is no further limitation, and the periodic CSI may be transmitted according to one of the manners above.

Figure 32:
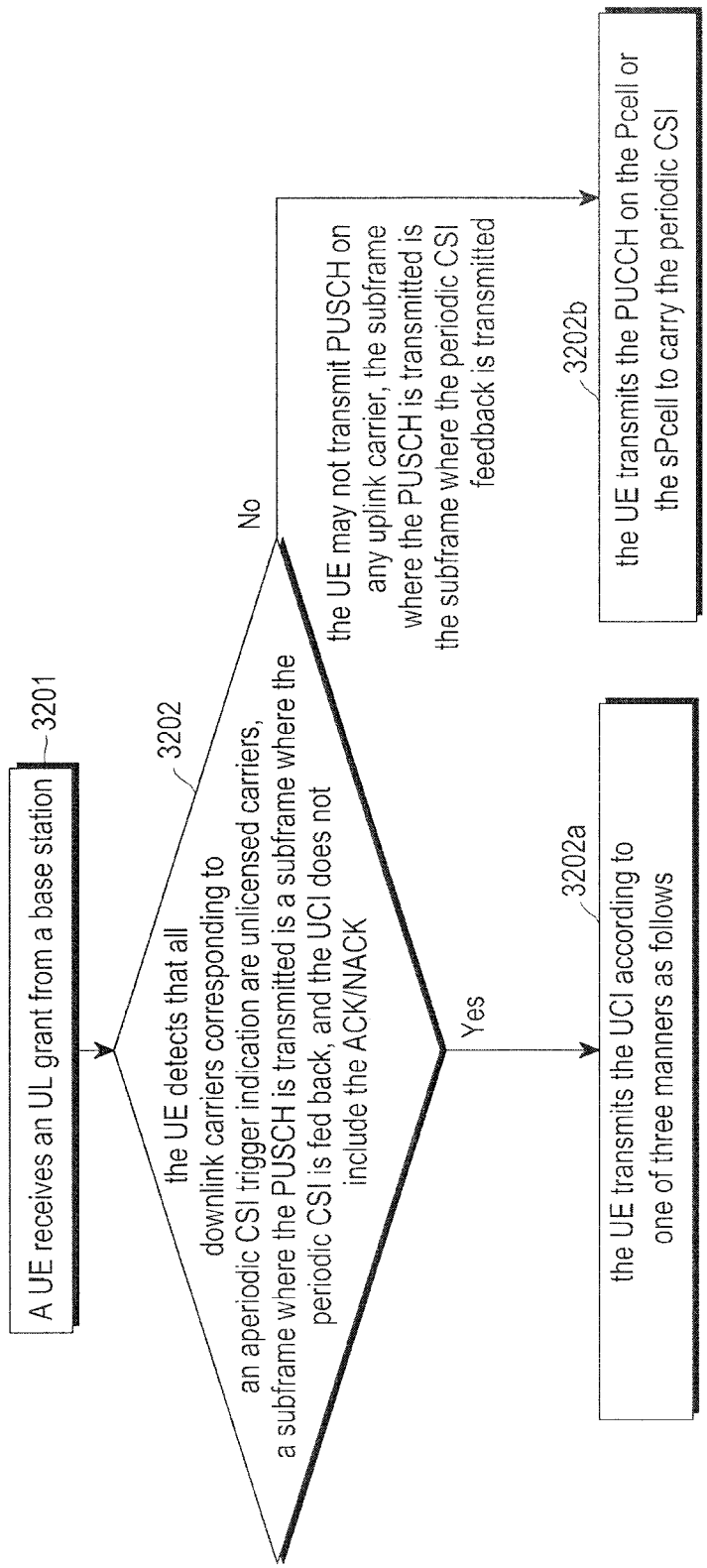
FIG. 32 is a flowchart illustrating a first implementing manner of a method in FIG. 1 applying to a second scenario according to an embodiment of the present invention.

FIG. 32 is a flowchart illustrating a first implementing manner of a method in FIG. 1 applying to a second scenario according to an embodiment of the present invention. The first implementing manner includes procedures as follows.

At block 3201, a UE receives a UL grant from a base station.

The UE detects the UL grant transmitted by the base station.

At block 3202, when the UE detects that all downlink carriers corresponding to an aperiodic CSI trigger indication are unlicensed carriers, a subframe where the PUSCH is transmitted is a subframe where the periodic CSI is fed back, and the UCI does not include the ACK/NACK, procedures in block 3202a are performed; when the UE may not transmit PUSCH on any uplink carrier, the subframe where the PUSCH is transmitted is the subframe where the periodic CSI feedback is transmitted, and the UCI does not include the ACK/NACK, procedures in block 3202b are performed. The procedures in block 3202b are same as those in block 3002b in FIG. 30.

At block 3202a, the UE transmits the UCI according to any one of three manners as follows.

In a first manner or a second manner, the periodic CSI may be transmitted on a corresponding carrier in a PUCCH group to which the periodic CSI belongs, which is not related to whether there are valid CSI measurement results for all unlicensed downlink carriers corresponding to the triggered aperiodic CSI. In particular, a periodic CSI transmitting method is same as a first manner or a second manner in block 3002a in FIG. 30.

In a third method, the periodic CSI may be transmitted on a corresponding carrier in the PUCCH group to which the periodic CSI belongs, which is related to whether there are valid CSI measurement results for all unlicensed downlink carriers corresponding to the triggered aperiodic CSI. In particular, when there is a valid CSI measurement result for each unlicensed downlink carrier corresponding to the triggered aperiodic CSI, the UE transmits the periodic CSI; when there is at least one valid CSI measurement result respectively for at least one of all the unlicensed downlink carriers corresponding to the triggered aperiodic CSI, the UE transmits the aperiodic CSI. In particular, a periodic CSI transmitting method is same as a third manner in block 3002a in FIG. 30.

The UE may in advance prepare a set of bits corresponding to PUSCH transmission and periodic CSI transmission according to multiple conditions that may possibly occur, which is different from an example as shown in FIG. 30. That is because whether there are valid CSI measurement results for all unlicensed downlink carriers corresponding to the aperiodic CSI may be determined before an uplink subframe where the scheduled aperiodic CSI is reported, and a time interval between a time when the UE determines whether there are valid CSI measurement results for all the unlicensed downlink carriers corresponding to the aperiodic CSI and the uplink subframe where the scheduled aperiodic CSI is reported is no less than N1 subframes, wherein the N1 subframes are a minimum time delay from CSI measurement to CSI report. If a time delay from aperiodic CSI trigger to aperiodic CSI report is no more than the N1 subframes, the UE may determine whether there is a valid aperiodic CSI to be report when receiving an aperiodic CSI trigger signalling. Thus, the UE may prepare only one set of bits. But if the time delay from the aperiodic CSI trigger to the aperiodic CSI report is more than the N1 subframes, the UE may prepare multiple sets of bits corresponding to the PUSCH transmission and the periodic CSI transmission.

One of the three manners above may be set in specifications, or may be semi-statically configured by a higher layer.

Figure 33:
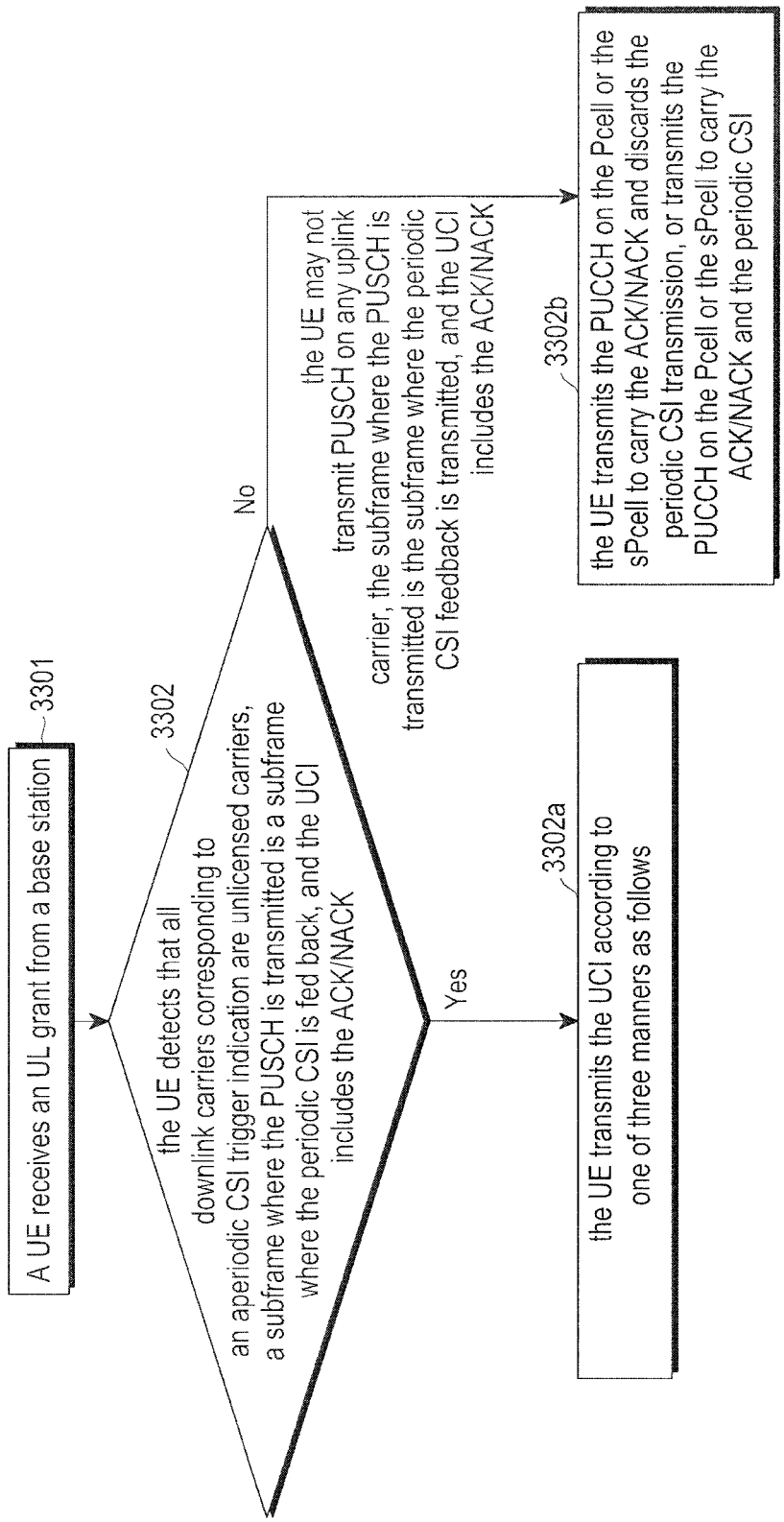
FIG. 33 is a flowchart illustrating a second implementing manner of a method in FIG. 1 applying to a second scenario according to an embodiment of the present invention.

FIG. 33 is a flowchart illustrating a second implementing manner of a method in FIG. 1 applying to a second scenario according to an embodiment of the present invention. The second implementing manner includes procedures as follows.

At block 3301, a UE receives a UL grant from a base station.

The UE detects the UL grant transmitted by the base station.

At block 3302, when the UE detects that all downlink carriers corresponding to an aperiodic CSI trigger indication are unlicensed carriers, a subframe where the PUSCH is transmitted is a subframe where the periodic CSI is fed back, and the UCI includes the ACK/NACK, procedures in block 3302a are performed; when the UE may not transmit PUSCH on any uplink carrier, the subframe where the PUSCH is transmitted is the subframe where the periodic CSI feedback is transmitted, and the UCI includes the ACK/NACK, procedures in block 3302b are performed. The procedures in block 3302b are same as those in block 3102b in FIG. 31.

At block 3302a, the UE transmits the UCI according to any one of three manners as follows.

In a first manner or a second manner, the periodic CSI and the ACK/NACK belonging to a same PUCCH group with the periodic CSI may be transmitted on a corresponding carrier in the PUCCH group to which the periodic CSI and the ACK/NACK belong, which is not related to whether there are valid CSI measurement results for all unlicensed downlink carriers corresponding to the triggered aperiodic CSI. In particular, a periodic CSI and ACK/NACK transmitting method is same as a first manner or a second manner in block 3102a in FIG. 31.

In a third method, the periodic CSI and the ACK/NACK belonging to a same PUCCH group with the periodic CSI may be transmitted on a corresponding carrier in the PUCCH group to which the periodic CSI and the ACK/NACK belong, which is related to whether there are valid CSI measurement results for all unlicensed downlink carriers corresponding to the triggered aperiodic CSI. In particular, when there is a valid CSI measurement result for each unlicensed downlink carrier corresponding to the triggered aperiodic CSI, the UE transmits the periodic CSI and the ACK/NACK; when there is at least one valid CSI measurement result respectively for at least one of all the unlicensed downlink carriers corresponding to the triggered aperiodic CSI, the UE transmits the aperiodic CSI and the ACK/NACK. In particular, a periodic CSI and ACK/NACK transmitting method is same as a third manner in block 3102a in FIG. 31.

The UE may in advance prepare a set of bits corresponding to PUSCH transmission, periodic CSI transmission and ACK/NACK transmission according to multiple conditions that may possibly occur, which is different from an example as shown in FIG. 31. That is because whether there are valid CSI measurement results for all unlicensed downlink carriers corresponding to the aperiodic CSI may be determined before an uplink subframe where the scheduled aperiodic CSI is reported, and a time interval between a time when the UE determines whether there are valid CSI measurement results for all the unlicensed downlink carriers corresponding to the aperiodic CSI and the uplink subframe where the scheduled aperiodic CSI is reported is no less than N1 subframes, wherein the N1 subframes are a minimum time delay from CSI measurement to CSI report. If a time delay from aperiodic CSI trigger to aperiodic CSI report is no more than the N1 subframes, the UE may determine whether there is a valid aperiodic CSI to be report when receiving an aperiodic CSI trigger signalling. Thus, the UE may prepare only one set of bits. But if the time delay from the aperiodic CSI trigger to the aperiodic CSI report is more than the N1 subframes, the UE may prepare multiple sets of bits corresponding to the PUSCH transmission, the periodic CSI transmission and the ACK/NACK transmission.

One of the three manners above may be set in specifications, or may be semi-statically configured by a higher layer.

According to each manner in the embodiment, when the downlink carrier corresponding to the periodic CSI is a carrier in the unlicensed spectrum, it may be further limited that periodic CSI transmission is discarded when there is no valid CSI for the downlink carrier in the unlicensed spectrum. For example, when a reference signal used for CSI measurement is not transmitted in N ms on the downlink carrier in the unlicensed spectrum, it is determined that there is no valid CSI for the periodic CSI this time, and periodic CSI transmission is discarded. Alternatively, there is no further limitation, and the periodic CSI may be transmitted according to one of the three manners above.

Figure 34:
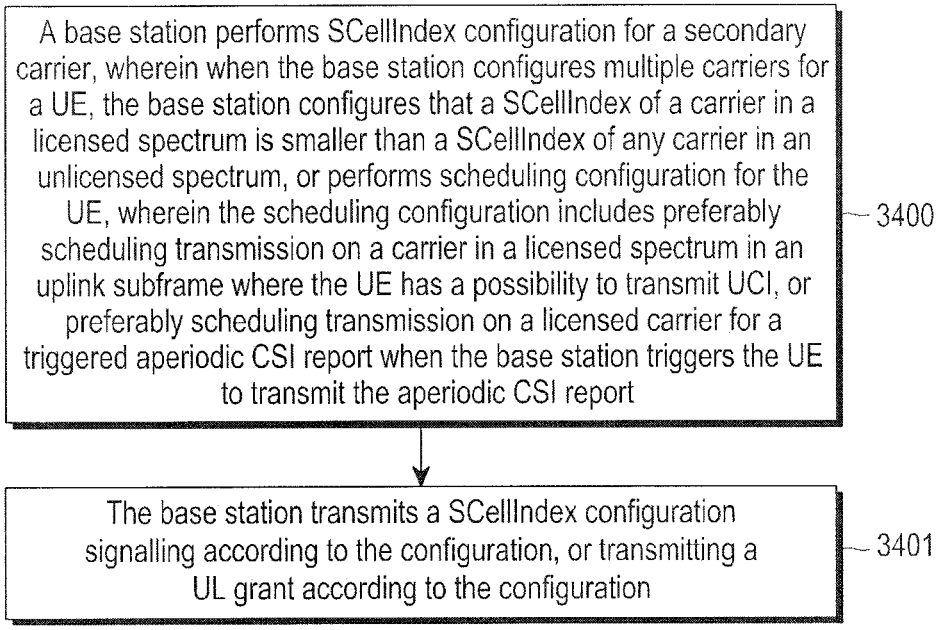
FIG. 34 is a flowchart illustrating an uplink control information transmission controlling method according to an embodiment of the present application.

An uplink control information transmission controlling method is provided according to an embodiment of the present invention. As shown in FIG. 34, the method includes procedures as follows.

At block 3400, a base station performs SCellIndex configuration for a secondary carrier, wherein when the base station configures multiple carriers for a UE, the base station configures that a SCellIndex of a carrier in a licensed spectrum is smaller than a SCellIndex of any carrier in an unlicensed spectrum, or performs scheduling configuration for the UE, wherein the scheduling configuration includes preferably scheduling transmission on a carrier in a licensed spectrum in an uplink subframe where the UE has a possibility to transmit UCI, or preferably scheduling transmission on a licensed carrier for a triggered aperiodic CSI report when the base station triggers the UE to transmit the aperiodic CSI report.

At block 3401, the base station transmits a SCellIndex configuration signalling according to the configuration, or transmitting a UL grant according to the configuration.

Figure 35:
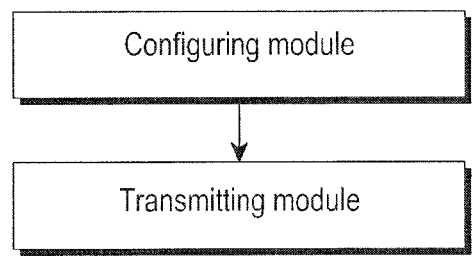
FIG. 35 is a schematic diagram illustrating a structure of an uplink control information transmission controlling base station according to an embodiment of the present application.

An uplink control information transmission controlling base station is further provided according to an embodiment of the present invention. As shown in FIG. 35, the base station includes a configuring module and a transmitting module.

The configuring module is to perform secondary cell index (SCellIndex) configuration for a secondary carrier, wherein when the base station configures multiple carriers for a UE, the base station configures that a SCellIndex of a carrier in a licensed spectrum is smaller than a SCellIndex of any carrier in an unlicensed spectrum, or performs scheduling configuration for the UE, wherein the scheduling configuration includes preferably scheduling transmission on a carrier in a licensed spectrum in an uplink subframe where the UE has a possibility to transmit UCI, or preferably scheduling transmission on a licensed carrier for a triggered aperiodic Channel State Information (CSI) report when the base station triggers the UE to transmit the aperiodic CSI report.

The transmitting module is to transmit a SCellIndex configuration signalling according to the configuration, or transmit an uplink (UL) grant according to the configuration.

Figure 36:
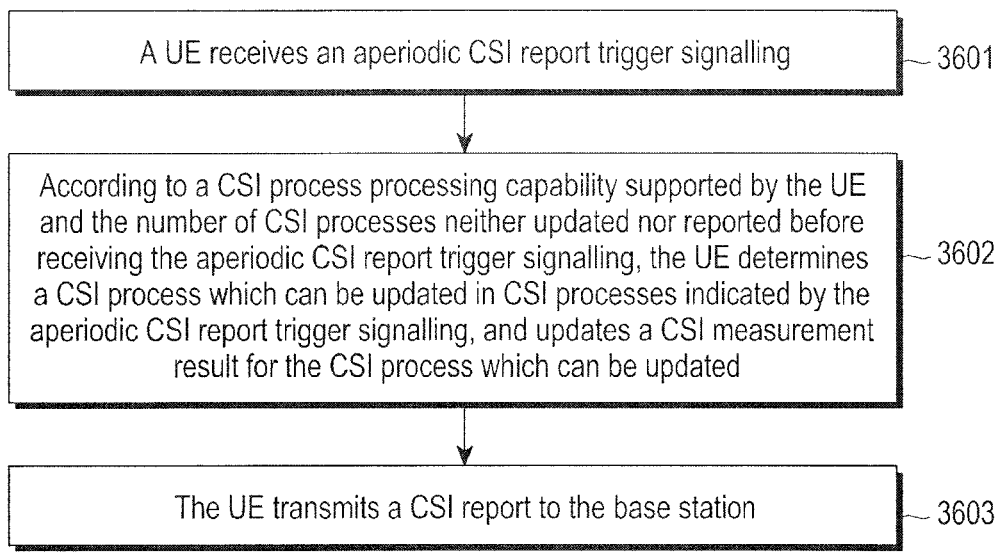
FIG. 36 is a flowchart illustrating an aperiodic CSI measurement and report method according to an embodiment of the present invention.

An aperiodic CSI measurement and report method is provided according to an embodiment of the present invention. FIG. 36 is a flowchart illustrating an aperiodic CSI measurement and report method according to an embodiment of the present invention. As shown in FIG. 36, the method includes procedures as follows.

At block 3601, a UE receives an aperiodic CSI report trigger signalling.

At block 3602, according to a CSI process processing capability of the UE and the number of CSI processes neither updated nor reported before receiving the aperiodic CSI report trigger signalling, the UE determines a CSI process which can be updated in CSI processes indicated by the aperiodic CSI report trigger signalling, and updates a CSI measurement result for the CSI process which can be updated.

At block 3603, the UE transmits a CSI report to the base station.

In block 3602, the CSI process processing capability of the UE may include:
(1) the UE supports $N_x$ CSI processes at most for each carrier;
(2) the UE simultaneously supports $N_y$ CSI processes at most; the CSI processes may be for a same carrier, or may be for different carriers; the CSI processes may be for a same carrier group, or may be for different carriers groups;
(3) the UE supports $N_z$ CSI processes at most; the CSI processes may be for a same carrier, or may be for different carriers; the CSI processes may be for a same carrier group, or may be for different carriers.

In some scenarios, the UE processing capability is only limited by $N_x$, e.g., in a single-carrier scenario or a single-carrier-group scenario. In some scenarios, the UE processing capability is only limited by $N_y$, e.g., if a transmission mode (e.g., a transmission mode 9) configured for the UE does not support multiple CSI processes. In some scenarios, the UE processing capability is only limited by $N_z$. In some scenarios, the UE processing capability is limited by multiple processing capabilities, e.g., $N_x$ and $N_y$, e.g., if there are multiple carrier groups and the UE is configured with a transmission mode 10.

All possible conditions are supported in the present invention.

In block 3602, according to the CSI process processing capability of the UE for each carrier $N_x$ and the number of CSI processes neither updated nor reported for the carrier before receiving the aperiodic CSI report trigger signalling $N_u$, the UE determines that the number of CSI processes which can be updated in CSI processes indicated by the aperiodic CSI report trigger signalling $N_{left\_u}$ is equal to $\max(N_x-N_u, 0)$. The $N_{left\_u}$ CSI processes have $N_{left\_u}$ highest priorities determined according to a pre-defined priority rule. The pre-defined priority rule includes:
the smaller an index of a CSI process, the higher a priority of the CSI process, and/or
a priority of a CSI process corresponding to a valid CSI resource is higher than that of a CSI process corresponding to an invalid CSI resource.

In block 3602, the CSI processes neither updated nor reported before receiving the aperiodic CSI report trigger signalling $N_u$ do not include a CSI process CSI of which has been calculated, but is not reported to the base station because the uplink signal can be transmitted to the base station in the uplink subframe where the CSI is reported, e.g. the UE fails to access the channel in that uplink subframe due to the failure of CCA check; and/or the additional CSI updating capability $N_{left\_u}$ does not include a CSI process CSI of which has been calculated, but is not reported to the base station because the uplink signal can be transmitted to the base station in the uplink subframe where the CSI is reported. When the aperiodic CSI report triggered by the base station at next time includes a CSI process that has been updated but is not reported, the UE may not re-update the CSI process, and may update a CSI process neither updated nor reported according to a pre-defined priority rule. In particular, the CSI process not re-updated is not counted into the number of CSI processes updated based on CSI process updating capability of the UE.

Further, the UE determines whether a CSI process CSI of which has been calculated but is not reported is re-updated according to one of the following two methods.

In a first method, when there is no new reference signal used for CSI measurement in a pre-defined time window, the UE may not re-update the CSI process, i.e., the CSI process is not included in CSI processes neither updated nor reported, wherein the reference signal used for the CSI measurement includes a signal for channel measurement and interference measurement; Otherwise, the UE still updates the CSI process, i.e., the CSI process is included in the CSI processes neither updated nor reported. The CSI process is counted into the number of CSI processes updated based on the CSI process updating capability of the UE.

The pre-define time window includes A subframes after the UE receives an aperiodic CSI report trigger signalling including the CSI process and B subframes before the UE receives the aperiodic CSI report trigger signalling including the CSI process again, wherein A and B are pre-defined values, e.g., A is equal to zero, and B is equal to zero. In particular, the pre-defined time window starts from a subframe where the aperiodic CSI report trigger signalling including the CSI process is received, and ends in a subframe where the aperiodic CSI report trigger signalling including the CSI process is received again. Alternatively, A is defined as a time window starting point, i.e., a subframe when the UE reports the CSI, or a subframe where the UE finishes CSI calculation.

Preferably, whether there is the new reference signal used for the CSI measurement is determined according to a UE detection result. In particular, when the UE detects a reference signal used for the CSI measurement, the UE determines that there is the new reference signal used for CSI measurement; when the UE does not detect a reference signal used for the CSI measurement, the UE determines that there is no new reference signal used for CSI measurement. The UE may detect the reference signal used for the CSI measurement through detecting a physical signalling or through detecting a reference signal.

Preferably, whether there is the new reference signal used for the CSI measurement is determined by a periodic CSI resource configured by the base station. In particular, only when there is no periodic CSI resource configured by the base station for the CSI process in the time window, the CSI process is not counted into the number of CSI processes updated based on the CSI process updating capability of the UE. Otherwise, when there is the periodic CSI resource configured by the base station in the time window, even though the base station does not transmits the CSI resource because the base station does not obtain a channel or even though the base station transmits the CSI resource but the UE does not detect the CSI resource, the CSI process is included in CSI processes updated according to the CSI process processing capability of the UE. However, whether the CSI process is updated may be determined according to whether the UE detects the reference signal used for the CSI measurement.

In a second method, the UE does not re-update the CSI process no matter whether there is the new reference signal used for the CSI measurement after updating the CSI process and before receiving the aperiodic CSI report trigger signalling including the CSI process again.

Take two detail examples respectively to describe the first method and the second method.

In an example, it is assumed that $N_x$ is equal to 3. At m1, the base station triggers a first aperiodic CSI report including three CSI processes 2, 3, 5 for CC1, the UE may not transmit the first aperiodic CSI report at m1+4, but has performed calculation for CSI processes 2, 3, 5. At m2, the base station triggers a second aperiodic CSI report including five CSI processes 1, 2, 3, 4, 6 for the CC1, wherein m2 is larger than (m1+4). The base station configures CSI resources corresponding to CSI process 2 and CSI process 5 between m1 and m2, but does not configure CSI resource corresponding to CSI process 3.

According to the first method, if the UE detects CSI resources corresponding to CSI processes 2, 5 between m1 and m2, when the UE receives a signalling used to trigger the second aperiodic CSI report at m2, the UE re-updates the CSI process 2, updates CSI processes 1, 4, and does not update CSI processes 3, 6. When the UE obtains a channel at m2+4, the UE transmits the PUSCH at m2+4, and transmits the second aperiodic CSI report carried on the PUSCH, wherein the second aperiodic CSI report includes CSI results of the updated CSI processes 1, 2, 4 and CSI results of the CSI processes 3, 6 not updated. It should be noted that, a reason why CSI process 3 is not updated is different from that of CSI process 6. The CSI result of the CSI process 3 is the CSI result updated after the UE receives the signalling used to trigger the first aperiodic CSI report at m1. Afterwards, there is no new CSI resource for the CSI process 3, thus, a latest CSI result is the CSI result updated after the UE receives the signalling used to trigger the first aperiodic CSI report at m1. The CSI result of CSI process 6 is the CSI result updated after the UE receives the signalling used to trigger the second aperiodic CSI report at m2. There is a new CSI resource after the UE reports the second aperiodic CSI report, the UE does not update the CSI result of CSI process 6 based on the new CSI resource because of UE processing capability limitation.

Figure 37:
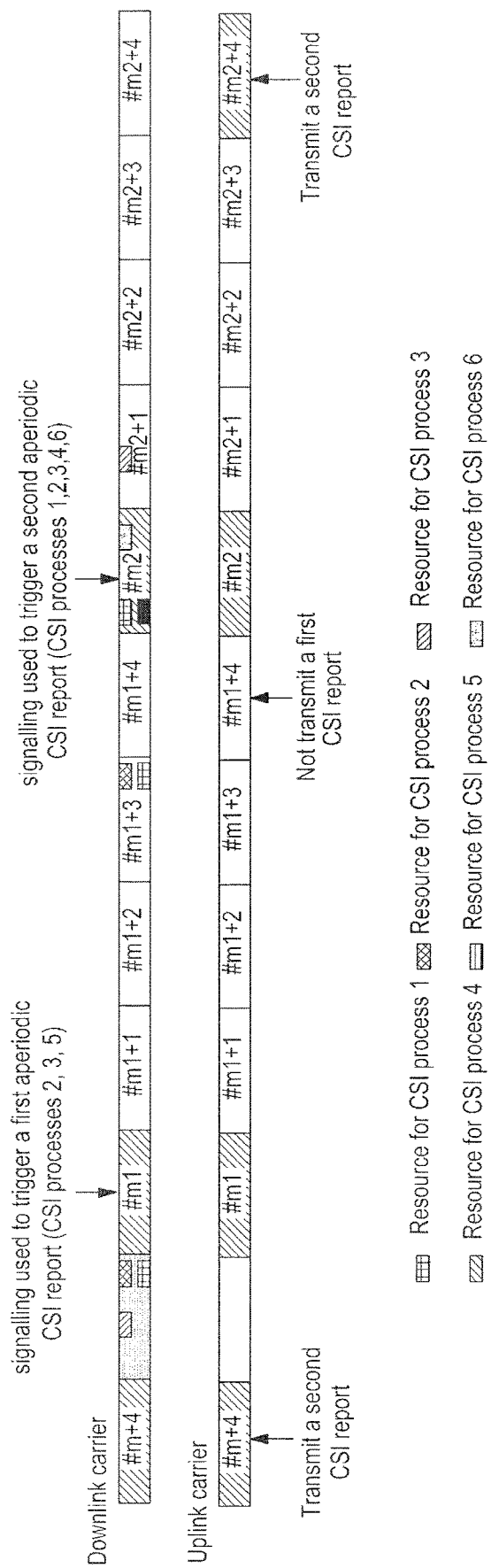
FIG. 37 is a schematic diagram illustrating a subframe structure in a first example to determine when the UE has calculated but does not report CSI of a CSI process, whether the UE re-updates the CSI process according to an embodiment of the present invention.

According to the second method 2, even though CSI resources corresponding to CSI processes 2, 5 are detected between m1 and m2, the UE does not update the CSI results based on the new CSI resources, but updates CSI processes 1, 4, 6 in the second aperiodic CSI report. When the UE obtains the channel at m2+4, the UE transmits the PUSCH and the second aperiodic CSI report carried on the PUSCH at m2+4, wherein the second aperiodic CSI report includes CSI results of updated CSI processes 1, 4, 6 and CSI results of CSI processes 2, 3 not updated, wherein the CSI results of CSI processes 2, 3 are the CSI results updated after the UE receives the signalling used to trigger the first aperiodic CSI report at m1, which is not re-updated. The process above is illustrated in FIG. 37 (LTE-U system works in a TDM mode in uplink and downlink, and an uplink carrier and a downlink carrier in LTE-U system are a same carrier, but in order to make figure illustration convenient, the uplink carrier and the downlink carrier are separately illustrated in FIGS. 37-42). FIG. 37 is a schematic diagram illustrating a subframe structure in a first example to determine when the UE has calculated but does not report CSI of a CSI process, whether the UE re-updates the CSI process according to an embodiment of the present invention.

In another example, it is assumed that $N_x$ is equal to 3. At m1, the base station triggers a first aperiodic CSI report including three CSI processes 2, 3, 5 for CC1, the UE does not transmit the first aperiodic CSI report at m1+4, but has performed calculation for CSI processes 2, 3, 5. At m1+4, the base station triggers a second aperiodic CSI report including two CSI processes 1, 4 for the CC1. When the base station detects that the UE does not transmit PUSCH at m1+4, the base station re-triggers the first aperiodic CSI report at m2, wherein m2 is larger than m1+4, but is smaller than m1+8. There is no CSI resource for CSI processes 2, 3 but there is a CSI resource for CSI process 5 between m1 and m2.

Figure 38:
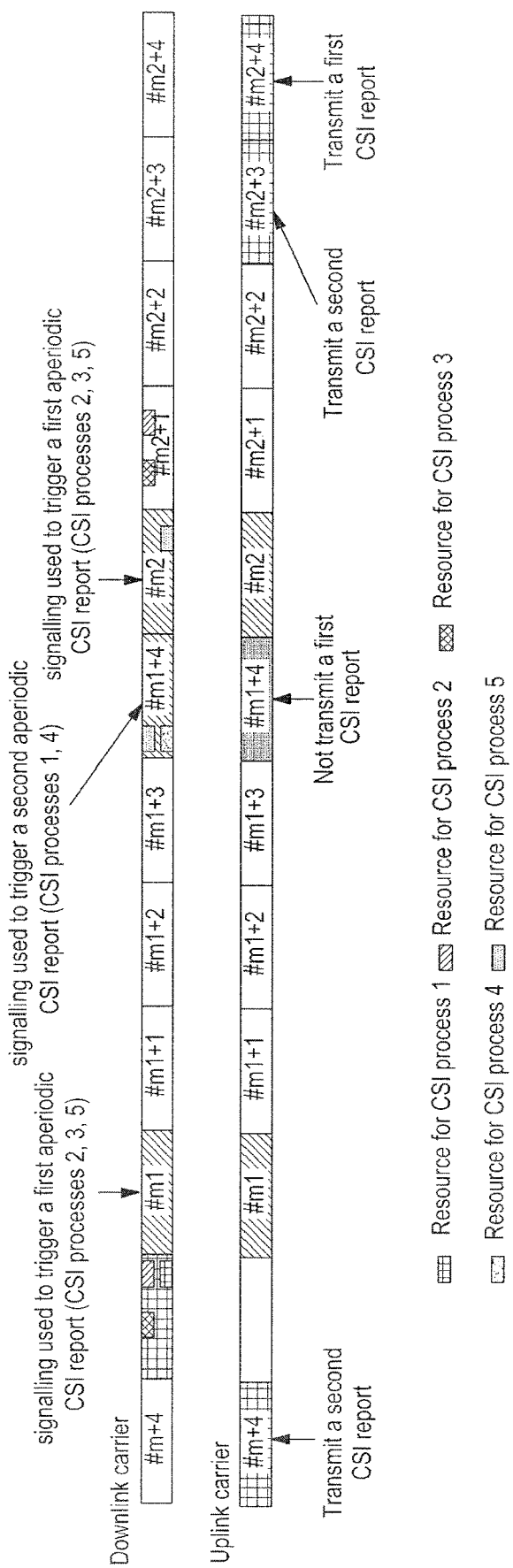
FIG. 38 is a schematic diagram illustrating a subframe structure in a second example to determine when the UE has calculated but does not report CSI of a CSI process, whether the UE re-updates the CSI process according to an embodiment of the present invention.

When receiving a signalling used to trigger the second aperiodic CSI report, the UE starts to calculate CSI of CSI process 1, CSI of CSI process 4, and CSI of CSI process 6. When neither of the CSI of CSI process 1, the CSI of CSI process 4 and the CSI of CSI process 6 is not reported at m2, i.e., $N_u$ is equal to two, and the UE receives a signalling used to re-trigger the first aperiodic CSI report from the base station at m2, the number of CSI processes which can be updated by the UE $N_{left\_u}$ is equal to max($N_x-N_u$, 0), i.e., 1. According to prior art, the UE updates a CSI process with the smallest CSI process index in CSI processes 2, 3, 4, i.e., the CSI process 2. However, there is no CSI resource for CSI processes 2, 3 between m1 and m2 when the two first aperiodic CSI reports are triggered. Thus, according to the first method, the UE does not update CSI processes 2, 3, and the additional processing capability for one CSI process $N_{left\_u}$ is used to update CSI process 5. FIG. 38 is a schematic diagram illustrating a subframe structure in a second example to determine when the UE has calculated but does not report CSI of a CSI process, whether the UE re-updates the CSI process according to an embodiment of the present invention.

In block 3602, according to the CSI process processing capability $N_y$, different carriers or different carrier groups corresponding to CSI processes and CSI processes neither updated nor reported before receiving the aperiodic CSI report trigger signalling, the UE determines the number of CSI processes which can be updated in CSI processes indicated by the aperiodic CSI report trigger signalling $N^*_y$. The number of CSI processes which can be updated for a single carrier is equal to min($N_y$, $N_x-N_u$). The largest number of CSI processes which can be updated in all carriers indicated in the aperiodic CSI report trigger signalling is equal to $N_y$. The CSI processes which can be updated $N_y$ do not include a CSI process CSI of which has been calculated, but is not reported to the base station because the uplink signal can be transmitted to the base station in the uplink subframe where the CSI is reported.

In particular, when the number of simultaneous CSI processes corresponding to the aperiodic CSI report triggered by the base station exceeds the UE process processing capability $N_y$, the UE sorts the CSI processes according to pre-defined priorities, and updates $N_y$ CSI processes with $N_y$ highest priorities. The UE does not re-update a CSI process that has been updated but is not reported. In particular, according to the pre-defined priorities, the UE sorts the CSI processes not including the CSI process that has been updated but is not reported, and updates the $N_y$ CSI processes with $N_y$ highest priorities according to a pre-defined priority rule. The priority rule includes:

the smaller an index of a CSI process, the higher a priority of the CSI process, and/or a priority of a CSI process corresponding to a valid CSI resource is higher than that of a CSI process corresponding to an invalid CSI resource.

When the UE has updated but does not report CSI of a CSI process, the UE may determine whether the CSI process is re-updated according to a method described above, which is not described repeatedly herein.

A method in block 3602 may apply to a single-carrier system, or may apply to a multiple-carrier system. In the multiple-carrier system, a method in block 3602 not only applies to a system with only one carrier group, but also applies to a system with multiple carrier groups. Take the system with multiple carrier groups as an example for description.

Figure 39:
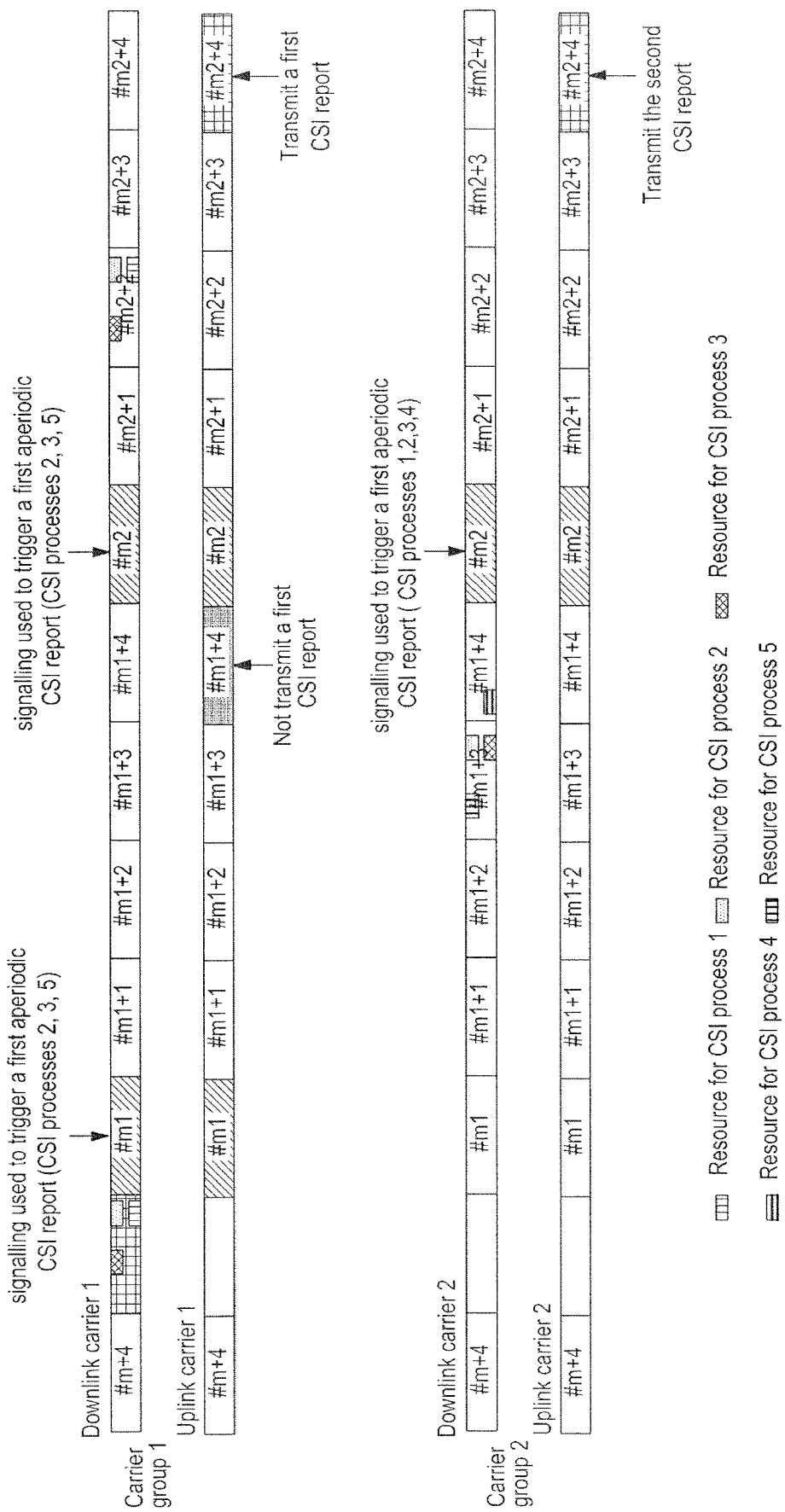
FIG. 39 is a schematic diagram illustrating a subframe structure in a third example to determine when the UE has calculated but does not report CSI of a CSI process in a condition with multiple carrier groups, whether the UE re-updates the CSI process according to an embodiment of the present invention.

It is assumed that both $N_x$ and $N_y$ are equal to 5. At m1, carrier group 1 triggers a first aperiodic CSI report (CSI processes 2, 3, 5 for carrier 1). The UE has performed calculation for CSI processes 2, 3, 5, but does not transmit the first aperiodic CSI report at m1+4. At m2, carrier group 1 re-triggers the first aperiodic CSI report (CSI processes 2, 3, 5 for carrier 1), and carrier group 2 simultaneously triggers a second aperiodic CSI report (CSI processes 1, 2, 3, 4 for carrier 2). It is assumed there is no CSI process neither updated nor reported in any of carrier 1 and carrier 2, i.e., $N_u$ is equal to zero. The number of CSI processes which can be updated for carrier 1 or carrier 2 $N_{left\_u}$ is equal to max($N_x-N_u$, 0), i.e., 5. However, the largest number of the CSI processes which can be simultaneously updated for the two carriers is no more than 5. The UE may not re-update CSI processes 2, 3, 5 for carrier 1, and may update CSI processes 1, 2, 3, 4 for carrier group 2 according to pre-defined priorities. FIG. 39 is a schematic diagram illustrating a subframe structure in a third example to determine when the UE has calculated but does not report CSI of a CSI process in a condition with multiple carrier groups, whether the UE re-updates the CSI process according to an embodiment of the present invention.

Figure 40:
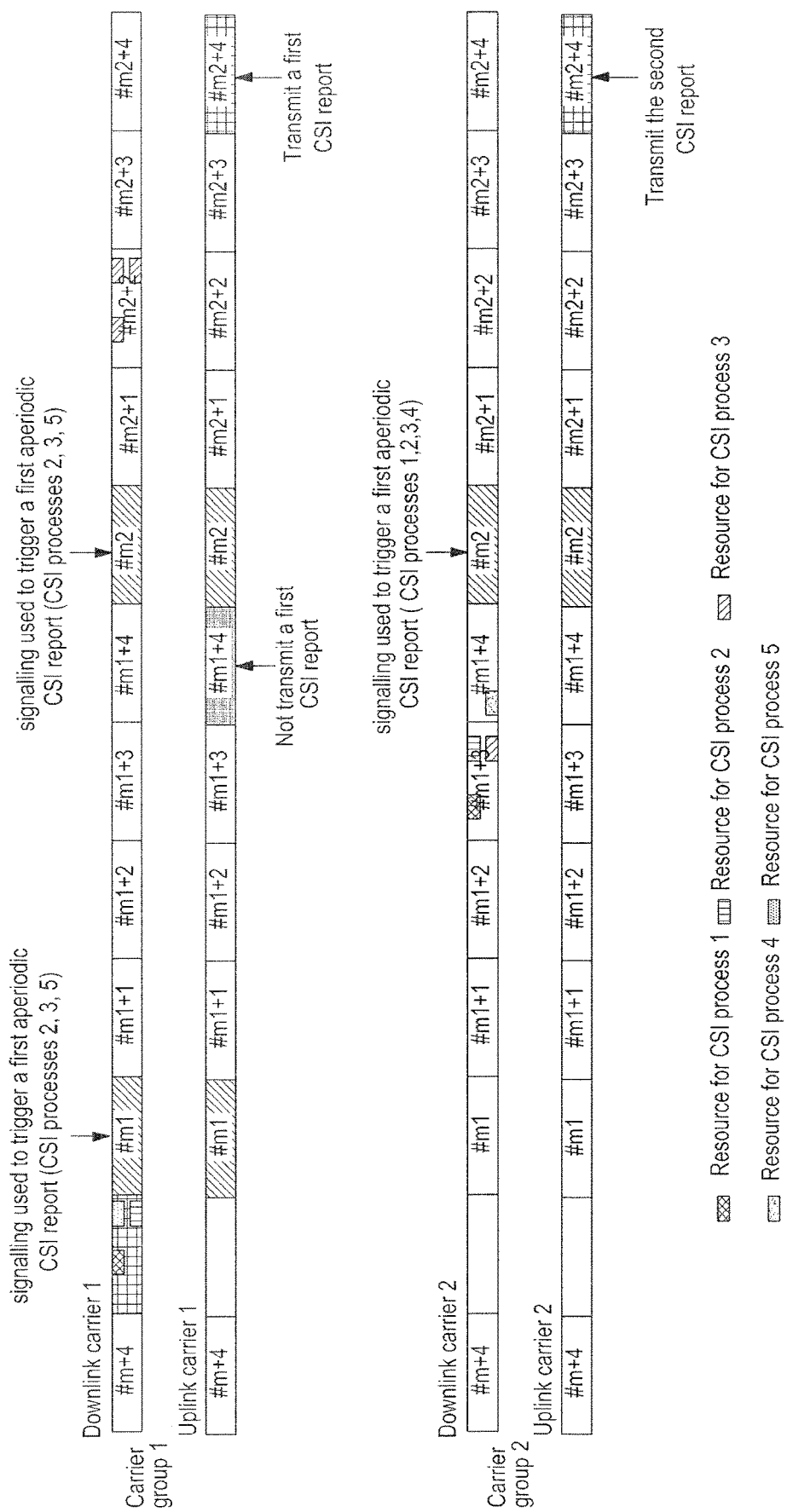
FIG. 40 is a schematic diagram illustrating a subframe structure in a fourth example to determine when the UE has calculated but does not report CSI of a CSI process in a condition with multiple carrier groups, whether the UE re-updates the CSI process according to an embodiment of the present invention.

In another example, after the UE updates the CSI processes and before the UE receives the aperiodic CSI report trigger signalling including the CSI processes again, there is new CSI resource for CSI processes 2, 5 for carrier group 1 but there is no CSI resource for CSI process 3. The UE does not update CSI process 3. Whether the UE updates CSI processes 2, 5 are determined jointly considering CSI processes 1, 2, 3, 4 for carrier group 2. According to pre-defined priorities, five CSI processes in the six CSI processes are updated. For example, according to CSI process indexes, CSI process 2 for the carrier group 1 and CSI processes 1, 2, 3, 4 for carrier group 2 are updated. When the UE obtains channels respectively on uplink carrier 1 and uplink carrier 2 at m2+4, the UE respectively transmits a result of updated CSI process 2 for carrier group 1, results of CSI processes 3, 5 not updated for carrier group 1, and results of updated CSI processes 1, 2, 3, 4 for carrier group 2. The results of CSI processes 3, 5 for carrier group 1 are updated after the UE receives a signalling used to trigger a first aperiodic CSI report at m1. FIG. 40 is a schematic diagram illustrating a subframe structure in a fourth example to determine when the UE has calculated but does not report CSI of a CSI process in a condition with multiple carrier groups, whether the UE re-updates the CSI process according to an embodiment of the present invention.

Further, when the method applies to the system with multiple carrier groups, in block 3602, the UE updates a CSI measurement result for a CSI process which can be updated according to a pre-defined priority rule. The priority rule includes:

a priority of a CSI process a CSI report of which is fed back in a licensed spectrum is higher than a priority of a CSI process a CSI report of which is fed back in an unlicensed spectrum.

For example, $N_y$ are equal to 5 (a limitation introduced by capability $N_x$ is not considered herein). At m1, carrier group 1 triggers a first aperiodic CSI report (CSI processes 2, 3, 5 for down carrier 1). The UE feeds the first aperiodic CSI report back on uplink carrier 1 at m1+4, wherein the uplink carrier 1 is a carrier in the licensed spectrum. At m1, carrier group 2 triggers a second aperiodic CSI report (CSI processes 1, 2, 3, 4 for carrier 2), the UE feeds the second aperiodic CSI report back on uplink carrier 2 at m1+4, wherein the uplink carrier 2 is a carrier in the unlicensed spectrum. Since the uplink carrier 1 is the licensed carrier, the UE has to transmit the first aperiodic CSI report on uplink carrier 1 at m1+4.

Figure 41:
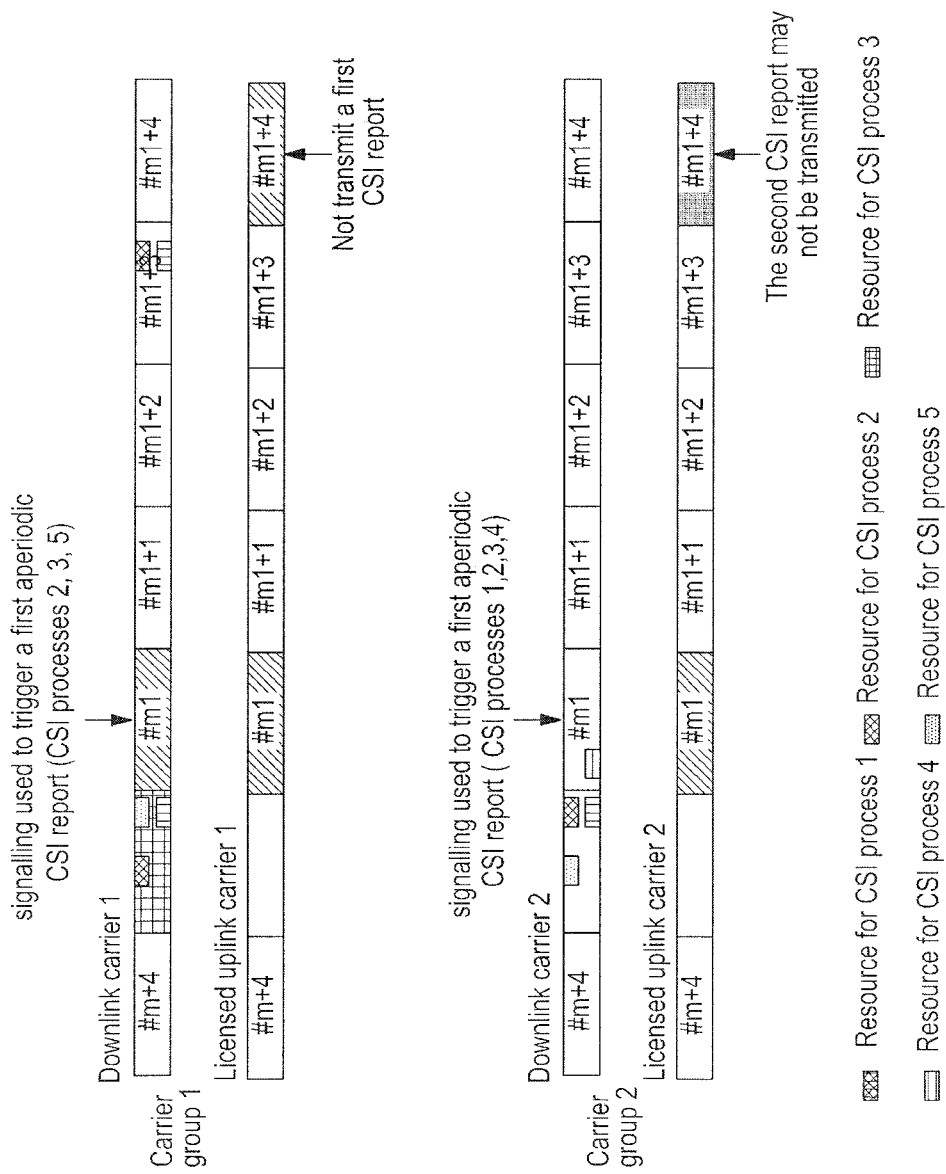
FIG. 41 is a schematic diagram illustrating a subframe structure in a fifth example to determine when the UE has calculated but does not report CSI of a CSI process in a condition with multiple carrier groups, whether the UE re-updates the CSI process according to an embodiment of the present invention.

Since the uplink carrier 2 is the unlicensed carrier, when the uplink carrier 2 is busy, the UE does not feed the second aperiodic CSI report back on the uplink carrier 2 at m1+4. According to the priority rule, a priority of a CSI process corresponding to the CSI report carried on the uplink carrier 1 is higher than a priority of a CSI process corresponding to the CSI report carried in the uplink carrier 2. Thus, a priority of CSI processes 2, 3, 5 for carrier 1 corresponding to the first aperiodic CSI report 1 is higher than a priority of CSI processes 1, 2, 3 and 4 for carrier 2 corresponding to the second aperiodic CSI report. Thus, the UE preferably updates CSI processes 2, 3, 5 for the carrier 1 and two CSI processes for carrier 2. The updated two CSI processes may be selected from the four CSI processes for carrier 2 according to another priority rule. FIG. 41 is a schematic diagram illustrating a subframe structure in a fifth example to determine when the UE has calculated but does not report CSI of a CSI process in a condition with multiple carrier groups, whether the UE re-updates the CSI process according to an embodiment of the present invention.

It should be noted that, a concept "CSI process" applies to existing transmission mode 10, or enhanced transmission modes later. For existing transmission modes 1 to 9, each carrier have only one CSI process, and it is considered that the CSI process index is equal to 0.

In all methods above, an aperiodic CSI report is taken as example for description. The methods above may also apply to a periodic CSI in a condition that the UE processing capability is limited. In particular, when the number of CSI processes for which CSI measurement is in demand exceeds the UE processing capability N, the UE sorts the CSI processes according to per-defined priorities, and updates N CSI processes with N highest priorities. When the UE has updated but does not report a CSI process, the UE does not re-update the CSI process. In particular, the UE sorts CSI processes not including the process that has been updated but is not reported by the UE according to pre-defined priorities, and updates N CSI processes with N highest priorities.

In block 3603, the UE transmits the CSI report to the base station according to any one of two methods as follows.

In a first method, the UE reports CSI results of all CSI processes indicated in the aperiodic CSI report trigger signalling received in block 3601.

In a second method, the UE only reports a CSI result of a CSI process indicated in the aperiodic CSI report trigger signalling received in block 3601 and has a valid CSI measurement result.

In the second method for reporting an aperiodic CSI report, the UE further transmits indication information to the base station to notify to the base station a CSI process index of a reported CSI process for an unlicensed carrier or a carrier index of the unlicensed carrier corresponding to the reported CSI process. The indication information is independently encoded with the aperiodic CSI report. For example, the indication information may be transmitted in an OFDM symbol closest to a reference signal, such as demodulation RS. For example, the indication information may be transmitted in an OFDM symbol of an existing RI, which is firstly mapped to the indication channel from a PUSCH button, and then is mapped to the RI. The indication information is independently encoded with the RI. The bit number of the indication information N may be fixed, or may be configured by a higher layer, or may be determined according to a pre-defined rule, e.g., N is determined according to the number of configured unlicensed carriers triggered by the aperiodic CSI report request or the number of CSI processes in unlicensed band triggered by the aperiodic CSI report request. Preferably, N bits may dynamically indicate $2^N$ combinations.

Preferably, N bits may dynamically indicate $2^N$ higher-layer configuration combinations.

Figure 42:
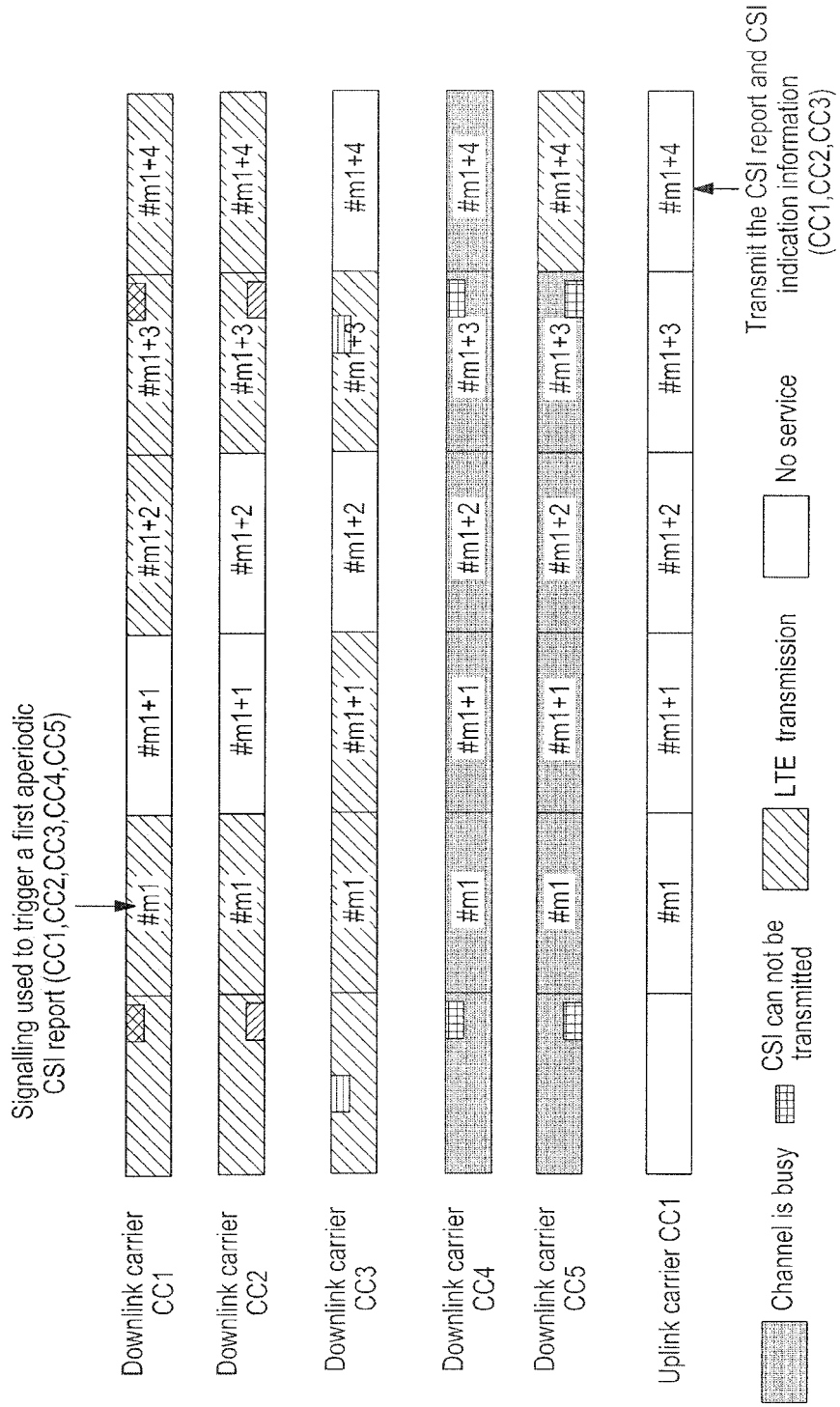
FIG. 42 is a schematic diagram illustrating a second method for transmitting a CSI report from a UE to a base station in a condition with multiple carriers according to an embodiment of the present invention.

For example, five carriers are configured for the UE, wherein CC1 and CC2 are licensed carriers, and CC3 to CC5 are unlicensed carriers. It is assumed that the bit number of indication information N is equal to 3. '000' indicates that no CSI of any unlicensed carrier is reported by the UE, '001' to '011' respectively indicate that the UE reports CSI of one unlicensed carrier, '100' to '110' respectively indicate that the UE reports CSI of two unlicensed carriers, and '111' indicates that the UE reports CSI of three unlicensed carriers. It is assumed that a value of a CSI request field of '10' indicates that CSI process set 1 includes licensed carriers CC1, CC2 and unlicensed carrier CC3, the value of the CSI request field of '11' indicates that CSI process set 2 includes licensed carriers CC1, CC2 and unlicensed carriers CC3 to CC5. FIG. 42 is a schematic diagram illustrating a second method for transmitting a CSI report from a UE to a base station in a condition with multiple carriers according to an embodiment of the present invention. As shown in FIG. 42, when the UE receives the value of the CSI request field '11', and determines that a valid CSI resource is only transmitted on unlicensed carrier CC3, the UE reports CSI of licensed carriers CC1, CC2 and unlicensed carrier CC3, and sets the indication information as '001' to indicate that CSI of only CC3 is reported in the unlicensed carriers. Alternatively, the bit number of the indication information N is equal to 2 for CSI process set 2 and N is equal to 1 for CSI process set 1. Thus, in this example, the indication information as "01" indicates that CSI of only CC3 is reported in the unlicensed carriers.

It should be noted that the enhanced method for reporting an aperiodic CSI report may be used together with an existing method for reporting an aperiodic CSI report, for example, step 3601 and step 3603 could be used with existing method for step 3602, or may be used together with another enhanced method for reporting an aperiodic CSI report, for example, step 3603 could be used with other new method to trigger aperiodic CSI in step 3601 and existing method for step 3602.

It should be noted that this method may also apply to a periodic CSI report. For example, when the periodic CSI of multiple CSI processes is transmitted in a same subframe, according to pre-defined priorities, when a priority of the periodic CSI of CC1 is higher than a priority of the periodic CSI of CC2 but the CSI resource is not successfully transmitted on the CC1 in a time window, the UE does not transmit the periodic CSI of the CC1, but transmits the periodic CSI of the CC2. Thus, the UE notifies to the base station to which CC the reported CSI corresponds. The method may be used only when the priority of the CSI of the unlicensed carrier is higher than the priority of the CSI of the licensed carrier or when priorities of CSI of multiple unlicensed carriers are compared with each other. The UE may independently encode the indication information and the periodic CSI report. Thus, the base station may firstly decode the indication information, and then may determine detail content of the periodic CSI report according to the indication information.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method for transmitting uplink control information (UCI) performed by a user equipment (UE), the method comprising:
   receiving, from a base station, a scheduling indicator for uplink transmission;
   identifying that the UE is configured with simultaneous physical uplink control channel (PUCCH) transmission and physical uplink shared channel (PUSCH) transmission;
   determining to transmit a periodic channel state information (CSI) on a PUSCH of a secondary cell (SCell) in a licensed band other than an unlicensed band and acknowledgement information on a PUCCH of a primary cell (PCell), based on the scheduling indicator; and
   transmitting, to the base station, the periodic CSI on the PUSCH of the secondary cell (SCell) with a smallest SCell index in the licensed band other than the unlicensed band, and the acknowledgement information on the PUCCH of the PCell based on the determination, in case that:
   the UCI consists of the periodic CSI and the acknowledgement information, and
   the UE does not transmit PUSCH data on the PCell and transmits the PUSCH data on at least one SCell.

2. The method of claim 1,
   wherein the UCI comprises periodic CSI,
   wherein a pre-defined location comprises a subframe where the periodic CSI is reported, and
   wherein, when the UCI further comprises aperiodic CSI in the same subframe and an uplink carrier carrying the aperiodic CSI is in an unlicensed spectrum,
      transmitting the periodic CSI on a carrier in a licensed spectrum,
      transmitting the aperiodic CSI in the unlicensed spectrum if the unlicensed spectrum is idle, or
      only transmitting, by the UE, the periodic CSI on an uplink carrier in the licensed spectrum when the uplink carrier carrying the aperiodic CSI in the unlicensed spectrum is not used for transmission in the same subframe.

3. The method of claim 1,
   wherein the UCI comprises periodic CSI,
   wherein a pre-defined location comprises a subframe where the periodic CSI is reported, and
   wherein, when the UCI in the same subframe further comprises aperiodic CSI and all downlink carriers corresponding to the aperiodic CSI are carriers in an unlicensed spectrum,
      transmitting the periodic CSI on a licensed spectrum,
      transmitting the aperiodic CSI on a carrier in the licensed spectrum if the carrier carrying the aperiodic CSI is in the licensed spectrum,
      transmitting the aperiodic CSI on a carrier in the unlicensed spectrum if the carrier carrying the aperiodic CSI is idle and in the unlicensed spectrum, or
      only transmitting, by the UE, the periodic CSI on a carrier in the licensed carrier if there is no valid CSI measurement result for any downlink unlicensed carrier corresponding to the aperiodic CSI in the same subframe.

4. The method of claim 1,
   wherein the UCI further comprises aperiodic CSI,
   wherein an UL grant comprises an aperiodic CSI report trigger signalling,
   wherein, before the UE transmits the UCI:
      determining, by the UE, a number of CSI processes to be updated in CSI processes indicated by the aperiodic CSI report trigger signalling according to CSI process processing capability and the number of CSI processes that are not updated or reported before the UE receives the aperiodic CSI report trigger signalling, and
      updating CSI measurement results for the CSI process to be updated, and
   wherein the transmitted UCI is a CSI report.

5. The method of claim 4,
   wherein the CSI process processing capability comprises a CSI process processing capability for each carrier $N_x$,
   wherein the process of the UE determining the number of the CSI processes to be updated in the CSI processes indicated by the aperiodic CSI report trigger signalling comprises:
      according to the CSI process processing capability for each carrier $N_x$ and the number of CSI processes that are not updated or reported for the carrier before the UE receives the aperiodic CSI report trigger signalling $N_u$, determining, by the UE, that the number of the CSI processes to be updated for the carrier in the CSI processes indicated by the aperiodic CSI report trigger signalling $N_{left\_u}$ is equal to $\max(N_x - N_u, 0)$, and
   wherein the $N_{left\_u}$ CSI processes comprise $N_{left\_u}$ CSI processes with $N_{left\_u}$ highest priorities determined according to a pre-defined priority rule.

6. The method of claim 5,
   wherein the CSI processes that are not updated or reported for the carrier before the UE receives the aperiodic CSI report trigger signalling $N_u$ do not comprise a CSI process for the carrier CSI of which is calculated, but is not reported to the base station since an uplink signal to be transmitted to the base station in an uplink subframe where the CSI is reported; and/or
   wherein the CSI processes to be updated for the carrier in the CSI processes indicated by the aperiodic CSI report trigger signalling $N_{left\_u}$ do not comprise a CSI process for the carrier CSI of which is calculated, but is not reported to the base station since an uplink signal to be transmitted to the base station in an uplink subframe where the CSI of the carrier is reported.

7. The method of claim 4,
   wherein the CSI process processing capability comprises a capability for simultaneously processing CSI processes $N_y$, wherein the CSI processes simultaneously processed corresponds to different carriers or different carrier groups,
   wherein the process of the UE determining the number of the CSI processes to be updated in CSI processes indicated by the aperiodic CSI report trigger signalling comprises:

according to the capability for simultaneously processing CSI processes $N_y$, determining, by the UE, the number of the CSI processes to be updated in the CSI processes indicated by the aperiodic CSI report trigger signalling, and wherein the CSI processes to be updated in the CSI processes indicated by the aperiodic CSI report trigger signalling $N_y$ do not comprise a CSI process CSI of which is calculated, but is not reported to the base station since an uplink signal to be transmitted to the base station in an uplink subframe where the CSI is reported.

8. The method of claim 4, wherein the CSI process processing capability comprises a CSI process processing capability for each carrier $N_x$ and a capability for simultaneously processing CSI processes $N_y$, wherein the CSI processes simultaneously processed corresponds to different carriers or different carrier groups, wherein the process of the UE determining the number of the CSI processes to be updated in CSI processes indicated by the aperiodic CSI report trigger signalling comprises:

according to the capability for simultaneously processing CSI processes $N_y$, the CSI process processing capability for each carrier $N_x$ and the number of CSI processes that are not updated or reported for the carrier before the UE receives the aperiodic CSI report trigger signalling $N_u$, determining, by the UE, the number of the CSI processes to be updated in the CSI processes indicated by the aperiodic CSI report trigger signalling, wherein the CSI processes that are not updated or reported for the carrier before the UE receives the aperiodic CSI report trigger signalling $N_u$ u do not comprise a CSI process for the carrier CSI of which is calculated, but is not reported to the base station since an uplink signal to be transmitted to the base station in an uplink subframe where the CSI is reported; and/or wherein the CSI processes to be updated for the carrier in the CSI processes indicated by the aperiodic CSI report trigger signalling do not comprise a CSI process for the carrier CSI of which is calculated, but is not reported to the base station since an uplink signal to be transmitted to the base station in the subframe where the CSI is reported; and/or wherein the CSI processes to be updated in the CSI processes indicated by the aperiodic CSI report trigger signalling $N_y$ do not comprise a CSI process CSI of which is calculated, but is not reported to the base station since an uplink signal to be transmitted in the subframe where the CSI is reported.

9. The method of claim 4, wherein, when the CSI processes indicated by the aperiodic CSI report trigger signalling corresponds to multiple carriers, the CSI measurement results for the CSI processes to be updated are updated according to a pre-defined priority rule, and wherein the pre-defined priority rule comprises: a priority of a CSI process where a CSI report of which is fed back in a licensed spectrum is higher than a priority of a CSI process a CSI report of which is fed back in an unlicensed spectrum.

10. The method of claim 4, wherein the CSI report comprises a CSI result of a CSI process that is in the CSI processes indicated by the aperiodic CSI report trigger signalling received by the UE and has a valid CSI measurement result.

11. A method for controlling uplink control information (UCI) transmission performed by a base station, the method comprising:

transmitting, to a user equipment (UE), a scheduling indicator for uplink transmission;

determining to transmit a periodic channel state information (CSI) on a physical uplink shared channel (PUSCH) of a secondary cell (SCell) in a licensed band other than an unlicensed band and acknowledgement information on a physical uplink control channel (PUCCH) of a primary cell (PCell), based on the scheduling indicator; and receiving, from the UE, the periodic CSI on the PUSCH of the secondary cell (SCell) with a smallest SCell index in the licensed band other than the unlicensed band, and the acknowledgement information on the PUCCH of the PCell based on the scheduling indicator, in case that:
the UE is configured with simultaneous PUCCH transmission and PUSCH transmission,
the UCI consists of the periodic CSI and the acknowledgement information, and
the UE does not transmit PUSCH data on the PCell and transmits the PUSCH data on at least one SCell.

12. A base station for controlling uplink control information (UCI) transmission, the base station comprising:

a transceiver; and at least one processor coupled to the transceiver and configured to:

transmit, to a user equipment (UE), a scheduling indicator for uplink transmission, determine to transmit a periodic channel state information (CSI) on a physical uplink shared channel (PUSCH) of a secondary cell (SCell) in a licensed band other than an unlicensed band and acknowledgement information on a physical uplink control channel (PUCCH) of a primary cell (PCell), based on the scheduling indicator, and receive, from the UE, the periodic CSI on the PUSCH of the secondary cell (SCell) with a smallest SCell index in the licensed band other than the unlicensed band, and the acknowledgement information on the PUCCH of the PCell based on the scheduling indicator, in case that:

the UE is configured with simultaneous PUCCH transmission and PUSCH transmission,
the UCI consists of the periodic CSI and the acknowledgement information, and
the UE does not transmit PUSCH data on the PCell and transmits the PUSCH data on at least one SCell.

13. A user equipment (UE) for transmitting uplink control information (UCI) configured with an uplink carrier in an unlicensed spectrum, the UE comprising:

a transceiver; and at least one processor coupled to the transceiver and configured to:

receive, from a base station, a scheduling indicator for uplink transmission, identify that the UE is configured with simultaneous physical uplink control channel (PUCCH) transmission and physical uplink shared channel (PUSCH) transmission, determine to transmit a periodic channel state information (CSI) on a PUSCH of a secondary cell (SCell) in a licensed band other than an unlicensed band and acknowledgement information on a PUCCH of a primary cell (PCell), based on the scheduling indicator, and transmit, to the base station, the periodic CSI on the PUSCH of the secondary cell (SCell) with a smallest SCell index in the licensed band other than the unlicensed band, and the acknowledgement information on the PUCCH of the PCell based on the determination, in case that:

the UCI consists of the periodic CSI and the acknowledgement information, and the UE does not transmit PUSCH data on the PCell and transmits the PUSCH data on at least one SCell.

14. The UE of claim 13, wherein the UCI comprises periodic CSI, wherein a pre-defined location comprises a subframe where the periodic CSI is reported, and wherein, when the UCI further comprises aperiodic CSI in the same subframe and an uplink carrier carrying the aperiodic CSI is in the unlicensed spectrum, transmitting the periodic CSI on a carrier in a licensed spectrum, transmitting the aperiodic CSI in the unlicensed spectrum if the unlicensed spectrum is idle, or only transmitting, by the UE, the periodic CSI on an uplink carrier in the licensed spectrum when the uplink carrier carrying the aperiodic CSI in the unlicensed spectrum is not used for transmission in the same subframe.

15. The UE of claim 13, wherein the UCI comprises periodic CSI, wherein a pre-defined location comprises a subframe where the periodic CSI is reported, and wherein, when the UCI in the same subframe further comprises aperiodic CSI and all downlink carriers corresponding to the aperiodic CSI are carriers in the unlicensed spectrum, transmitting the periodic CSI on a licensed spectrum, transmitting the aperiodic CSI on a carrier in the licensed spectrum if the carrier carrying the aperiodic CSI is in the licensed spectrum, transmitting the aperiodic CSI on a carrier in the unlicensed spectrum if the carrier carrying the aperiodic CSI is idle and in the unlicensed spectrum, or only transmitting, by the UE, the periodic CSI on a carrier in the licensed carrier if there is no valid CSI measurement result for any downlink unlicensed carrier corresponding to the aperiodic CSI in the same subframe.

16. The UE of claim 13, wherein the UCI further comprises aperiodic CSI, wherein the UL grant comprises an aperiodic CSI report trigger signalling, wherein, before the UE transmits the UCI: determining, by the UE, a number of CSI processes to be updated in CSI processes indicated by the aperiodic CSI report trigger signalling according to CSI process processing capability and the number of CSI processes that are not updated or reported before the UE receives the aperiodic CSI report trigger signalling, and updating CSI measurement results for the CSI process to be updated, and wherein the transmitted UCI is a CSI report.

17. The UE of claim 16, wherein the CSI process processing capability comprises a CSI process processing capability for each carrier $N_x$, wherein the process of the UE determining the number of the CSI processes to be updated in the CSI processes indicated by the aperiodic CSI report trigger signalling comprises:

according to the CSI process processing capability for each carrier $N_x$ and the number of CSI processes that are not updated or reported for the carrier before the UE receives the aperiodic CSI report trigger signalling $N_u$, determining, by the UE, that the number of the CSI processes to be updated for the carrier in the CSI processes indicated by the aperiodic CSI report trigger signalling $N_{left\_u}$ is equal to max($N_x-N_u$, 0), and wherein the $N_{left\_u}$ CSI processes comprise $N_{left\_u}$ CSI processes with $N_{left\_u}$ highest priorities determined according to a pre-defined priority rule.

18. The UE of claim 17, wherein the CSI processes that are not updated or reported for the carrier before the UE receives the aperiodic CSI report trigger signalling $N_u$ do not comprise a CSI process for the carrier CSI of which is calculated, but is not reported to the base station since an uplink signal to be transmitted to the base station in an uplink subframe where the CSI is reported; and/or wherein the CSI processes to be updated for the carrier in the CSI processes indicated by the aperiodic CSI report trigger signalling $N_{left\_u}$ do not comprise a CSI process for the carrier CSI of which is calculated, but is not reported to the base station since an uplink signal to be transmitted to the base station in an uplink subframe where the CSI of the carrier is reported.

19. The UE of claim 16, wherein the CSI process processing capability comprises a capability for simultaneously processing CSI processes $N_y$, wherein the CSI processes simultaneously processed corresponds to different carriers or different carrier groups, wherein the process of the UE determining the number of the CSI processes to be updated in CSI processes indicated by the aperiodic CSI report trigger signalling comprises:

according to the capability for simultaneously processing CSI processes $N_y$, determining, by the UE, the number of the CSI processes to be updated in the CSI processes indicated by the aperiodic CSI report trigger signalling, and wherein the CSI processes to be updated in the CSI processes indicated by the aperiodic CSI report trigger signalling $N_y$ do not comprise a CSI process CSI of which is calculated, but is not reported to the base station since an uplink signal to be transmitted to the base station in an uplink subframe where the CSI is reported.

20. The UE of claim 16, wherein the CSI process processing capability comprises a CSI process processing capability for each carrier $N_x$ and a capability for simultaneously processing CSI processes $N_y$, wherein the CSI processes simultaneously processed corresponds to different carriers or different carrier groups, wherein the process of the UE determining the number of the CSI processes to be updated in CSI processes indicated by the aperiodic CSI report trigger signalling comprises:

according to the capability for simultaneously processing CSI processes $N_y$, the CSI process processing capability for each carrier $N_x$ and the number of CSI processes that are not updated or reported for the carrier before the UE receives the aperiodic CSI report trigger signalling $N_u$, determining, by the UE, the number of the CSI processes to be updated in the CSI processes indicated by the aperiodic CSI report trigger signalling, wherein the CSI processes that are not updated or reported for the carrier before the UE receives the aperiodic CSI report trigger signalling $N_u$ do not comprise a CSI process for the carrier CSI of which is calculated, but is not reported to the base station since an uplink signal to be transmitted to the base station in an uplink subframe where the CSI is reported; and/or wherein the CSI processes to be updated for the carrier in the CSI processes indicated by the aperiodic CSI report trigger signalling do not comprise a CSI process for the carrier CSI of which is calculated, but is not reported to the base station since an uplink signal to be transmitted to the base station in the subframe where the CSI is reported; and/or wherein the CSI processes to be updated in the CSI processes indicated by the aperiodic CSI report trigger signalling $N_y$ do not comprise a CSI process CSI of which is calculated, but is not reported to the base station since an uplink signal to be transmitted in the subframe where the CSI is reported.

* * * * *